United States Patent [19]
Mimura

[11] Patent Number: 6,089,363
[45] Date of Patent: Jul. 18, 2000

[54] FRICTION RESISTANCE GENERATOR

[76] Inventor: Kenji Mimura, 29-1105, Wakabadal 4-chome, Asahi-ku, Yokohama-shi Kanagawa, Japan

[21] Appl. No.: 09/077,558
[22] PCT Filed: Mar. 1, 1996
[86] PCT No.: PCT/JP96/00496
§ 371 Date: Jun. 1, 1998
§ 102(e) Date: Jun. 1, 1998
[87] PCT Pub. No.: WO97/29295
PCT Pub. Date: Aug. 14, 1997

[51] Int. Cl.$^7$ .................................................. F16D 3/34
[52] U.S. Cl. ................................... 192/45; 192/30 R
[58] Field of Search .................... 192/30 R, 45, 192/44, 64; 384/572

[56] References Cited

U.S. PATENT DOCUMENTS

| | | | |
|---|---|---|---|
| 3,034,365 | 5/1962 | Stieber | 384/572 |
| 5,125,756 | 6/1992 | Bossler, Jr. | 384/572 |
| 5,230,571 | 7/1993 | Estkowski et al. | 384/560 |

*Primary Examiner*—Charles A Marmor
*Assistant Examiner*—Tisha D. Waddell
*Attorney, Agent, or Firm*—Lowe Hauptman Gopstein Gilman & Berner LLP.

[57] ABSTRACT

A mechanism of a simple structure, in which always stable and discretionary frictional resistance can be produced even when the speed of rotary movements or rectilinear movements of the subject structure changes and, moreover, the magnitude of the frictional force can be easily controlled by changing the magnitude of a load. Namely, when a rotary member 1 is rotated while a load toward the axial direction is being applied, numerous rollers 2 make rolling motions in contact with the rotary member 1 and a passive member 3. The rollers 2 make rolling motions along a track of rotation of the rotary member 1. The rollers 2 are restrained to roll toward a direction being inclined by a prescribed angle by a cage 4. This results in producing a frictional force in proportion to the magnitude of the load being applied to the axial direction between the rollers 2 and the rotary member 1 nd between the rollers 2 and the passive member 3. At this time, since the rollers 2 slide while making rolling motions, sliding friction and rolling friction occur in combination to provide more stable resistance force.

12 Claims, 41 Drawing Sheets

F I G. 11
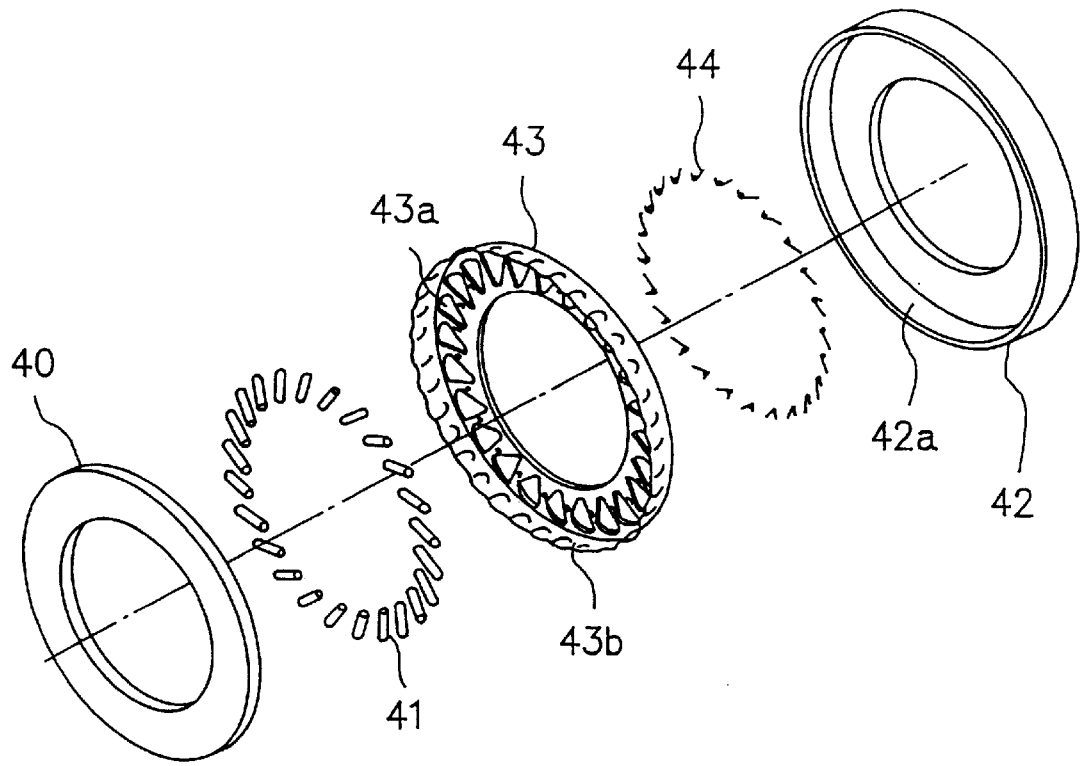

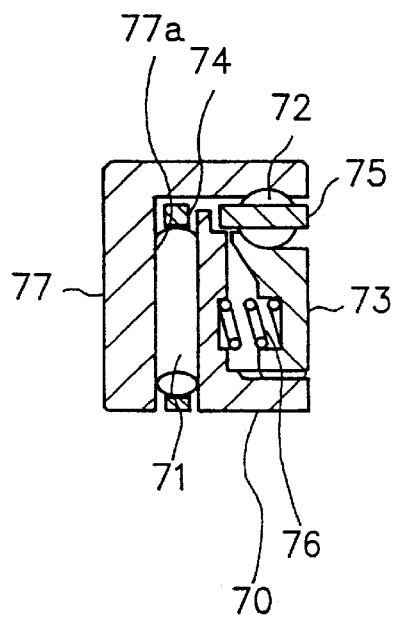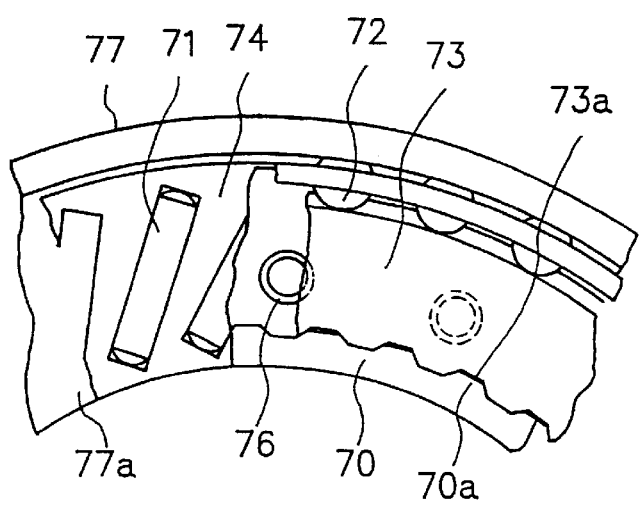
FIG. 19a
FIG. 19b

FRICTION RESISTANCE GENERATOR

BACKGROUND OF THE INVENTION

1. Field of the Invention

The present invention relates to a friction resistance generator for applying discretionary resistance by frictional force to rotary movement or rectilinear movement in various kinds of machines and equipment.

2. Description of the Prior Art

Bearings or guides being so far known as one type of mechanical elements can be broadly categorized into slide bearings or slide guides which are structured to support movable members through the aid of lubricating oil and roller bearings or roller guides which are structured to support the movable members through the aid of balls or rollers. They are intended to make the movable members always move smoothly diminishing the friction resistance between mating members as small as possible. Consequently, since conventional bearings or guides are not intended to apply resistance to moving members to control the moving force, additional attenuation means such as a shock absorber or damper becomes necessary when it is necessary to control the moving speed of the movable member to a constant level.

Meanwhile, with slide bearings or slide guides using lubricating oil, although the frictional resistance can be diminished to an extremely low level if lubricating oil stays between mating members under an ideal state, under low speed movement or heavy load movement, oil film existing between the mating slide surfaces can be damaged resulting to intermittent occurrences of static friction and dynamic friction producing extremely unstable frictional force, thus tending to cause so called stick-slip phenomenon.

Like aforesaid, among conventional machine elements, although there do exist machine elements that can provide smoother rotary or rectilinear motions, such a mechanical element as is capable of controlling the movement speed to a constant level without addition of particular external structures or as is capable of producing stable and easily controllable resistance force does not exist. Therefore, there is some margin for further development work being left in this technological field for provision of discretionary frictional resistance to rotary or rectilinear motions occurring in various kinds of machines and equipment.

The present invention was conceived in view of the above problems. It is therefore an object thereof to provide a mechanism of a simple structure for generating always stable and discretionary frictional resistance to rotary movement or rectilinear movement of various material bodies at any moving speeds and, moreover, for easily controlling magnitude of said frictional force by changing the load.

SUMMARY OF THE INVENTION

In order to achieve the above object, the present invention provides a friction resistance generator comprising a rotary member which rotates on a prescribed axis of rotation, a passive member which faces the rotary member in the axial direction, numerous rollers being located between the rotary member and the passive member, said rollers making rolling motions in contact with the rotary member and the passive member, and a cage which maintains the rollers at prescribed intervals along a prescribed peripheral line around the axis of rotation of the rotary member while allowing free rolling of the rollers, in which axes of rolling of the rollers are so inclined to produce a prescribed angle between a plane containing the axis of rotation of the rotary member.

With the aforesaid friction resistance generator, when the rotary member is rotated while applying a load toward the axial direction, respective rollers roll in contact with the rotary member and the passive member. Since the rollers roll along a track of rotation of the rotary member while being restricted by the cage to roll in a direction inclined by a prescribed angle to the track of rotation of the rotary member, frictional force commensurate with the load applied toward the axial direction occurs between the rollers and the rotary member, and between the rollers and the passive member. At this time, since the rollers slide while making rolling motions, sliding friction and rolling friction become combined to cause more stable frictional force. In this instance, by optional setting of the inclination angle of the axes of rolling of the rollers, frictional force corresponding to the preset inclination angle can be obtained.

Also, with the aforesaid friction resistance generator, respective rollers are maintained, for free tilting, so that the inclination angle of the axes of rolling of respective rollers to the plane containing the axis of rotation of the rotary member when the rotary member rotates in one direction of rotation becomes different from an inclination angle of the axes of rolling of the rollers to the plane containing the axis of rotation of the rotary member when the rotary member rotates in the other direction of rotation. By this structure, it is possible, for example, to produce larger frictional force when the rotary member rotates in one direction of rotation and to produce smaller fractional force when the rotary member rotates in the other direction of rotation.

BRIEF DESCRIPTION OF THE DRAWINGS

FIG. 11 is an exploded perspective view of a friction resistance generator of a fifth preferred embodiment of this invention.

FIG. 19a and 19b show partial enlarged views of the drawing in FIG. 18.

DESCRIPTION OF THE PREFERRED EMBODIMENTS

Figure 1:
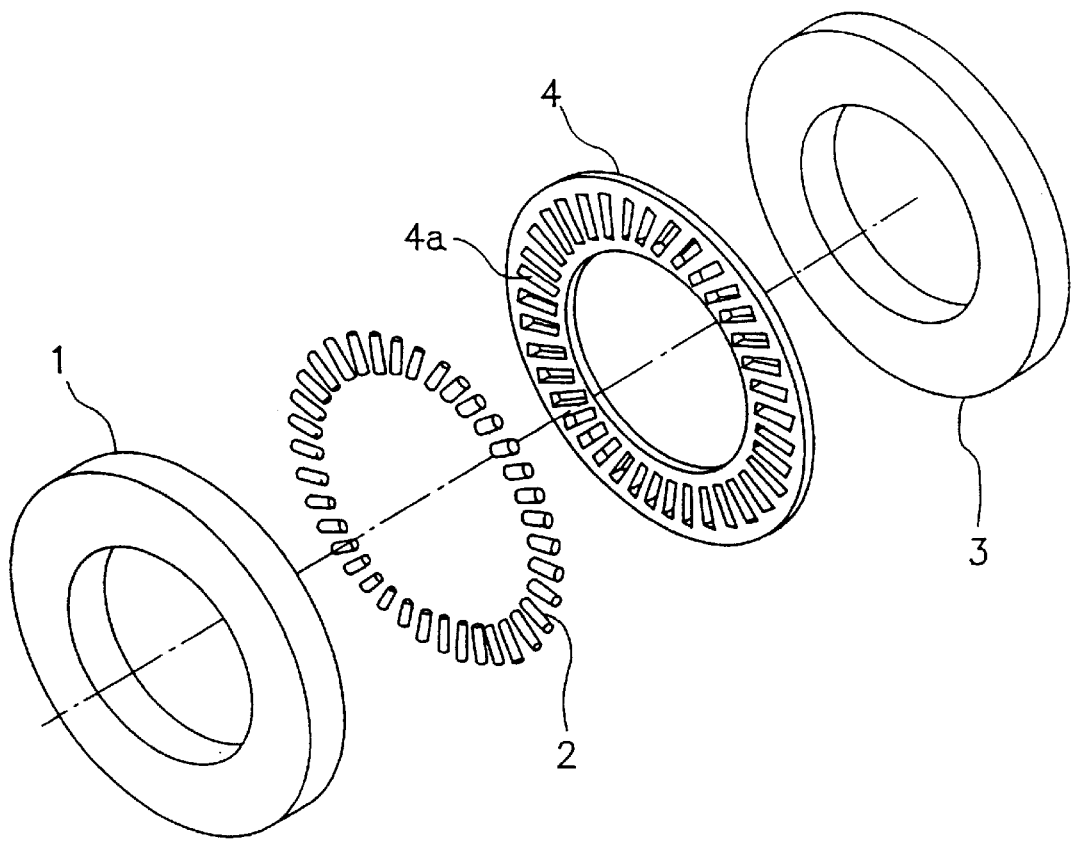
FIG. 1 is an exploded perspective view of a friction resistance generator of a first preferred embodiment of this invention.

FIG. 1 to FIG. 4 show a first preferred embodiment of this invention: FIG. 1 being an exploded perspective view of a friction resistance generator of the first preferred embodiment; FIG. 2(a) being a partial enlarged view of a cross-section in the radial direction of the drawing in FIG. 1; FIG. 2(b) being a partial enlarged view of a portion seen from the axial direction of the drawing in FIG. 1.

The friction resistance generator comprises a rotary member 1 rotating on its axis of rotation, numerous rollers 2 disposed along a track of rotation of the rotary member 1, a passive member 3 which coaxially faces the rotary member 1 across the rollers 2, and a cage 4 which maintains the rollers 2 at prescribed intervals in freely rotatable state.

Meanwhile, the aforesaid components are the minimum requirements for the friction resistance generator of this embodiment and, in an actual structure, the rotary member 1, the passive member 3 and the cage 4 must be housed in a housing or a similar structure being omitted from relevant drawings, which maintains said three components in coaxial co-relations. Also, the rotary member 1 is to be connected to a drive shaft and the passive member 3 is to be connected to another drive shaft or to be kept in a stationary state not to turn, indications of said external drive shafts also being omitted from relevant drawings.

The rotary member 1 is in the form of a ring shape and its surf ace facing the passive rotary member 3 is a flat plane. Meanwhile, in descriptions for the first embodiment, the rotary member 1 is represented by a simplified shape since the descriptions mention only construction and movement of the friction resistance generator.

The rollers 2 are in the form of a cylindrical shape extending straight in their axial direction and disposed at equal intervals along the peripheral direction of the rotary member 1. Also, both ends of the rollers 2 are rounded to a hemispherical shape to lessen friction occurring between the rollers 2 and the cage 4.

The passive member 3 is in the form of a ring shape and its surface facing the rotary member 1 is a flat plane. Meanwhile, the passive member 3 is also represented by a simplified shape for the same reason as the rotary member 1.

Figure 2A:
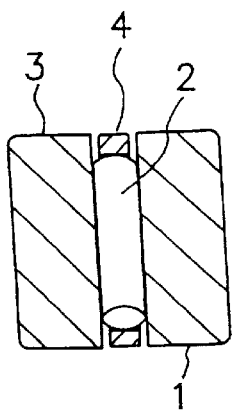
FIG. 2a and 2b show partial enlarged views of the drawing in FIG. 1.
Figure 2B:
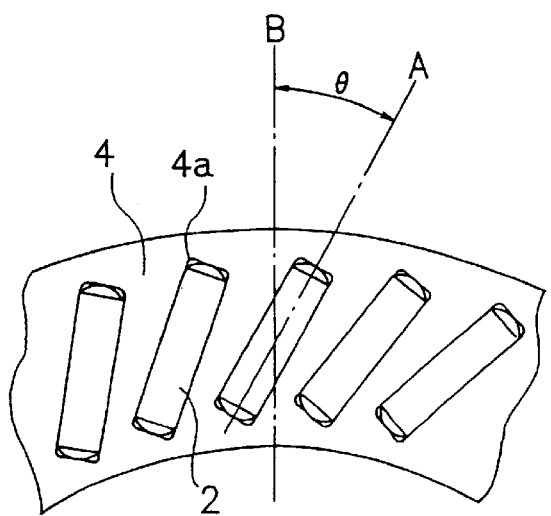

The cage 4 is in the form of a ring shape and its thickness in the axial direction is made thinner than the outer diameter of the rollers 2. The cage 4 is provided with numerous slots 4a, in which each roller 2 is kept in freely rotatable state in each slot 4a. Also, as shown in FIG. 2(b), each axis of rolling A of each roller 2 is inclined by angle θ to a plane B containing the axis of rotation of the rotary member 1.

Figure 3:
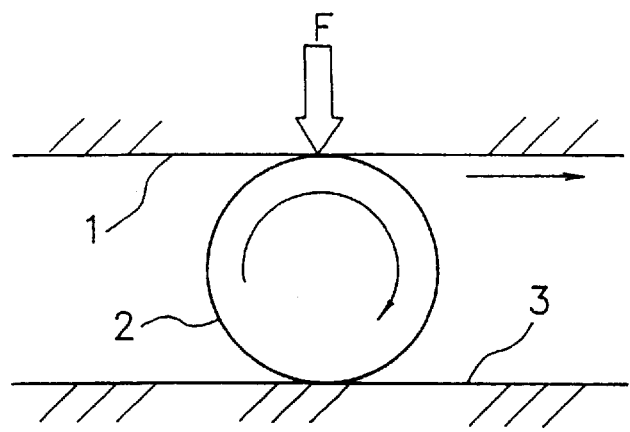
FIG. 3 and FIG. 4 are explanatory drawings indicating movements occurring in the first preferred embodiment of this invention.
Figure 4:
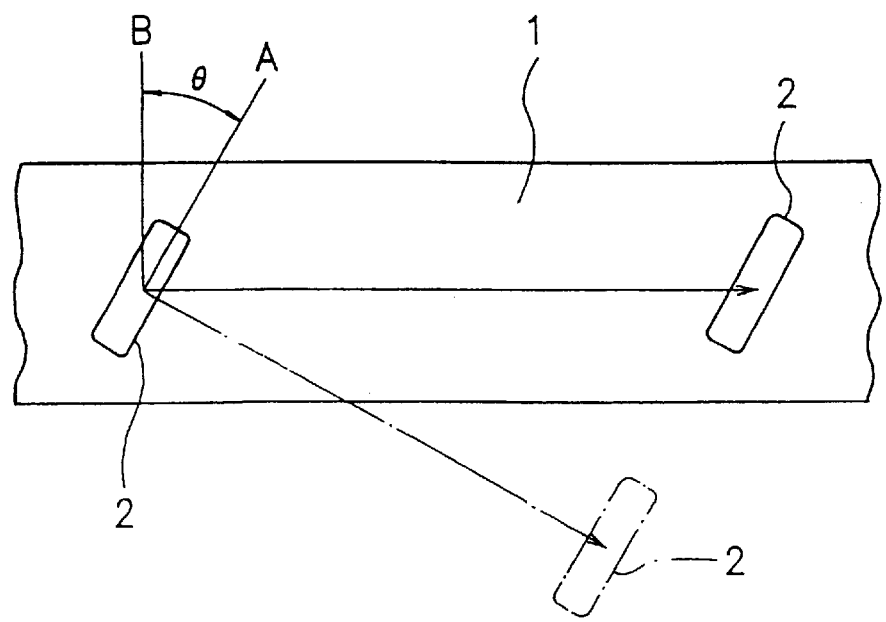

With the friction resistance generator of the aforementioned structure, as shown in FIG. 3, when the rotary member 1 is rotated while applying a load F toward the axial direction, respective rollers 2 make rolling motions being in contact with the rotary member 1 and the passive member 3, thereby the cage 4 also makes trailing rotation. At that time, as shown in FIG. 4, since the rollers 2 are forced to move along the track of rotation of the rotary member 1(in the direction of the solid line) while their motivation to roll toward a direction inclined by angle θ from the track of rotation (in the direction of alternate long and short dash line) of the rotary member 1 are restricted by the cage 4, frictional force commensurate with the load F to the axial direction occurs between respective rollers 2 and the rotary member 1 and between the respective rollers 2 and the passive member 3. At this time, since the rollers 2 slide while making rolling motions, sliding friction and rolling friction become combined to cause more stable resistance force.

Thus, with the friction resistance generator of the first embodiment, since the axes of rolling of respective rollers 2 are inclined by a prescribed angle from the plane containing the axis of rotation of the rotary member 1, the rolling movement of respective rollers 2 causes combined sliding friction and rolling friction, thereby making it possible to apply discretionary resistance force to the rotary movement of the rotary member 1 in proportion to the load applied to the axial direction and, moreover, by varying the magnitude of the load applied to the axial direction, the resistance against the rotary member 1 can be controlled very easily. At this time, since said sliding friction occurs while the rollers 2 are making rolling motions, static friction which causes the stick-slip phenomenon does not occur, thus providing always stable resistance force. Also, by optional setting of the inclination angle θ of the axes of rolling of respective rollers 2, frictional force of discretionary magnitude fitting to respective purposes can be accurately obtained.

Figure 5:
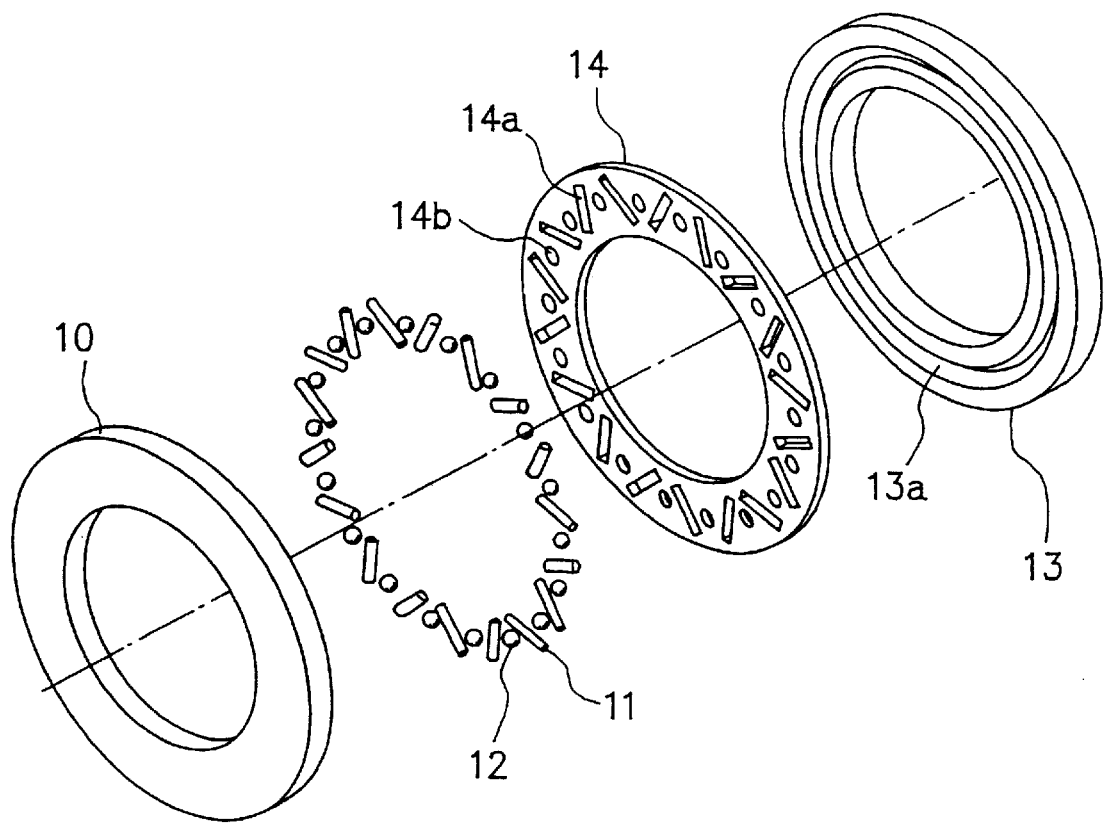
FIG. 5 is an exploded perspective view of a friction resistance generator of a second preferred embodiment of this invention.
Figure 6A:
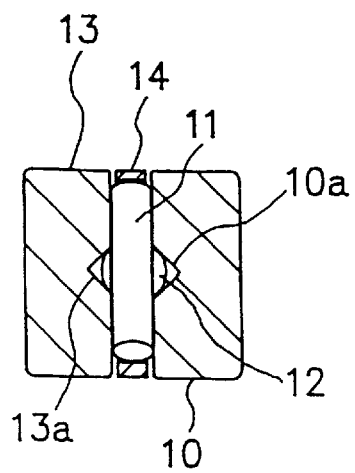
FIG. 6a and 6b show partial enlarged views of the drawing in FIG. 5.
Figure 6B:
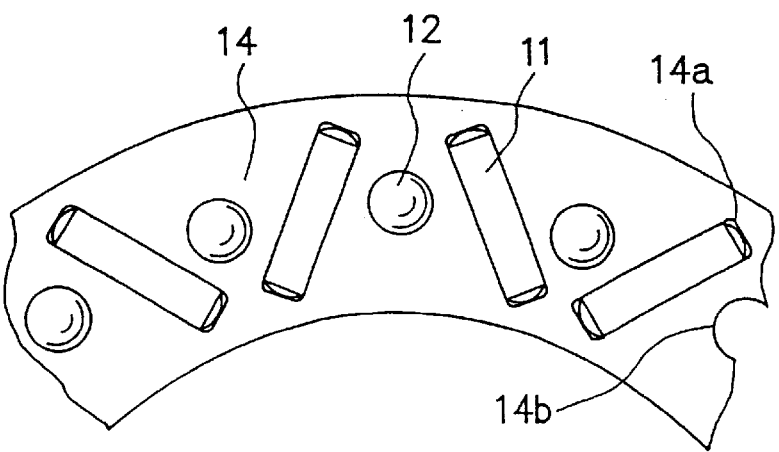

FIG. 5 and FIG. 6 show a second preferred embodiment of this invention: FIG. 5 being an exploded perspective view of a friction resistance generator of the second preferred embodiment; FIG. 6(a) being a partial enlarged view of a cross-section in the radial direction of the drawing in FIG. 5; and FIG. 6(b) being a partial enlarged view of a portion seen from the axial direction of the drawing in FIG. 5.

The friction resistance generator comprises a rotary member 10 rotating on its axis of rotation, numerous rollers 11 disposed along a track of rotation of the rotary member 10, numerous balls 12 similarly disposed along the track of rotation of the rotary member 10, a passive member 13 which coaxially faces the rotary member 10 across the rollers 11 and the balls 12, and a cage 14 which maintains the rollers 11 and the balls 12 individually at prescribed intervals in freely rotatable state.

The rotary member 10 is in the form of a ring shape and its surface facing the passive member 13 is a flat plane. Also, in the flat plane of the rotary member 10, a circular groove 10a having a V-shaped cross-section is provided in continuation along the peripheral direction and the balls 12 are individually engaging with the circular groove 10a in freely rotatable state.

The rollers 11 are in the form of an cylindrical shape extending straight in their axial direction and disposed at equal intervals along the peripheral direction of the rotary member 10. Also, both ends of the rollers 11 are rounded to a hemi-spherical shape to lessen friction occurring between the rollers 11 and the cage 14.

The balls 12 are disposed along the peripheral direction of the rotary member 10, being located alternately between each roller 11.

The passive member 13 is also in the form of a ring shape and the surface facing the rotary member 10 is a flat plane. In the flat plane of the passive member 13, similar to the aforesaid rotary member 10, a circular groove 13a having a V-shaped cross-section is provided in continuation along its peripheral direction and the balls 12 are engaging individually with the groove 13a.

The cage 14 is in the form of a ring shape and its thickness in the axial direction is made thinner than the outer diameter of the rollers 11. The cage 14 is provided with numerous slots 14a to maintain the rollers 11 individually and numerous holes 14b to maintain the balls 12 individually. Each roller 11 is maintained in each slot 14a and each ball 12 is maintained in each hole 14b in freely rotatable state. The slots 14a for the rollers 11 are so disposed that axes of rolling of the rollers 11 are inclined to make a prescribed angle to a plane containing the axis of rotation of the rotary member 10, but toward opposite directions alternately.

With the friction resistance generator of the second embodiment, since the balls 12 are engaging individually with the circular grooves 10a and 13a of the rotary member 10 and passive member 13, respectively, there is no fear of displacement between the rotary member 10 and the passive member 13 in the radial direction. In this instance, the balls 12 are engaging with the circular grooves 10a and 13a with slight clearance in order not to interfere the contacts between the rollers 11 and the rotary member 10 and between the rollers 11 and the passive member 13. Also, since respective rollers 11 are inclined toward the opposite directions alternately, their resistance characteristics remain always same in either direction of rotation of the rotary member 10. Meanwhile, the principle of occurrence of the frictional force is the same as the preceding preferred embodiment of this invention.

Figure 7:
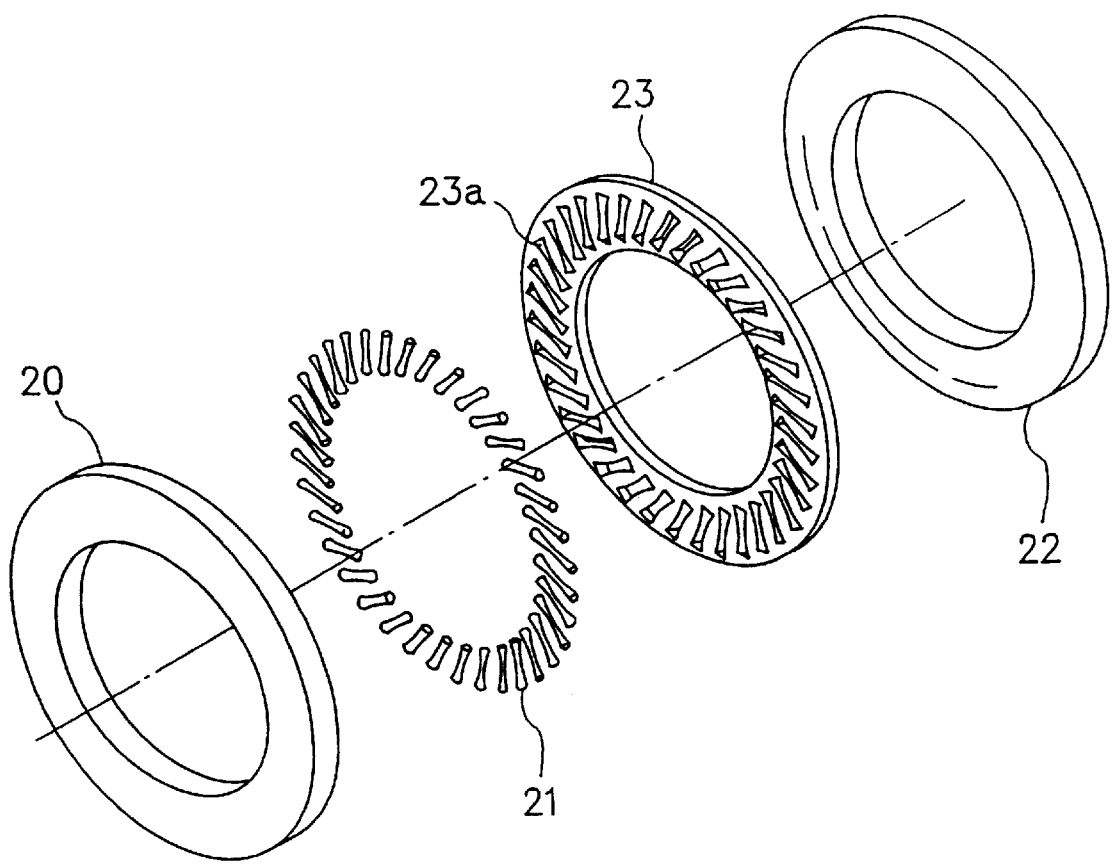
FIG. 7 is an exploded perspective view of a friction resistance generate of a third preferred embodiment of this invention.
Figure 8A:
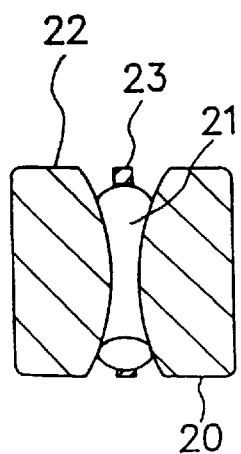
FIG. 8a and 8b show partial enlarged views of the drawing in FIG. 7.
Figure 8B:
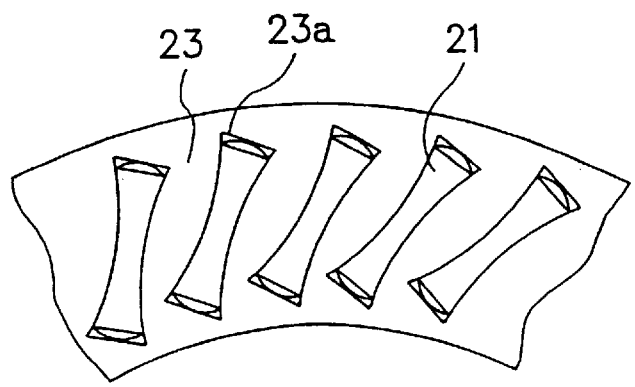

FIG. 7 and FIG. 8 show a third preferred embodiment of this invention: FIG. 7 being an exploded perspective view of a friction resistance generator of the third preferred embodiment; FIG. 8(a) being a partial enlarged view of a cross-section in the radial direction of the drawing in FIG. 7; and FIG. 8(b) being a partial enlarged view of a portion seen from the axial direction of the drawing in FIG. 7.

The friction resistance generator comprises a rotary member 20 rotating on its axis of rotation, numerous rollers 21 disposed along a track of rotation of the rotary member 20, a passive member 22 which coaxially faces the rotary member 20 across the rollers 21, and a cage 23 which maintains the rollers 21 at prescribed intervals in freely rotatable state.

The rotary member 20 is in the form of a ring shape and, as shown in FIG. 8(a), its surface facing the passive member 22 is a rounded convex face in radial cross sections.

The numerous rollers 21 are disposed at equal intervals along the peripheral direction of the rotary member 20 and their profile is such that the narrowed central part widens toward both ends gradually. Also, both ends of the rollers 21 are rounded to a hemi-spherical shape to lessen friction occurring between the rollers 21 and the cage 23.

The passive member 22 is in the form of a ring shape and its surface facing the rotary member 20 is a rounded convex face in radial cross sections, similar to the surface of the rotary member 20.

The cage 23 is in the form of a ring shape and its thickness in the axial direction is made thinner than the outer diameter of the rollers 21. The cage 23 is provided with numerous slots 23a to maintain the rollers 21. Each roller 21 is maintained in each slot 23a in freely rotatable state. Also, the slots 23a are so disposed that each axis of rolling of each roller 21 is inclined by a prescribed angle to a plane containing the axis of rotation of the rotary member 20.

With the friction resistance generator of the third embodiment, since the peripheral surfaces of the rollers 21 are so shaped to properly fit to the rounded convex surface of the rotary member 20 and the passive member 22, occurrences of displacement in its axial direction of each roller 21 can be restricted, thereby preventing displacements in the radial direction between the rotary member 20 and the passive member 22. Also, the restriction against motions of the rollers 21 toward their axial direction by their center-narrowed profile and the effect of varying outer diameter toward both ends along the axial direction of each roller 21 produce extra frictional force, thereby providing greater resistance force.

Figure 9:
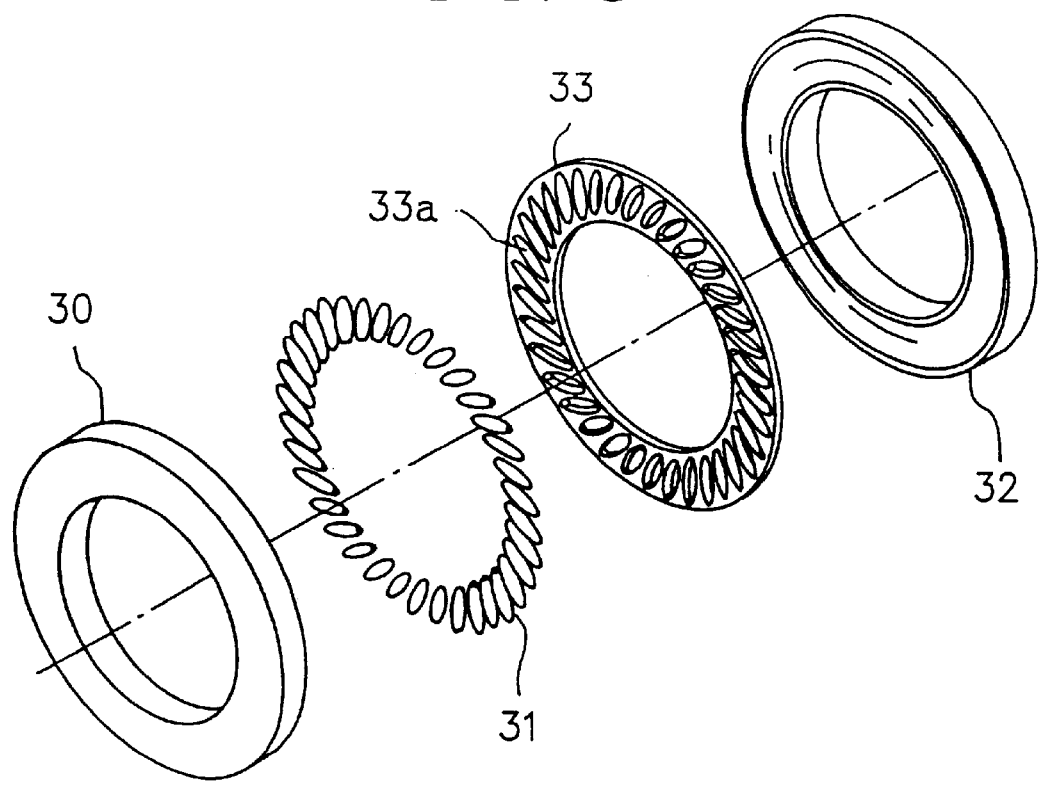
FIG. 9 is an exploded perspective view of a friction resistance generator of a fourth preferred embodiment of this invention.
Figure 10A:
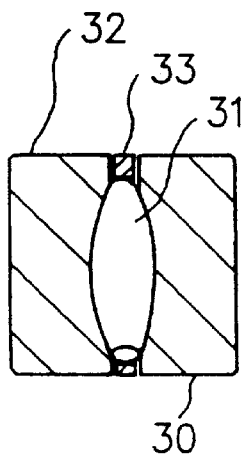
FIG. 10a and 10b show partial enlarged views of the drawing in FIG. 9.
Figure 10B:
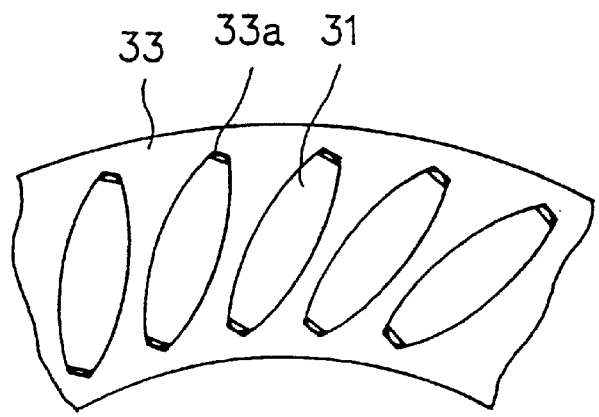
Figure 12A:
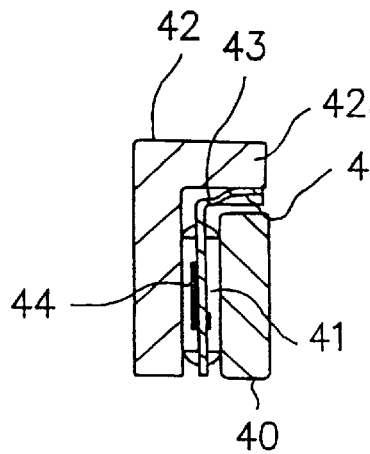
FIG. 12a and 12b show partial enlarged views of the drawing in FIG. 11.
Figure 12B:
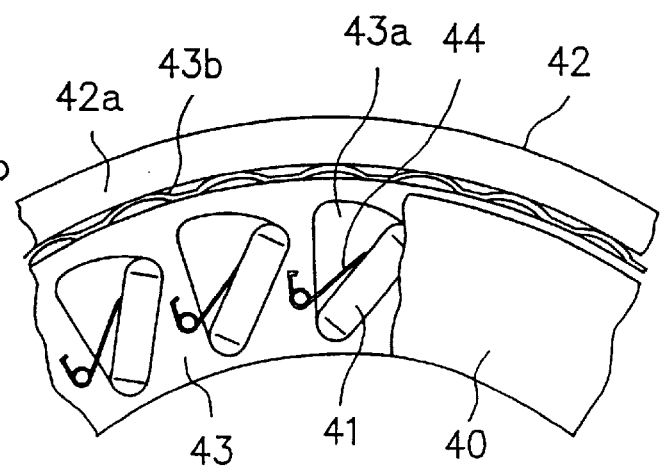

FIG. 9 and FIG. 10 show a fourth preferred embodiment of this invention: FIG. 9 being an exploded perspective view of a friction resistance generator of the fourth preferred embodiment; FIG. 10(a) being a partial enlarged view of a cross-section in the radial direction of the drawing in FIG. 9; and FIG. 10(b) being a partial enlarged view of a portion seen from the axial direction of the drawing in FIG. 9.

The friction resistance generator comprises a rotary member 30 rotating on its axis of rotation, numerous rollers 31 disposed along a track of rotation of the rotary member 30, a passive member 32 which coaxially faces the rotary member 30 across the rollers 31, and a cage 33 which maintains the rollers 31 at equal intervals in freely rotatable state.

The rotary member 30 is in the form of a ring shape and, as shown in FIG. 10(a), its surface facing the passive member 32 is a rounded concave shape in radial cross sections.

The numerous rollers 31 are disposed at equal intervals along the peripheral direction of the rotary member 30 and their profile is such that the thickened central part narrows toward both ends gradually. Also, both ends of the rollers 31 are rounded to a hemi-spherical shape to lessen friction occurring between the rollers 31 and the cage 33.

The passive member 32 is in the form of a ring shape and, similar to the rotary member 30, its surface facing the rotary member 30 is a rounded concave shape in radial cross sections.

The cage 33 is in the form of a ring shape and its thickness in the axial direction is made thinner than the outer diameter of the rollers 31. The cage 33 is provided with numerous slots 33a to maintain the rollers 31. Each roller 31 is maintained in each slot 33a in freely rotatable state. Also, the slots 33a are so disposed that each axis of rolling of each roller is inclined by a prescribed angle to a plane containing the axis of rotation of the rotary member 30.

FIG. 11 to FIG. 14 show a fifth preferred embodiment of this invention: FIG. 11 being an exploded perspective view of a friction resistance generator of the fifth preferred embodiment; FIG. 12(a) being a partial enlarged view of a cross-section in the radial direction of the drawing in FIG. 11; and FIG. 12(b) being a partial enlarged view of a portion seen from the axial direction of the drawing in FIG. 11.

The friction resistance generator comprises a rotary member 40 rotating on its axis of rotation, numerous rollers 41 disposed along a track of rotation of the rotary member 40, a passive member 41 coaxially facing the rotary member 40 across the rollers 41, a cage 43 which maintains the rollers 41 at equal intervals in freely rotatable state, and numerous springs 44 which push respective rollers 41 toward a prescribed peripheral direction of the rotary member 40.

The rotary member 40 is in the form of a ring shape and its surface facing the passive member 42 is a flat plane.

The numerous rollers 41 are in the form of a cylindrical shape extending straight in their axial direction and disposed at equal intervals along the peripheral direction of the rotary member 40. Also, both ends of the rollers 41 are rounded to a hemi-spherical shape to lessen friction occurring between the rollers 41 and the cage 43.

The passive member 42 is in the form of a ring shape and its surface facing the rotary member 40 is a flat plane. Also, around the periphery of the passive member 42, a flange 42a to cover up the peripheral surface of the rotary member 40 is provided.

The cage 43 is in the form of a ring shape and its thickness in the axial direction is made thinner than the outer diameter of the rollers 41. The cage 43 is provided with numerous openings 43a to maintain the rollers 41. Each roller 41 is maintained in each opening 43a in freely rotatable state. Each opening 43a is in the form of a fan-shape with its pivot matching to the position of one end of each roller 41. One side of each opening 43a extending from the pivot is designed in parallel with a plane containing the axis of rotation of the rotary member 40 and the other side of each opening 43a extending from the pivot is designed to incline by a prescribed angle to a plane containing the axis of rotation of the rotary member 40. Also, numerous elastic convexities 43b forming a corrugated ring are provided around the periphery of the cage 43. The numerous elastic convexities 4b are placed in elastically compressed contact with the inner peripheral surface of the flange 42a of the passive member 42.

The springs 44 are attached beside respective openings 43a of the cage 43. One end of each spring 44 is fastened to the cage 43, and the other end of each spring 44 abuts to each roller 41, thereby pushing the rollers 41 to a position maintaining an inclination to the track of rotation of the rotary member 40.

Figure 13:
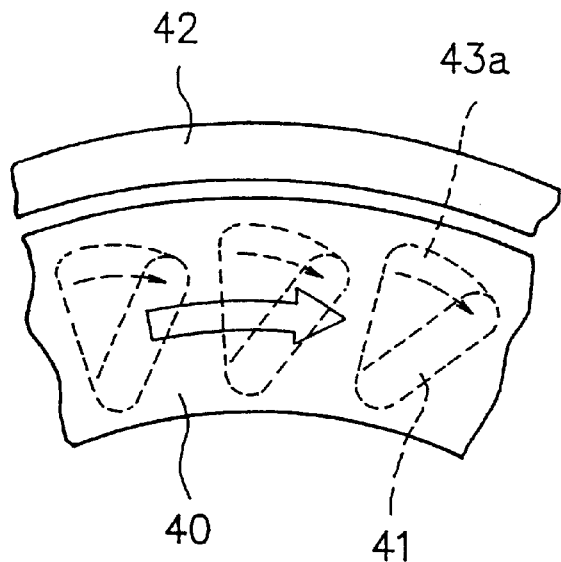
FIG. 13 and FIG. 14 are explanatory drawings indicating movement occurring in the fifth preferred embodiment of this invention.

With the friction resistance generator of the aforementioned structure, as shown in FIG. 13, when the rotary member 40 is rotated in a prescribed direction (clockwise in the drawing) while applying a load in the axial direction, respective rollers 41 make rolling motions being in contact with the rotary member 40 and the passive member 42, consequently the cage 43 trails to rotate together. At that time, since respective rollers 41 are motivated to roll toward a direction being inclined from the track of rotation of the rotary member 40, similar to the case of the preceding preferred embodiment, a frictional force in proportion to the magnitude of the load applied toward the axial direction occurs between the rollers 41 and the rotary member 40 and between the rollers 41 and the passive member 42.

Figure 14:
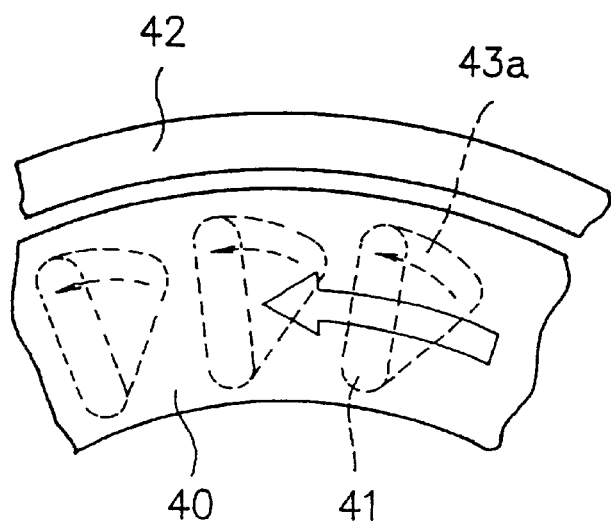

Also, as shown in FIG. 14, when the rotary member 40 is rotated toward the opposite direction (counter-clockwise in the drawing), respective rollers 41 make rolling motions being in contact with the rotary member 40 and with the passive member 42 and, at the same time, they tilt their position inside respective openings 43a of the cage 43 and the axes of rolling of respective rollers 41 come in parallel with a plane containing the axis of rotation of the rotary member 40.

When this happens, since the axes of rolling of respective rollers 41 are not inclined to the track of rotation of the rotary member 40, sliding friction does not occur with respective rollers 41, thus allowing the rotary member 40 to rotate smoothly.

Also, since the elastic convexities 43b being provided around the periphery of the cage 43 is in compressed contact with the flange 42a of the passive member 42, when the direction of rotation is changed, respective rollers 41 are prompted to tilt their position to the other side of the openings 43a inasmuch as the cage 43 always remain retarded from the rolling motion of respective rollers 41 due to the contact resistance with the passive member 42. Moreover, since respective rollers 41 are always motivated to stay at the position not making inclination to the track of rotation of the rotary member 40 whichever the direction of rotation may be, respective rollers 41 are tilted forcefully by respective springs 44 when the direction of rotation is turned to the direction wherein application of a resistance is required.

Thus, with the friction resistance generator of the fifth embodiment, since respective rollers 41 are so designed to tilt between the direction where the axes of rolling of the rollers 41 come in parallel with the plane containing the axis of rotation of the rotary member 40 and the direction where the axes of rolling of the rollers 41 become inclined to the axis of rotation of the rotary member 40, resistance occurring from the frictional force of respective rollers 41 can be exerted to the rotation of the rotary member 40 in one direction of rotation and smooth rotation can be acquired in the other direction of rotation.

Figure 15:
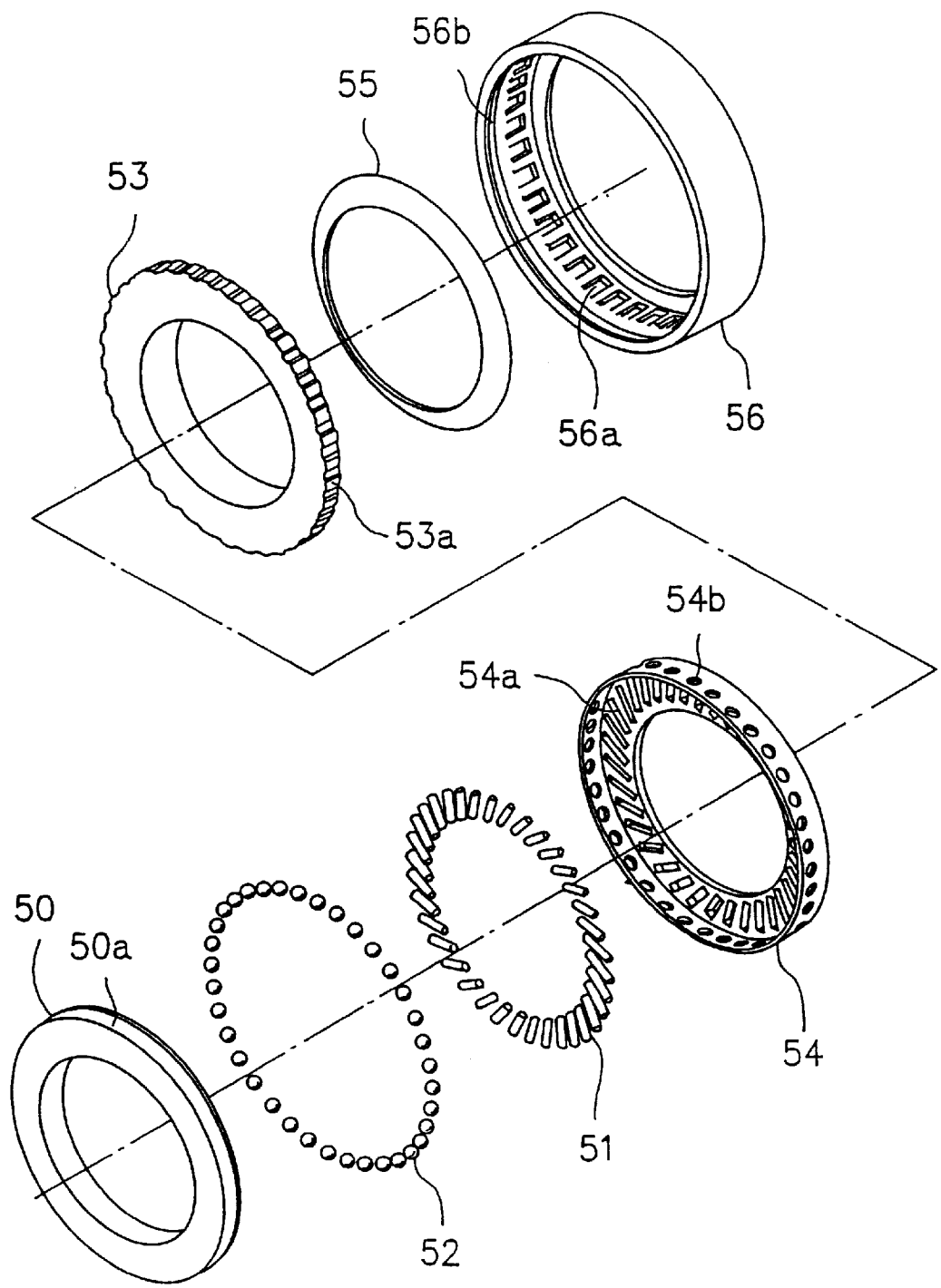
FIG. 15 is an exploded perspective view of a friction resistance generator of a sixth preferred embodiment of this invention.
Figure 16A:
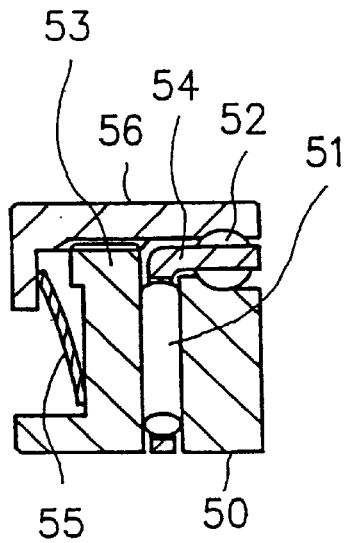
FIG. 16a and 16b show partial enlarged views of the drawing in FIG. 15.
Figure 16B:
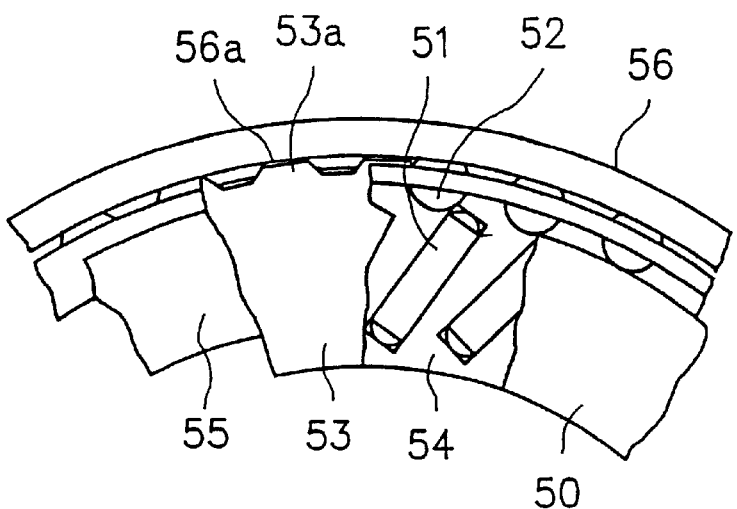

FIG. 15 and FIG. 16 show a sixth preferred embodiment of this invention: FIG. 15 being an exploded perspective view of a friction resistance generator of the sixth preferred embodiment; FIG. 16(a) being a partial enlarged view of a cross-section in the radial direction of the drawing in FIG. 15; and FIG. 16(b) being a partial enlarged view of a portion seen from the axial direction of the drawing in FIG. 15.

The friction resistance generator comprises a rotary member 50 rotating on its axis of rotation, numerous rollers 51 being disposed along a track of rotation of the rotary member 50, numerous balls 52 being similarly disposed along the track of rotation of the rotary member 50, a passive member 53 coaxially facing the rotary member 50 across the numerous rollers 51, a cage 54 which maintains the rollers 51 and the balls 52 at prescribed intervals in freely rotatable state, a disc spring 55 which pushes the rotary member 50 toward the axial direction as a pre-loading means, and a housing 56 to house all these parts.

The rotary member 50 is in the form of a ring shape and its surface facing the passive member 53 is a flat plane. Also, around the periphery of the rotary member 50, a guide flange 50a is provided wherewith the outer diameter of the passive member 53 side is made slightly larger than the outer diameter of the other side. The balls 52 are engaging with the guide flange 50a in freely rotatable state.

The rollers 51 are in the form of a cylindrical shape extending straight in the axial direction and they are disposed at equal intervals along the peripheral direction of the rotary member 50. Also, both ends of the rollers 51 are rounded to a hemi-spherical shape to lessen friction occurring between the rollers 51 and the cage 53.

The balls 52 are disposed between the outer peripheral surface of the rotary member 50 and the housing 56 at equal intervals along the peripheral direction of the rotary member 50.

The passive member 53 is in the form of a ring shape and its surface facing the rotary member 50 is a flat plane. Also, around the periphery of the passive member 53, numerous keys 53a extending toward the axial direction are provided at prescribed intervals along the peripheral direction.

The cage 54 is in the form of a ring shape and its thickness in the axial direction is made thinner than the outer diameter of the rollers 51. The cage 54 is provided with numerous slots 54a to maintain the rollers 51. Each roller 51 is maintained in each slot 54a in freely rotatable state. Also, the slots 54a are so disposed that the axes of rolling of the rollers 51 become inclined by a prescribed angle to a plain containing the axis of rotation of the rotary member 50. Also, around the periphery of the cage 54, numerous holes 54b to maintain the balls 52 are provided. Each hole 54b is maintaining each ball 52 in freely rotatable state.

The disc spring 55 is inserted in compressed state between the passive member 53 and the inside of the housing 56, thus pushing the passive member 53 toward the rotary member 50 side constantly with a certain springing force.

The housing 56 is in the form of a cylindrical shape and numerous key grooves 56a which engage with the keys 53a of the passive member 53 are provided on the inner peripheral surface of the housing 56. Also, a ring groove 56b in continuation around the inner periphery is provided in the inner peripheral surface of the housing 56 with which the balls 52 are individually engaging in freely rotatable state. Namely, inside the housing 56, as shown in FIG. 16(a), the passive member 53 is housed in a compressed state toward the rotary member 50 side by function of the disc spring 55 and, at the same time, the balls 52 being maintained individually by the cage 54 are engaging with the ring groove 56b provided in the bore surface of the housing 56 and the guide flange 50a of the rotary member 50. By this structure, dislocation toward the outside of the axial direction of the rotary member 50 is restricted, thus the rotary member 50 and the passive member 52 are compressed to each other across the rollers 51 under a certain pressure.

With the friction resistance generator of the aforementioned structure, the frictional force occurring from respective rollers 51 can always keep at a certain level by the pre-load applied to the rotary member 50. Also, by application of a load in the axial direction to the rotary member 50, in addition to the pre-load of the disc spring 55, the frictional force can be optionally augmented.

Figure 17A:
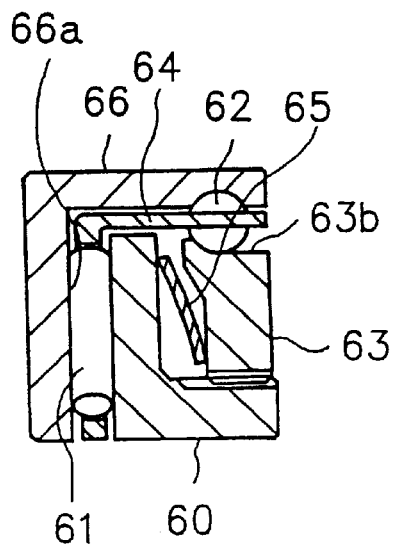
FIG. 17a and 17b show partial enlarged views of a friction resistance generator of a seventh preferred embodiment of this invention.
Figure 17B:
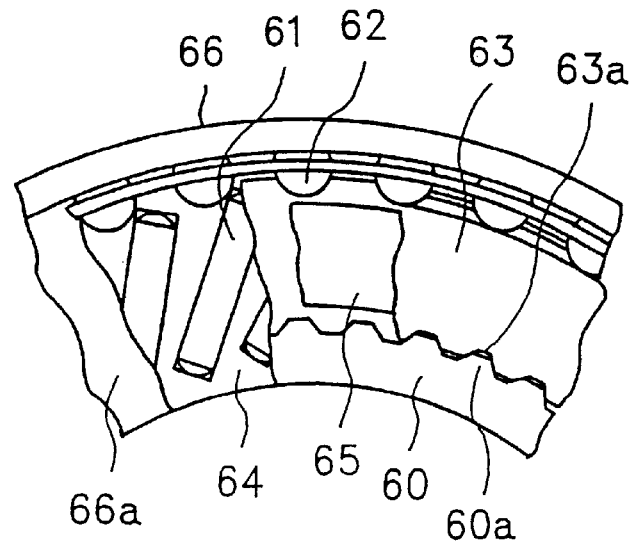

FIG. 17 represents a seventh preferred embodiment of this invention: FIG. 17(a) being a partial enlarged view of a cross-section in the radial direction of a friction resistance generator of the seventh preferred embodiment; and FIG. 17(b) being a partial enlarged view of a portion seen from the axial direction of the friction resistance generator.

The friction resistance generator comprises a rotary member 60 rotating on its axis of rotation, numerous rollers 61 disposed along a track of rotation of the rotary member 60, numerous balls 62 similarly disposed along the track of rotation of the rotary member 60, a guide ring 63 which rotates integrally with the rotary member 60, a cage 64 which maintains the rollers 61 and the balls 62 at prescribed intervals in freely rotatable state, a disc spring 65 which works as a pre-loading means to push the rotary member 60 toward the axial direction, and a housing 66 to house all these parts.

The rotary member 60 is in the form of a ring shape and its surface on one side is a flat plane. Also, the other surface side of the rotary member 60 is provided with a cylindrical structure. The outer peripheral surface of said cylindrical structure is provided with numerous keys 60a being formed at prescribed intervals in the peripheral direction.

The rollers 61 are in the form of a cylindrical shape extending straight in the axial direction and they are disposed at equal intervals along the peripheral direction of the rotary member 60. Also, both ends of the rollers 61 are rounded to a hemi-spherical shape to lessen friction occurring between the rollers 61 and the cage 63.

The balls 62 are located between the outer peripheral surface of the guide ring 63 and the inner peripheral surface of the housing 66 at equal intervals along the peripheral direction of the rotary member 60.

The guide ring 63 is in the form of a ring shape and in its inner peripheral surface, numerous key grooves 63a to engage with the keys 60a of the rotary member 60 are provided. Also, the external periphery of the guide ring 63 is formed into a guide surface 63b wherewith the outer diameter at the rotary member 60 side is made slightly larger than the remaining sections. The balls 62 are engaging with the guide surface 63b in freely rotatable state.

The cage 64 is in the form of a ring shape and its thickness in the axial direction is made thinner than the outer diameter of the rollers 61. The cage 64 is provided with numerous slots 64a to maintain the rollers 61. Each roller 61 is maintained in each slot 64a in freely rotatable state. Also, the slots 64a are so laid out that the each of rolling of each roller 61 becomes inclined by a prescribed angle to a plane containing the axis of rotation of the rotary member 60. Moreover, around the periphery of the cage 64, numerous holes 64b to maintain the balls 62 individually are provided. Each ball 62 is maintained in each hole 64b in freely rotatable state.

The disc spring 65 is inserted in compressed state between the rotary member 60 and the inside of the guide ring 63, thus pushing the rotary member 60 toward the housing 66 side constantly with a certain springing force.

The housing 66 is in the form of a cylindrical shape and its inside surface facing the rotary member 60 is formed to become a passive surface 66a. Also, a ring groove 66b in continuation around peripheral direction is provided in the inner peripheral surface of the housing 66 with which the balls 62 are individually engaging in freely rotatable state. Namely, in the housing 66, as shown in FIG. 17(a), the rotary member 60 is housed in a state being compressed toward the passive surface 66a side by the function of the disc spring 65 and, at the same time, the balls 62 being maintained by the cage 64 are engaging with the ring groove 66b provided in the bore surface of the housing 66 and the guide surface 63b of the guide ring 63. By this structure, dislocation toward the outside of the axial direction of the rotary member 60 is restricted, thus the rotary member 60 is compressed to the passive surface 66a of the housing 66 across the balls 61 under a certain force.

Figure 18:
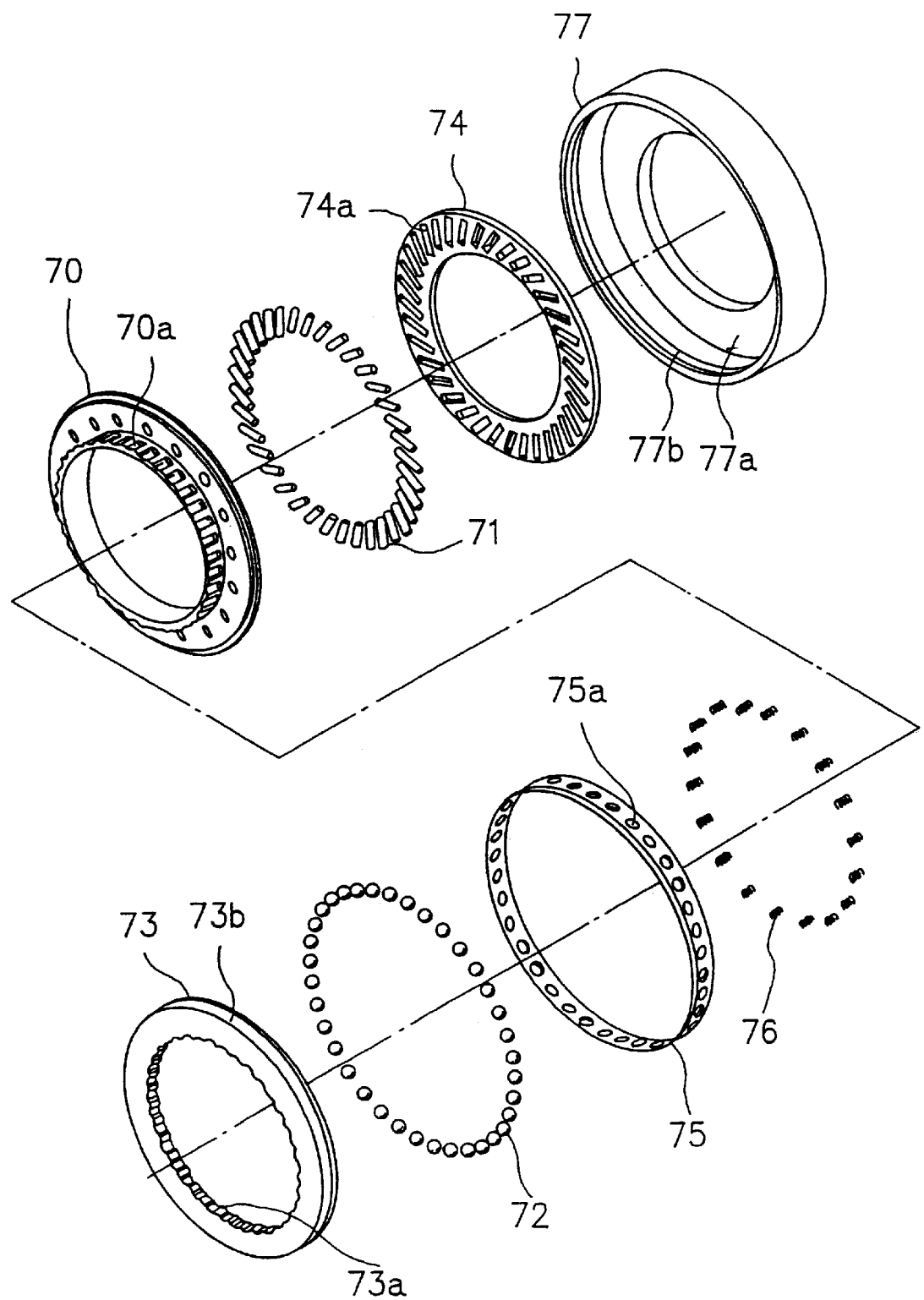
FIG. 18 is an exploded perspective view of a friction resistance generator of a eighth preferred embodiment of this invention.

FIG. 18 and FIG. 19 show an eighth preferred embodiment of this invention: FIG. 18 being an exploded perspective view of a friction resistance generator of the eighth preferred embodiment; FIG. 19(a) being a partial enlarged view of a cross-section in the radial direction of the drawing in FIG. 18; and FIG. 19(b) being a partial enlarged view of a portion seen from the axial direction of the drawing in FIG. 18.

The friction resistance generator comprises a rotary member 70 rotating on its axis of rotation, numerous rollers 71 disposed along a track of rotation of the rotary member 70, numerous balls 72 similarly disposed along the track of rotation of the rotary member 70, a guide ring 73 which rotates integrally with the rotary member 70, a roller cage 74 which maintains the rollers 71 at prescribed intervals in freely rotatable state, a ball cage 75 which maintains the balls 72 at prescribed intervals in freely rotatable state, numerous coil springs 76 which work as a pre-loading means to push the rotary member 70 toward the axial direction, and a housing 77 which houses all these parts.

The rotary member 70 is in the form of a ring shape and its surface on one side is a flat plane. Also, the other surface side of the rotary member 70 is provided with a cylindrical structure. The outer periphery of said cylindrical structure is provided with numerous keys 70a being formed at prescribed intervals in the peripheral direction.

The rollers 71 are in the form of a cylindrical shape extending straight in the axial direction and they are disposed at equal intervals along the peripheral direction of the rotary member 70. Also, both ends of the rollers 71 are rounded to a hemi-spherical shape to lessen friction occurring between the rollers 71 and the cage 74.

The balls 72 are located between the outer periphery of the guide ring 73 and the inner periphery of the housing 77 at equal intervals along the peripheral direction of the rotary member 70.

The guide ring 73 is in the form of a ring shape and in its inner peripheral surface, numerous key grooves 73a to engage with keys 70a of the rotary member 70 are provided. Also, the external periphery of the guide ring 73 forms a guide surface 73b wherewith the outer diameter of the rotary member 70 side is made slightly larger than the remaining sections. The balls 72 are engaging with the guide surface 73b in freely rotatable state.

The roller cage 74 is in the form of a ring shape and its thickness in the axial direction is made thinner than the outer diameter of the rollers 71. The roller cage 74 is provided with numerous slots 74a to maintain the rollers 71. Each roller 71 is maintained in each slot 74a in freely rotatable state. Also, the slots 74a are so laid out that each axis of rolling of each roller 71 becomes inclined to a plane containing the axis of rotation of the rotary member 70.

The ball cage 75 is in the form of a ring shape and its thickness in the axial direction is made thinner than the outer diameter of the balls 72. The ball cage 75 is provided with numerous holes 75a to maintain the balls 72. Each ball 72 is maintained in each hole 75a in freely rotatable state.

The coil springs 76 are inserted in compressed state between the rotary member 70 and the inside of the guide ring 73, thus pushing the rotary member 70 toward the housing 77 side constantly with a certain springing force.

The housing 77 is in the form of a cylindrical shape and its inside surface facing the rotary member 70 is formed to become a passive surface 77a. Also, a ring groove 77b in continuation around the inner periphery is provided in the inner peripheral surface of the housing 77 with which the balls 72 are individually engaging in freely rotatable state.

Namely, in the housing 77, as shown in FIG. 19(a), the rotary member 70 is housed in a state being compressed toward the passive surface 77a side of the housing 77 by the function of the coil springs 76 and, at the same time, the balls 72 maintained by the ball cage 75 are engaging with the ring grooves 77b provided in the bore surface of the housing 77 and the guide surface 73b of the guide ring 73. By this structure, dislocation toward the outside of the axial direction of the rotary member 70 is restricted, thus the rotary member 70 is compressed to the passive surface 77a of the housing 77 across the rollers 71 under a certain force. Meanwhile, the motions occurring in the friction resistance generator of the eighth embodiment and effects thereof are the same as those of the preceding preferred embodiment of this invention.

Figure 20:
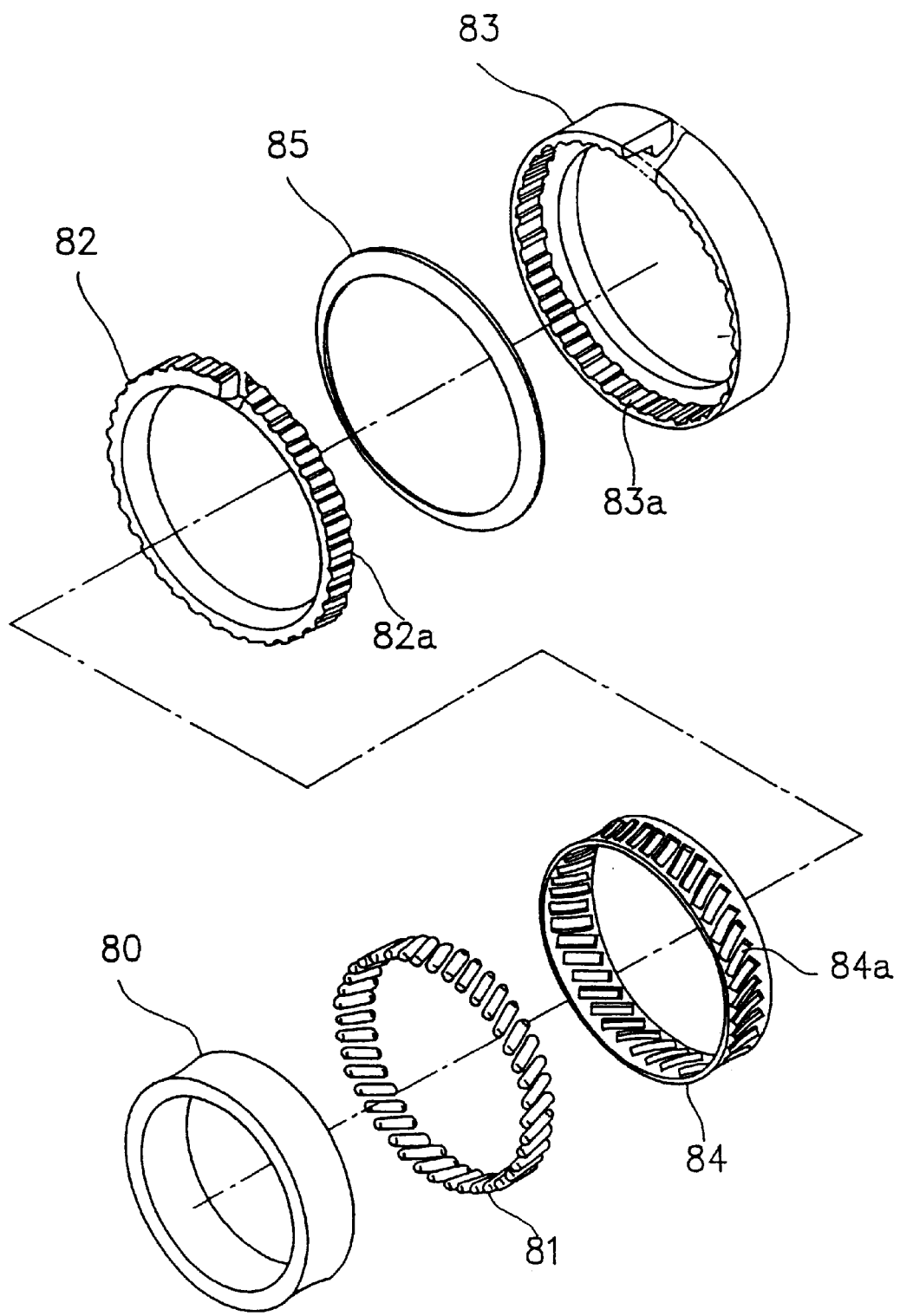
FIG. 20 is an exploded perspective view of a friction resistance generator of a ninth preferred embodiment of this invention.
Figure 21A:
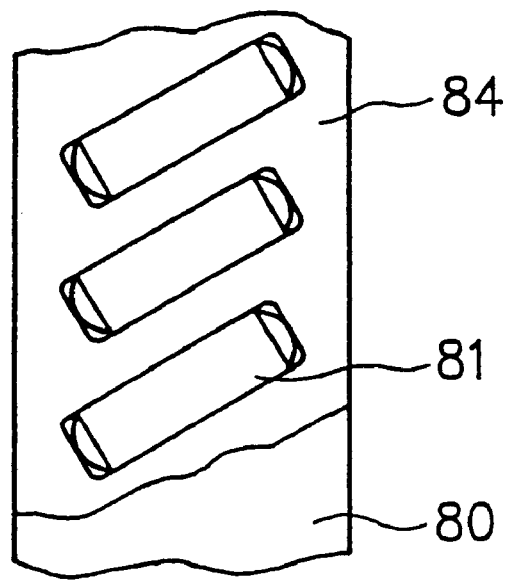
FIG. 21a and 21b show partial enlarged views of the drawing in FIG. 20.
Figure 21B:
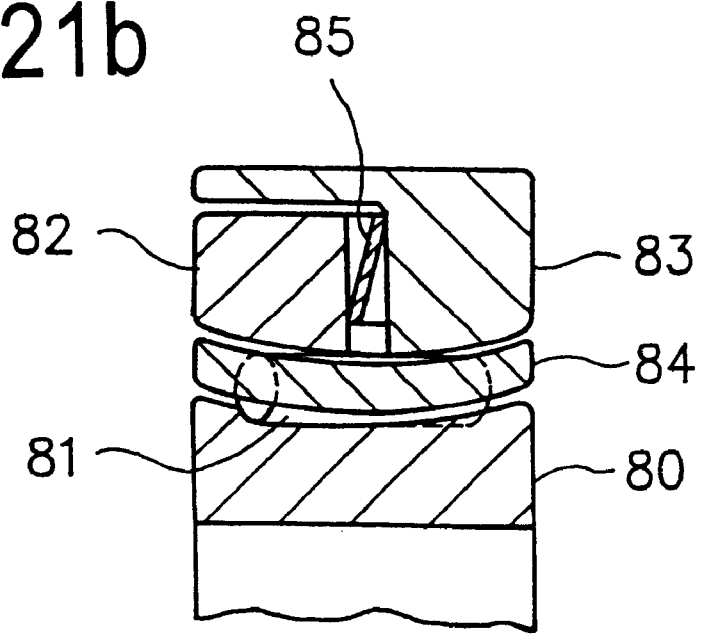

FIG. 20 and FIG. 21 show a ninth preferred embodiment of this invention: FIG. 20 being an exploded perspective view of a friction resistance generator of the ninth preferred embodiment; FIG. 21(a) being a partial enlarged view of a portion seen from the radial direction of the drawing in FIG. 20; and FIG. 21(b) being a partial enlarged view of a cross-section along the axial direction of the drawing in FIG. 20.

The friction resistance generator comprises a rotary member 80 rotating on its axis of rotation, numerous rollers 81 disposed along a track of rotation of the rotary member 80, a pair of passive member 82 and 83 covering the rotary member 80 from outside across the rollers 81, a cage 84 which maintains the rollers 81 at prescribed intervals in freely rotatable state, a disc spring 85 which works to apply pre-load from the rotary member 80 and from the passive members 82 and 83 to each roller 81.

The rotary member 80 is in the form of a ring shape and its peripheral surface facing the inner peripheral surfaces of the passive members 82 and 83 curves along the axial direction so that the outer diameter thereof gradually becomes smaller from both ends to its center in the axial direction.

The rollers 81 are in the form of a cylindrical shape and they are disposed at equal intervals in the peripheral direction of the rotary member 80. Also, both ends of the rollers 81 are rounded to a hemi-spherical shape to lessen friction occurring between the rollers 81 and the cage 84.

The passive members 82 and 83 are in the form of ring shapes and their surfaces facing the outer peripheral surface of the rotary member 80 curves along the passive surface of the rotary member 80. The passive members 82 and 83 are provided with numerous keys 82a and key grooves 83a extending toward the axial direction on their outer and inner periphery, respectively, and they are coupled by engagement of these keys 82a and key grooves 83a for free sliding in the axial direction.

The cage 84 is in the form of a ring shape and its peripheral surface curves along the axial direction so that its diameter becomes smaller from both ends to its center in the axial direction. The cage 84 is provided with numerous slots 84a to maintain the rollers 81 in freely rotatable state. Also, the slots 84a are so laid out that each axis of rolling of each roller 81 becomes inclined by a prescribed angle to a plane containing the axis of rotation of the rotary member 80.

The disc spring 85 is in the form of a ring shape being made of a disc shaped spring material having elasticity toward the axial direction. The disc spring 85 is inserted between the two passive members 82 and 83 in compressed state pushing the two passive members 82 and 83 toward the axial direction, respectively.

With the friction resistance generator of the ninth embodiment, when the rotary member 80 is rotated, the rollers 81 make rolling motions in contact with the rotary member 80 and with the two passive members 82 and 83, consequently the cage 84 also makes trailing rotation.

At that time, similar to the case of the preceding embodiment of this invention, since the rollers 81 are forced to move along the track of rotation of the rotary member 80 while their motivation to roll toward a direction being inclined by a prescribed angle from the track of rotation of the rotary member 80 are restricted by the cage 84, sliding friction occurs between the rollers 81 and the rotary member 80 and between the rollers 81 and the passive members 82 and 83.

At this time, since the two passive members 82 and 83 are motivated to move toward separating directions by the springing force of the disc spring 85, both ends of each roller 81 are pressed onto the rotary member 80. By occurrence of said movements, the rollers 81, the rotary member 80 and the passive members 82 and 83 are pressed toward each other, thus producing a certain frictional force in proportion to the magnitude of the pre-load applied by the disc spring 85.

Figure 22:
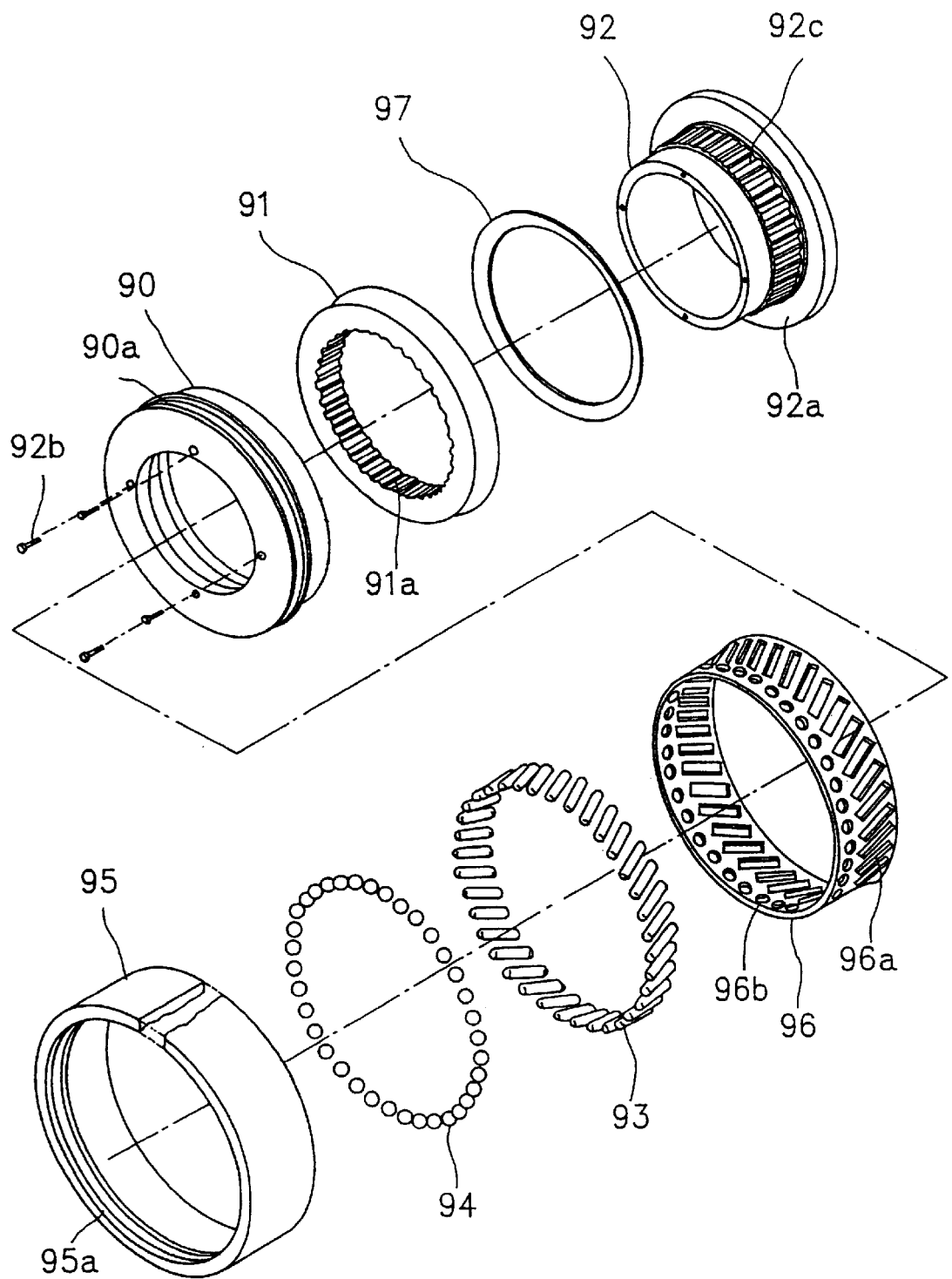
FIG. 22 is an exploded perspective view of a friction resistance generator of a tenth preferred embodiment of this invention.
Figure 23A:
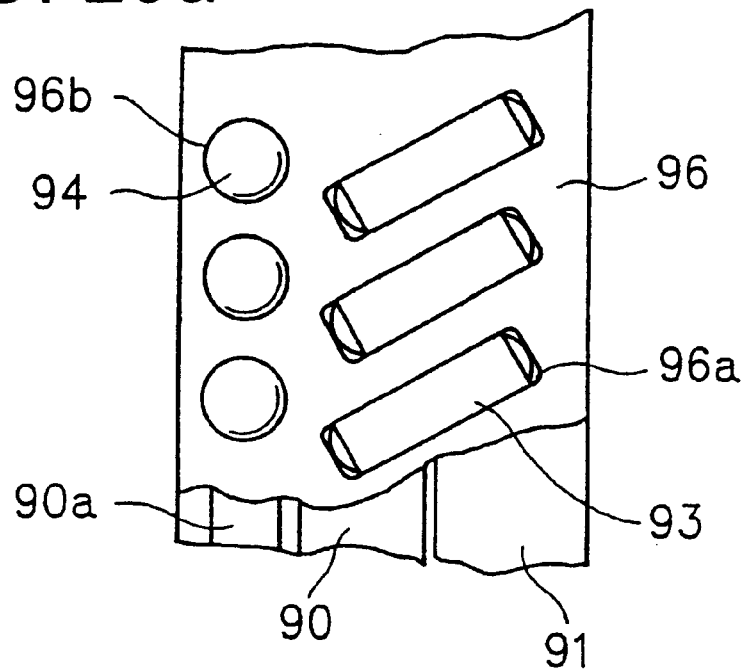
FIG. 23a and 23b show partial enlarged views of the drawing in FIG. 22.
Figure 23B:
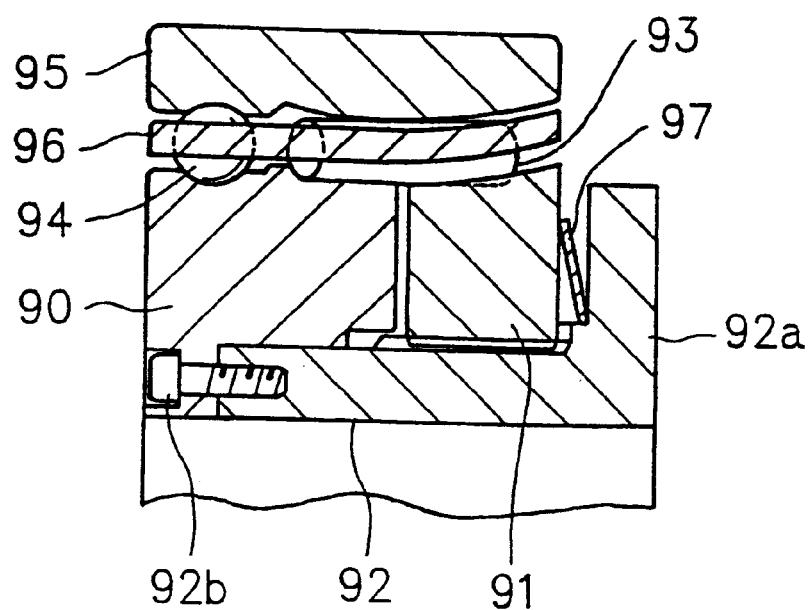

FIG. 22 and FIG. 23 show a tenth preferred embodiment of this invention: FIG. 22 being an exploded perspective view of a friction resistance generator of the tenth preferred embodiment; FIG. 23(a) being a partial enlarged view of a portion seen from the radial direction of the drawing in FIG. 22; and FIG. 23(b) being a partial enlarged view of a cross-section along the axial direction of the drawing in FIG. 22.

The friction resistance generator comprises a pair of rotary members 90 and 91 rotating on their axis of rotation, a guide ring 92 which maintains the rotary members 90 and 91, numerous rollers 93 disposed along a track of rotation of the rotary members 90 and 91, numerous balls 94 similarly disposed along the track of rotation of the rotary members 90 and 91, a passive member 95 which is positioned to cover the outer peripheries of the rotary members 90 and 91 across the rollers 93 and the balls 94, a cage 96 which maintains the rollers 93 and the balls 94 at prescribed intervals in freely rotatable state, and a disc spring 97 which works to apply pre-load from the rotary members 90 and 91 and from the passive member 95 to the rollers 93.

The rotary members 90 and 91 are in the form of ring shapes. A portion of the peripheral surface of one 90 of the pair of rotary members and the whole peripheral surface of the other rotary member 91 which face the bore surface of the passive member 95 are formed to a concave cross sectional shape along the axial direction. Also, in the remaining peripheral surface of the one 90 of the rotary members, a ring groove 90a is formed in continuation in the peripheral direction and the balls 94 are engaging with the ring groove 90a in freely rotatable state.

The guide ring 92 is in the form of a ring shape being provided with a flange 92a exerting outward at its one end. The guide ring 92 is located inside the rotary members 90 and 91, and one 90 of the pair of rotary members is fastened to the other end of the guide ring 92 by bolts 92b.

Also, in the outer periphery of the guide ring 92, numerous keys 92c extending toward the axial direction are formed, and in the inner periphery of the other rotary member 91, numerous key grooves 91a extending toward the axial direction are formed. The keys 92c and the key grooves 91a are engaging together to couple the guide ring 92 and the rotary member 91 for free slides in the axial direction.

The rollers 93 are in the form of a cylindrical shape being disposed at equal intervals along the peripheral direction of the rotary members 90 and 91. Also, both ends of the rollers 93 are rounded to a hemispherical shape to lessen frictional resistance occurring between the rollers 93 and the cage 96. The balls 94 are located between one 90 of the rotary members and the passive member 95 at equal intervals along the peripheral direction of the rotary members 90 and 91.

The passive member 95 is in the form of a ring shape, and a portion of its inner peripheral surface facing the combined concave surfaces including of the combination of a portion of the outer peripheral surface of one 90 of the pair of rotary members and the whole outer peripheral surface of the other rotary member 91 is formed to a convex cross sectional shape along the axial direction. In the remaining inner peripheral surface of the passive member 95, a ring groove 95a is formed in continuation in the peripheral direction. The balls 94 are engaging with the ring groove 95a in freely rotatable state.

The cage 96 is in the form of a ring shape and a portion facing the outer periphery of the other rotary member 91 of its bore surface is formed to a convex cross sectional shape along the outer periphery of the rotary member 91. Also, the cage 96 is provided with numerous slots 96a and numerous holes 96b to maintain the rollers 93 and the balls 94. Each roller 93 is maintained in each slot 96a and each ball 94 is maintained in each hole 96b, respectively. Also, the slots 96a are so laid out that each axis of rolling of each roller 93 becomes inclined by a prescribed angle to a plane containing the axis of rotation of the rotary members 90 and 91.

The disc spring 97 is in the form of a ring shape being made of a disc shaped spring material having elasticity toward the axial direction. The disc spring 97 is inserted between the rotary member 91 and the flange 92a of the guide ring 92 in compressed state, pushing the rotary member 91 toward the axial direction.

With the friction resistance generator of the tenth embodiment, since the rotary member 91 is motivated to approach the rotary member 90 by the springing force of the disc spring 97, thereby both ends of each roller 93 are depressed to the passive member 95. By occurrence of said movements, the rollers 93, the rotary members 90 and 91 and the passive member 95 are depressed each other, thus producing a certain frictional force in proportion to the magnitude of the pre-load applied by the disc spring 97, similar to the case of the preceding embodiment of this invention.

Also, since the balls 94 are engaging with respective ring grooves 90a and 95a of the rotary member 90 and the passive member 95, dislocations in the axial direction of the rotary members 90 and 91 and the passive member 95 are prevented.

Figure 24:
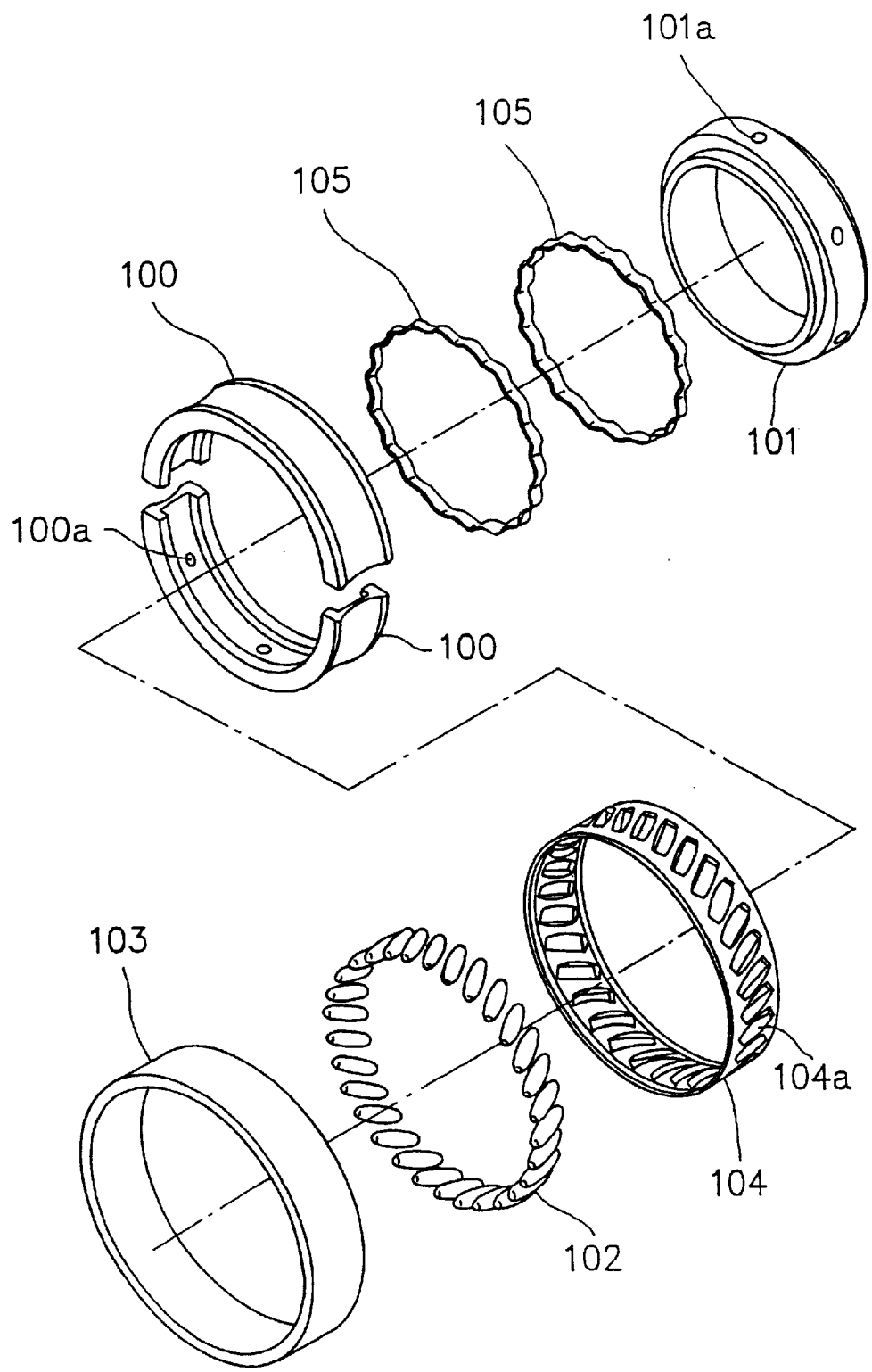
FIG. 24 is an exploded perspective view of a friction resistance generator of a eleventh preferred embodiment of this invention.
Figure 25A:
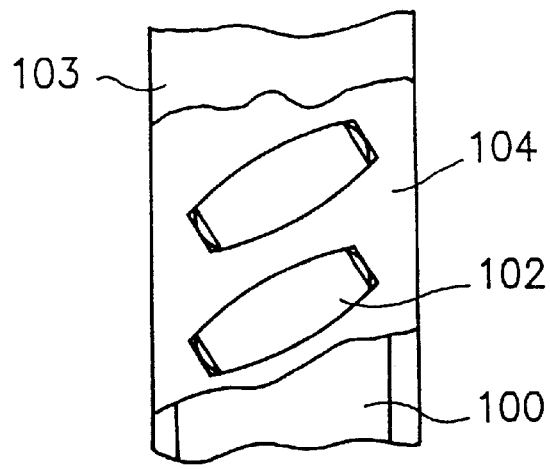
FIG. 25a, 25b and 25c show enlarged views if portions of the drawing in FIG. 24.
Figure 25B:
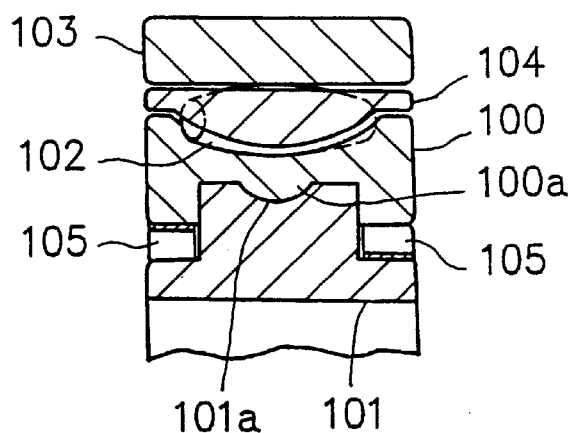
Figure 25C:
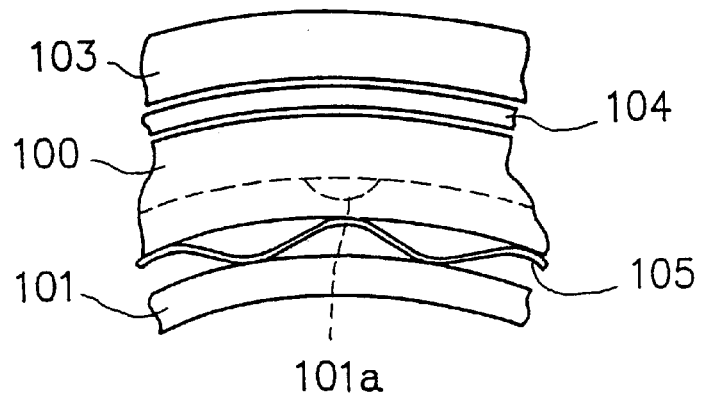

FIG. 24 and FIG. 25 show an eleventh preferred embodiment of this invention: FIG. 24 being an exploded perspective view of a friction resistance generator of the eleventh preferred embodiment; FIG. 25(a) being a partial enlarged view of a portion seen from the radial direction of the drawing in FIG. 24; FIG. 25(b) being a partial enlarged view of a cross section along the radial direction of the drawing in FIG. 24; and FIG. 25(c) being a partial enlarged view of a portion seen from the axial direction of the drawing in FIG. 24.

The friction resistance generator comprises a rotary member 100 rotating on its axis of rotation, a guide ring 101 which maintains the rotary member 100, numerous rollers 102 disposed along a track of rotation of the rotary member 100, a passive member 103 which is positioned to cover the outer periphery of the rotary member 100 across the rollers 102, a cage 104 which maintains the rollers 102 at prescribed intervals in freely rotatable state, a pair of ring springs 105 which work to apply pre-load from the rotary member 100 and the passive member 103 to the rollers 102.

The rotary member 100 is in the form of a split structure, into radially two halves, and its outer periphery facing the inner peripheral surface of the passive member 103 is formed to a concave cross sectional shape along the axial direction. Also, on the inner peripheral surface of the rotary member 100, plural projections 100a are provided at prescribed intervals along the peripheral direction.

The guide ring 101 is in the form of a ring shape and the rotary member 100 is installed around the outer periphery of the guide ring 101 in freely movable state in the radial direction. Also, around the outer peripheral surface of the guide ring 101, dents 101a mating the projections 100a of the rotary member 100 are provided.

The rollers 102 are disposed at equal intervals along the peripheral direction of the rotary member 100, and are in the form of a barrel shape, namely the largest outer diameter at the center gradually becomes smaller toward both ends. Also, both ends of the rollers 102 are rounded to a hemispherical shape to lessen frictional resistance occurring between the rollers 102 and the cage 104.

The passive member 103 is in the form of a ring shape carrying a flat cross sectional bore surface shape along the axial direction.

The cage 104 is in the form of a ring shape and its inner peripheral surface is formed to a convex cross sectional shape along the axial direction matching the concave cross sectional shape of the outer peripheral surface of the rotary member 100.

The cage 104 is provided with numerous slots 104a to maintain the rollers 102 in freely rotatable state, and the slots 104a are so laid out that the axes of rolling of the rollers 102 become inclined by a prescribed angle to a plane containing the axis of rotation of the rotary member 100.

The ring springs 105 are in the form of ring shapes being made of a wave-formed spring material having elasticity toward the radial directions. The ring springs 105 are inserted between the inner periphery of the rotary member 100 and the outer periphery of the short sleeves at both ends of the guide ring 101 in compressed state, pushing the rotary member 100 toward the outside in the radial direction.

With the friction resistance generator of the eleventh embodiment, since the rollers 102 are in the form of barrel-shapes and their surface shape is matching the concave outer peripheral surface of the rotary member 100, sliding friction occurring from the uneven outer diameter of the rollers 102 can also be acquired in addition to the sliding friction occurring from the inclination of the axes of rolling of the rollers 102, thus providing even greater resisting force.

Figure 26A:
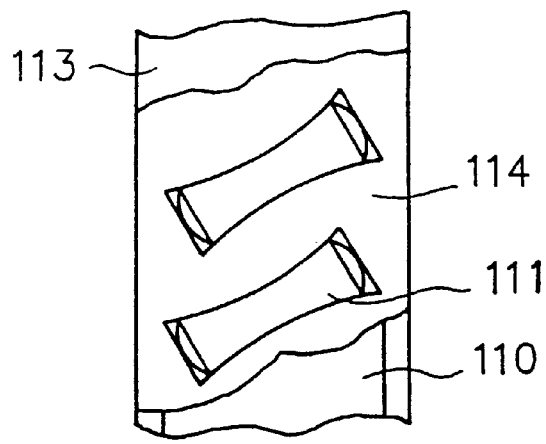
FIG. 26a, 26b and 26c show partial enlarged views of a friction resistance generator of a twelfth preferred embodiment of this invention.
Figure 26B:
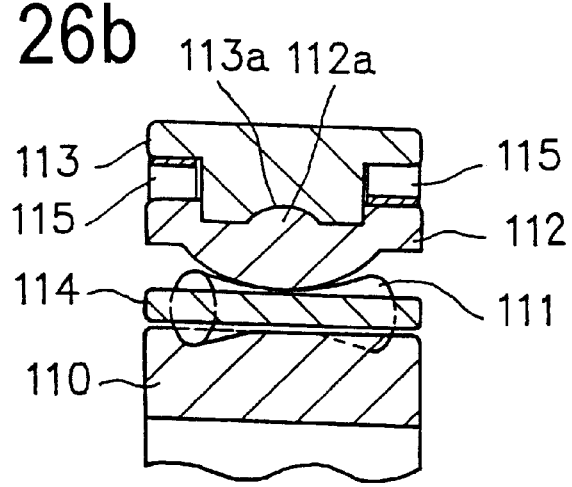
Figure 26C:
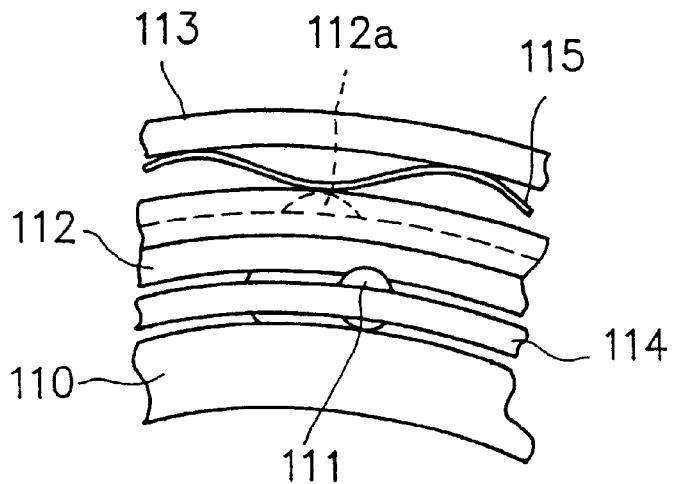

FIG. 26 shows a twelfth preferred embodiment of this invention: FIG. 26(a) being a partial enlarged view of a portion seen from the radial direction of a friction resistance generator of the twelfth preferred embodiment; FIG. 26(b) being a partial enlarged view of a cross section along the radial direction of the friction resistance generator; and FIG. 26(c) being a partial enlarged view of a portion seen from the axial direction of the friction resistance generator.

The friction resistance generator comprises a rotary member 110 rotating on its axis of rotation, numerous rollers 111 disposed along a track of rotation of the rotary member 110, a passive member 112 which is positioned to face the outer periphery of the rotary member 110 across the rollers 111, a guide ring 113 which maintains the passive member 112, a cage 114 maintains the rollers 111 at prescribed intervals in freely rotatable state, and a pair of ring springs 115 which work to apply pre-load from the rotary member 110 and the passive member 112 to the rollers 111.

The rotary member 110 is in the form of a ring shape and the outer peripheral surface of the rotary member 110 facing the inner peripheral surface of the passive member 112 is formed to a convex cross sectional shape along the axial direction.

The rollers 111 are disposed at equal intervals along the peripheral direction of the rotary member 110, and are in the form of shapes wherewith the smallest outer diameter at their center gradually becomes larger toward both ends. Also, both ends of the rollers 111 are rounded to a hemispherical shape to lessen frictional resistance occurring between the rollers 111 and the cage 114.

The passive member 112 is in the form of a split structure, into radially two halves, and its inner peripheral surface facing the outer periphery of the rotary member 110 is formed to a concave cross sectional shape along the axial direction. Also, on the outer peripheral surface of the passive member 112, plural projections 112a are provided at prescribed intervals along the peripheral direction.

The guide ring 113 is in the form of a ring shape and the passive member 112 is installed around the inner periphery of the guide ring 113 in freely movable state in the radial direction. Also, around the inner peripheral surface of the guide ring 113, dents 113a to mate the projections 112a of the passive member 112 are provided.

The cage 114 is in the form of a ring shape and its thickness in the radial direction is made thinner than the outer diameter of the rollers 111. The cage 114 is provided with numerous slots 114a to maintain the rollers 111 in freely rotatable state, and the slots 114a are so disposed that the axes of rolling of the rollers 111 become inclined by a prescribed angle to a plane containing the axis of rotation of the rotary member 110.

The ring springs 115 are in the form of ring shapes being made of a wave-formed spring material having elasticity toward the radial directions. The ring springs 115 are inserted between the outer periphery of the passive member 112 and inner periphery of the short sleeves at both ends of the guide ring 113 in compressed state, pushing the passive member 112 toward the inside in the radial direction.

With the friction resistance generator of the twelveth embodiment, since the concave shaped surface of the rollers 111 is matching the convex outer peripheral surface of the rotary member 110 and convex inner peripheral surface of the passive member 112, similar to the case of the preceding embodiment of this invention, sliding friction occurring from the uneven outer diameter of the rollers 111 can also be acquired in addition to the sliding friction occurring from the inclination of the axes of rolling of the rollers 111, thus providing even greater resisting force.

Figure 27:
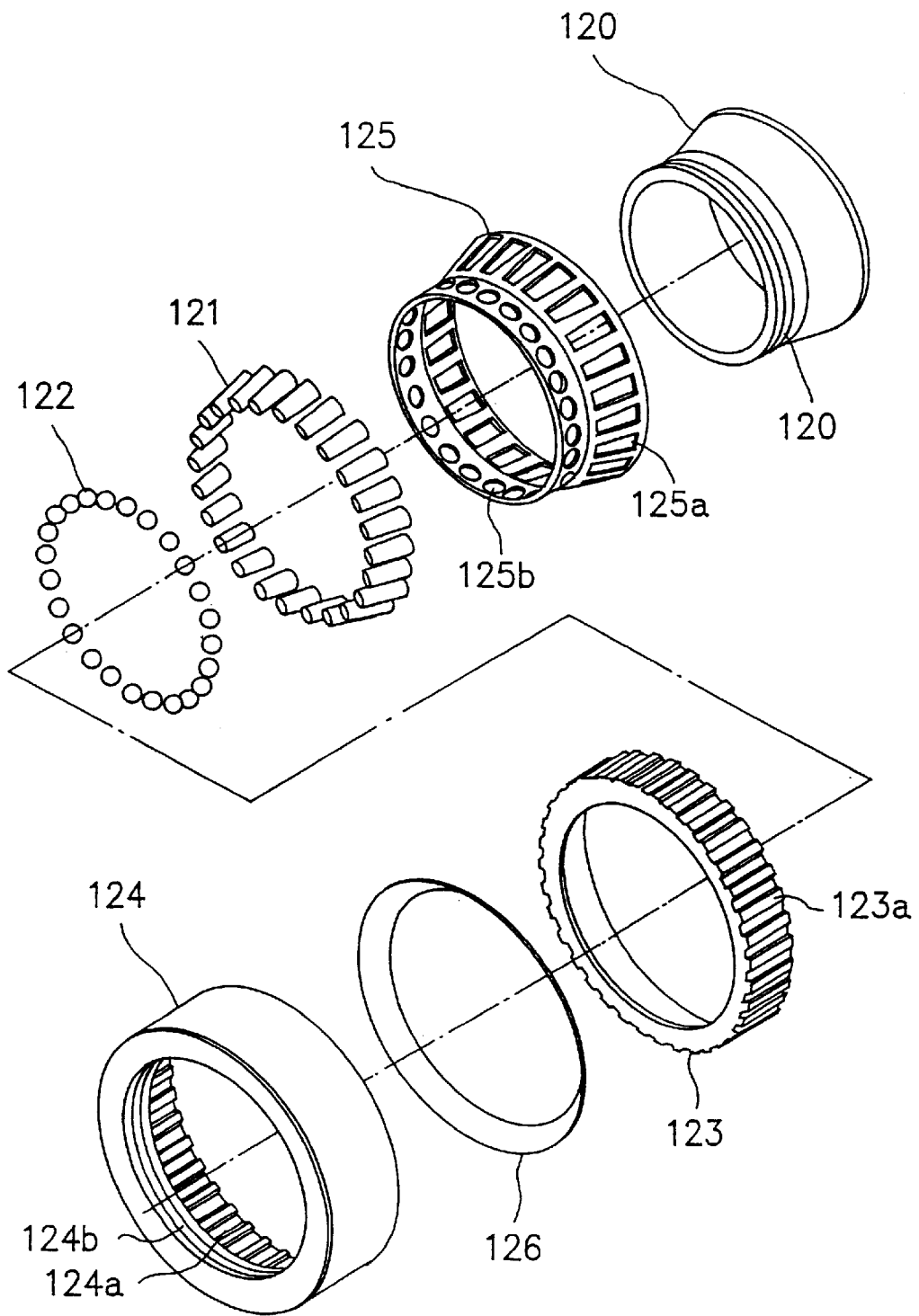
FIG. 27 is a an exploded perspective view of a friction resistance generator of a thirteenth preferred embodiment of this invention.
Figure 28A:
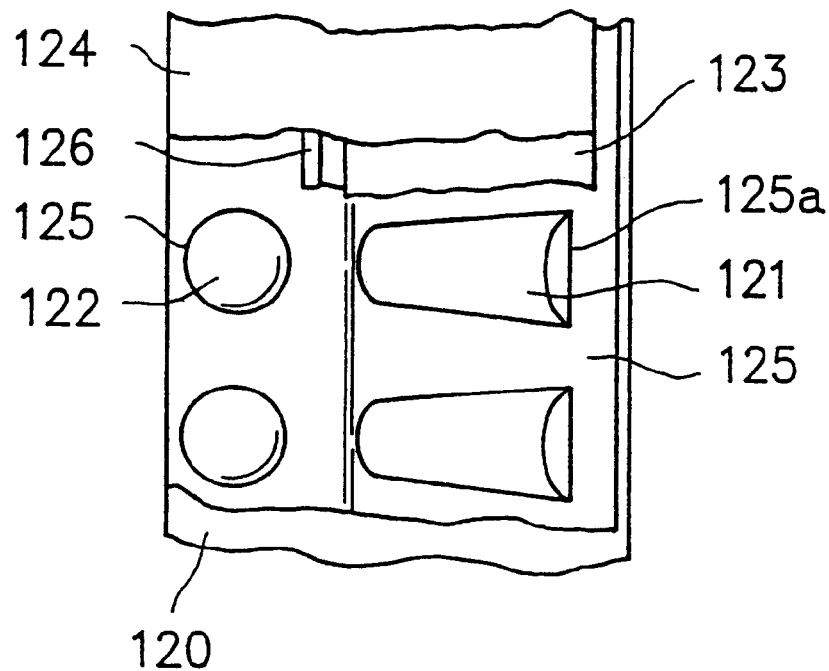
FIG. 28a and 28b show partial enlarged views of the drawing in FIG. 27.
Figure 28B:
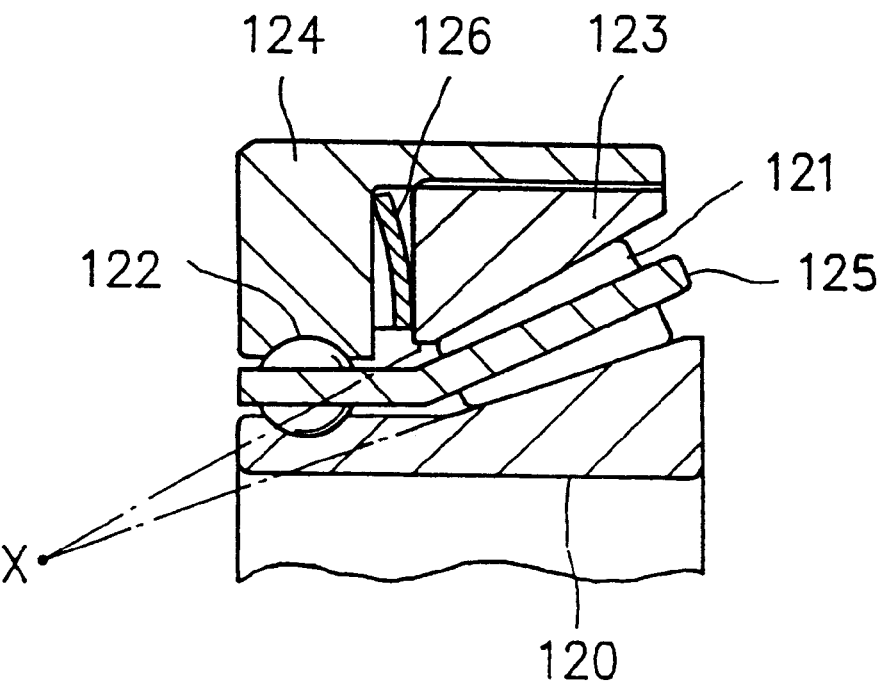

FIG. 27 and FIG. 28 show a thirteenth preferred embodiment of this invention: FIG. 27 being an exploded perspective view of a friction resistance generator of the thirteenth preferred embodiment; FIG. 28(a) being a partial enlarged view of a portion seen from the radial direction of the drawing in FIG. 27; and FIG. 28(b) being a partial enlarged view of a cross section along the radial direction of the drawing in FIG. 27.

The friction resistance generator comprises a rotary member 120 rotating on its axis of rotation, numerous rollers 121 disposed along a track of rotation of the rotary member 120, numerous balls 122 similarly disposed along the track of rotation of the rotary member 120, a pair of passive members 123 and 124 which are positioned to cover the outer periphery of the rotary member 120 across the rollers 121 and the balls 122, a cage 125 which maintains the rollers 121 and the balls 122 at prescribed intervals in freely rotatable state, and a disc spring 126 which works to apply pre-load from the rotary member 120 and one 123 of the pair of passive members to the rollers 121.

The rotary member 120 is in the form of a ring shape and the portion of its outer peripheral surface facing the bore surface of the one 123 of the two passive members is in the form of a conical shape. The remaining outer peripheral surface facing the bore surface of the passive member 124 is provided with a ring groove 120a tracing in continuation along the peripheral direction. The balls 122 are in engagement with the ring groove 120a in freely rotatable state.

The rollers 121 are in the form of a conical shape being disposed at equal intervals along the peripheral direction of the rotary member 120. The rollers 121 are so directed that their smaller diameter ends come to the smaller diameter side of the conically shaped part of the rotary member 120 and their larger diameter ends come to the larger diameter side of the conically shaped part of the rotary member 120. Also, as shown in FIG. 28(b), each roller 121 is so positioned that an intersecting point X of the lines extended along both sides of its conical body surfaces toward the axial direction does not coincide with the axis of rotation (indication being omitted from the drawing) of the rotary member 120.

The balls 122 are located between the rotary member 120 and the passive member 124 at equal intervals in the peripheral direction of the rotary member 120.

The passive members 123 and 124 are in the form of ring shapes, one 123 of the pair of passive members carries conical shaped surface on a plane facing the rotary member 120 and the other passive member 124 carries flat shaped surface on the plane facing the rotary member 120.

The passive members 123 and 124 are provided with numerous keys 123a and key grooves 124a extending toward the axial direction in the outer periphery and inner periphery, respectively, and they are coupled by engaging the keys 123a and the key grooves 124a for free movement in the axial direction.

Also, the passive member 124 is provided with a ring groove 124b tracing in continuation along the peripheral direction, similar to the rotary member 120. The balls 122 are also in engagement with the ring groove 124b in freely rotatable state.

The cage 125 is in the form of a ring shape and its portion facing one 123 of the passive members is formed to a conical shape. The cage 125 is provided with numerous slots 125a and numerous holes 125b to individually maintain the rollers 121 and the balls 122, respectively, and the slots 125a to maintain the rollers 121 are located along the conically shaped portion of the surface of the case 125.

The disc spring 126 is in the form of a ring shape being made of a disc shaped spring material having elasticity toward the axial direction. The disc spring 126 is inserted between the passive members 123 and 124 in compressed state, pushing the passive members 123 and 124 apart from each other toward the axial direction.

With the friction resistance generator of the thirteenth embodiment, when the rotary member 120 is rotated, the rollers 121 make rolling motions in contact with the surfaces of the rotary member 120 and one 123 of the passive members, consequently the cage 125 also makes trailing rotation.

At that time, since the balls 122 are engaging with the ring grooves 120a of the rotary member 120 and the ring groove 124b of the passive member 124, respectively, dislocation toward the axial direction of the rotary member 120 and the passive member 124 are prevented.

Also, since each roller 121 is so positioned that the intersecting point X of the lines extended along both sides of its conical body surfaces toward its axial direction does not coincide with the axis of rotation of the rotary member 120, when respective rollers 121 roll between the rotary member 120 and the passive member 123, the revolution difference occurring between the larger diameter end and the smaller diameter end of respective rollers 121 does not coincide with the revolution difference occurring between the larger diameter side and smaller diameter side of the rotary member 120. Consequently, sliding friction occurs between the rollers 121 and the rotary member 120, and between the rollers 121 and the passive member 123, thus providing resistance to the rotary movement of the rotary member 120. At this time, since the rollers 121, the rotary member 120 and the passive member 123 are depressed by the function of the disc spring 126, a certain frictional force in proportion to the magnitude of the pre-load of the disc spring 126 can be produced here.

Figure 29A:
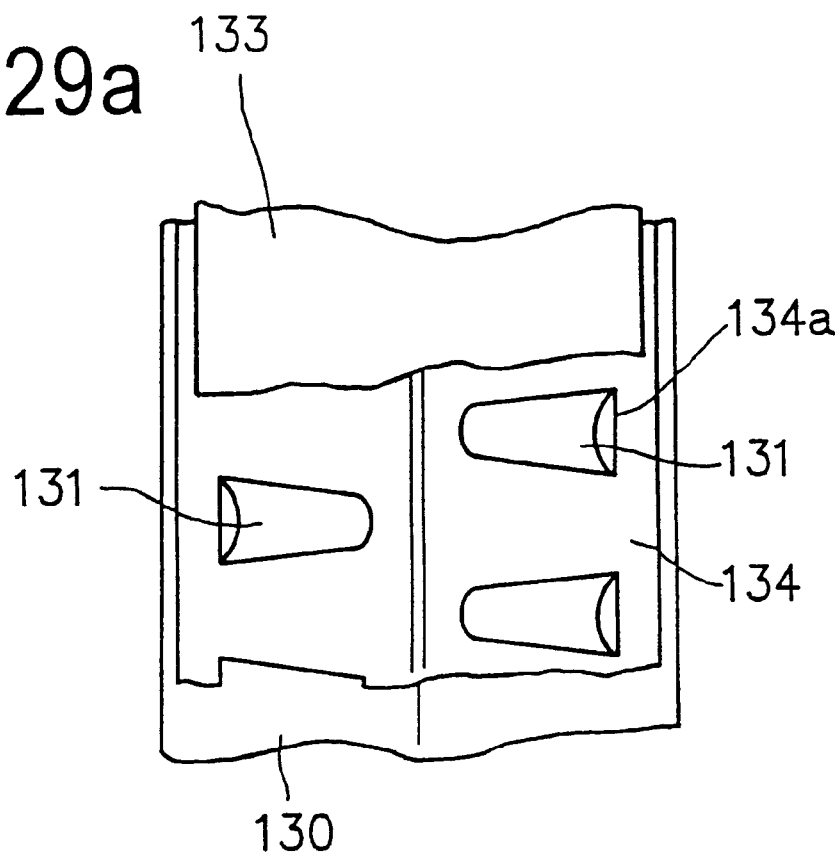
FIG. 29a and 29b show partial enlarged views of a friction resistance generator of a fourteenth preferred embodiment of this invention.
Figure 29B:
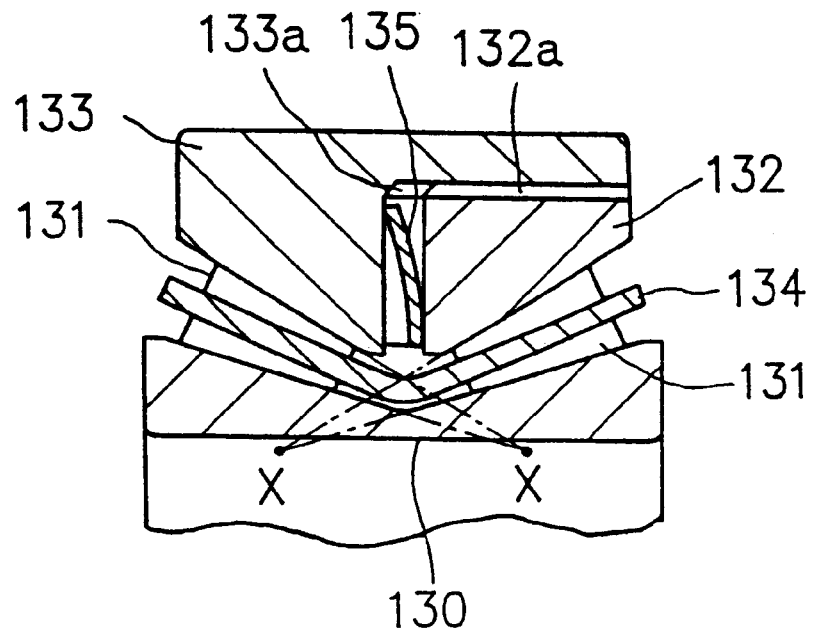

FIG. 29 shows a fourteenth preferred embodiment of this invention: FIG. 29(a) being a partial enlarged view of a portion seen from the radial direction of a friction resistance generator of the fourteenth preferred embodiment; and FIG. 29(b) being a partial enlarged view of a cross section along the radial direction of the friction resistance generator.

The friction resistance generator comprises a rotary member 130 rotating on its axis of rotation, numerous rollers 131 disposed along a track of rotation of the rotary member 130 in two lines, a pair of passive members 132 and 133 facing the rotary member 130 from outside in the radial direction across the rollers 131, a cage 134 which maintains the rollers 131 at prescribed intervals in freely rotatable state, and a disc spring 135 which works to apply preload from the rotary member 130 and from the passive members 132 and 133 to the rollers 131.

The rotary member 130 is in the form of a ring shape and its outer peripheral surface facing the passive members 132 and 133 is formed to a combination of two conical profiles, the outer diameter thereof becoming smaller toward the center in the axial direction from the two largest outer diameters at both ends.

The rollers 131 are in the form of a conical shape being disposed at equal intervals along the peripheral direction of the rotary member 130. The rollers 131 are so directed that their smaller diameter ends come to the smaller diameter side of the conically shaped part of the rotary member 130 and that their larger diameter ends come to the larger diameter side of the conically shaped part of the rotary member 130. Also, as shown in FIG. 29(b), each roller 131 is so positioned that an intersecting point X of the lines extended along both sides of its conical body surfaces toward the axial direction does not coincide with the axis of rotation (indication being omitted from the drawing) of the rotary member 130.

The passive members 132 and 133 are in the form of ring shapes and their inner peripheral surfaces facing the rotary member 130 are formed to conical profiles matching the combined conical profiles of the outer peripheral surface of the rotary member 130.

The passive members 132 and 133 are provided with numerous keys 132a and numerous key grooves 133a extending toward the axial direction in the outer peripheral surface of the passive member 132 and in a portion of the inner peripheral surface of the passive member 133, respectively. The passive members 132 and 133 are coupled by engagement of the keys 132a and the key grooves 133a for free movement in the axial direction.

The cage 134 is in the form of a ring shape including a combination of two conical profiles, the outer diameter thereof becoming smaller toward the center in the axial direction from the two largest diameters at both ends. Also, the cage 134 is provided with numerous slots 134a in axially two lines in the radial direction to maintain the rollers 131 individually in freely rotatable state. Said two lines of slots 134a are alternately shifted in their relative positions.

The disc spring 135 is in the form of a ring shape being made of a disc shaped spring material having elasticity toward the axial direction. The disc spring 135 is inserted between the passive members 132 and 133 in compressed state, pushing the passive members 132 and 133 apart from each other toward the axial direction.

With the friction resistance generator of the fourteenth embodiment, since the rollers 131 are located in axially two lines, larger frictional force can be acquired. The principle of occurrence of the frictional force is same as the case of the preceding embodiment of this invention.

Figure 30:
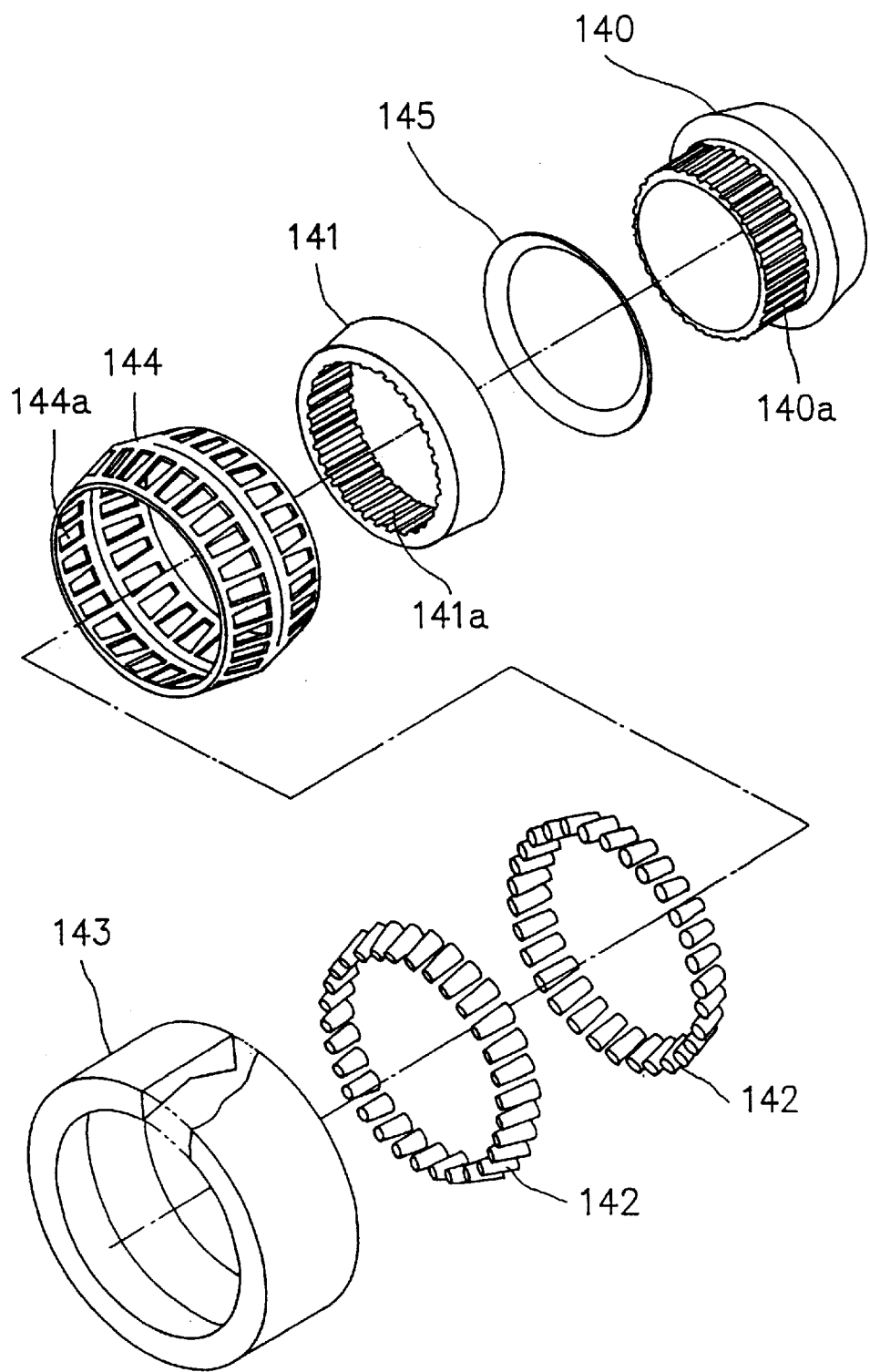
FIG. 30 is an exploded perspective view of a friction resistance generator of a fifteenth preferred embodiment of this invention.
Figure 31A:
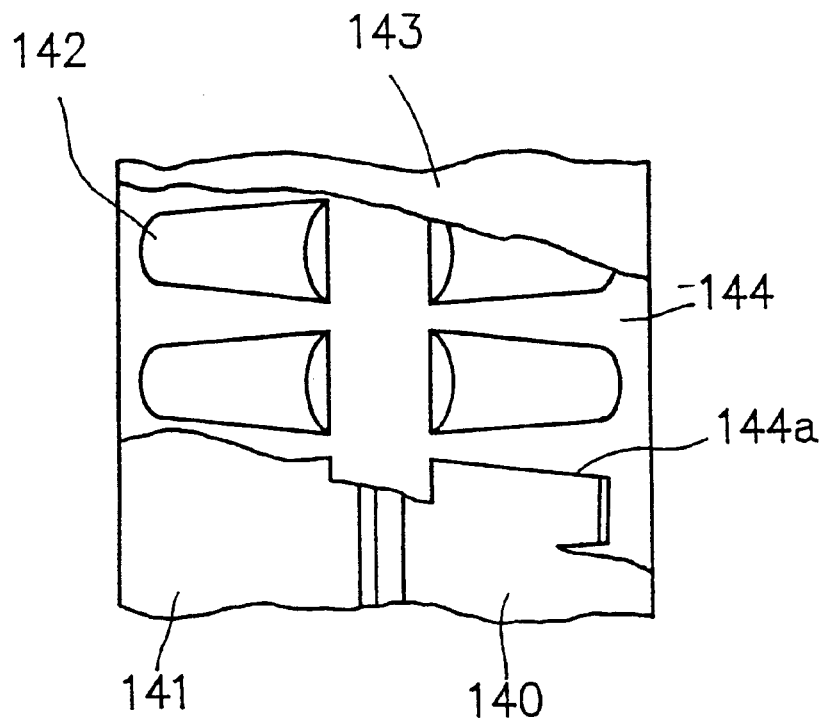
FIG. 31a and 31b show partial enlarged views of the drawing in FIG. 30.
Figure 31B:
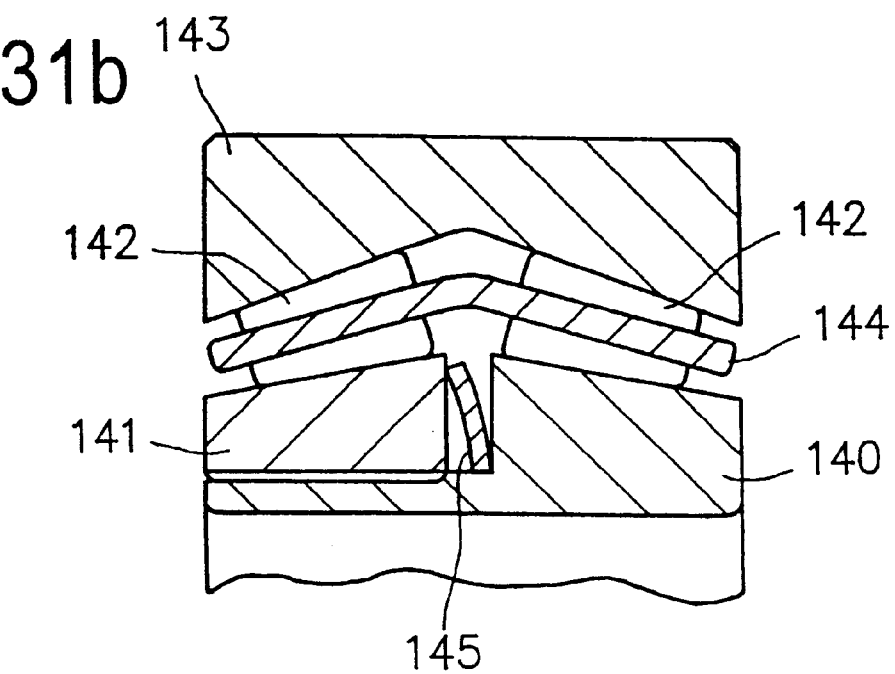

FIG. 30 and FIG. 31 show a fifteenth preferred embodiment of this invention: FIG. 30 being an exploded perspective view of a friction resistance generator of the fifteenth preferred embodiment; FIG. 31(a) being a partial enlarged view of a portion seen from the radial direction of the drawing in FIG. 30; and FIG. 31(b) being a partial enlarged view of a cross section along the radial direction of the drawing in FIG. 30.

The friction resistance generator comprises a pair of rotary members 140 and 141 rotating on their axes of rotation, numerous rollers 142 disposed in axially two lines in the radial direction along a track of rotation of the rotary members 140 and 141, a passive member 143 covering the outer peripheries of the rotary members 140 and 141 in the radial direction across the rollers 142, a cage 144 which maintains the rollers 142 individually at prescribed intervals in freely rotatable state, a disc spring 145 which works to apply pre-load from the rotary members 140 and 141 and from the passive member 143 to the rollers 142.

The rotary members 140 and 141 are in the form of ring shapes and their outer peripheral surfaces facing the inner peripheral surface of the passive member 143 are formed to conical profiles, the outer diameters thereof becoming larger toward the center in the axial direction from the two smallest outer diameters at both ends, under the status where the rotary members 140 and 141 are coupled together.

The rotary members 140 and 141 are provided with numerous keys 140a and numerous key grooves 141a extending toward the axial direction in a portion of the outer peripheral surface of the rotary member 140 and in the inner peripheral surface of the rotary member 141, respectively. The rotary members 140 and 141 are coupled by engagement of the keys 140a and the key grooves 141a for free movement in the axial direction.

The rollers 142 are in the form of a conical shape being laid out at equal intervals along the peripheral direction of the rotary members 140 and 141. The rollers 142 are so directed that their smaller diameter ends come to the smaller diameter side of the conically shaped part of the rotary member 140 and their larger diameter ends come to the larger diameter side of the conically shaped part of the rotary member 140.

Also, similar to the case of the preceding embodiment, each roller 142 is so positioned that an intersecting point of the lines extended along both sides of its conical body surfaces toward the axial direction does not coincide with the axis of rotation of the rotary member 140.

The passive member 143 is in the form of a ring shape and its inner peripheral surface facing the outer peripheral surfaces of the rotary members 140 and 141 is formed to a combination of two conical profiles, the outer diameter thereof becoming larger toward the center in the axial direction from the two smallest diameters at both ends.

The cage 144 is in the form of a ring shape including two conical profiles, the outer diameter thereof becoming larger toward the center in the axial direction from the two smallest diameters at both ends. The cage 144 is provided with numerous slots 144a in axially two lines in the radial direction to maintain the rollers 142 individually in freely rotatable state. Said two lines of slots 144a are positioned symmetrically each other.

The disc spring 145 is in the form of a ring shape being made of a disc shaped spring material having elasticity toward the axial direction. The disc spring 145 is inserted between the rotary members 140 and 141 in compressed state, pushing the rotary members 140 and 141 apart from each other toward the axial direction.

With the friction resistance generator of the fifteenth embodiment, similar to the case of the preceding embodiment, since the rollers 142 are disposed in axially two lines in the radial direction along the track of rotation of the rotary members 140 and 141, larger frictional force can be acquired. The principle of occurrence of the frictional force is the same as the case of the preceding embodiment.

Figure 32A:
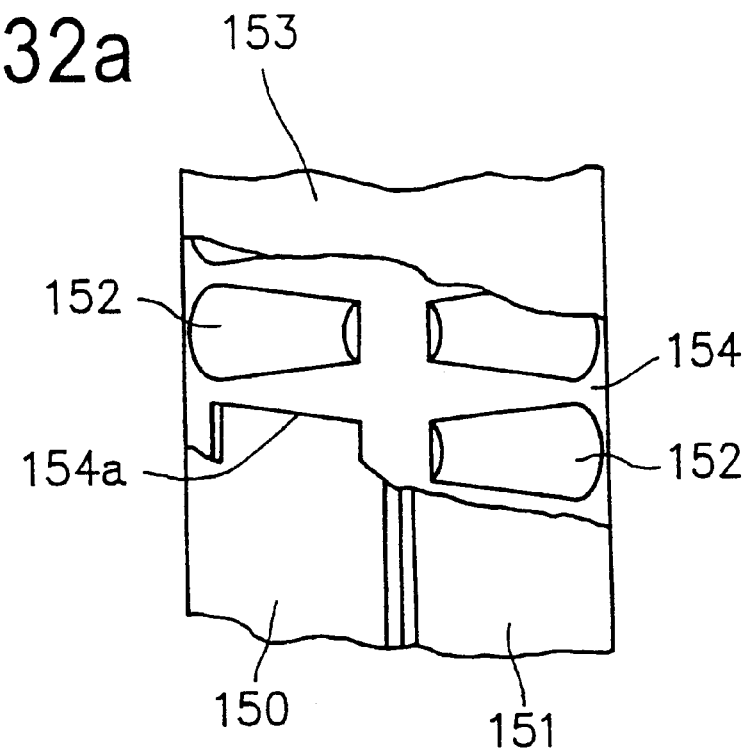
FIG. 32a and 32b show partial enlarged views of a friction resistance generator of a sixteenth preferred embodiment of this invention.
Figure 32B:
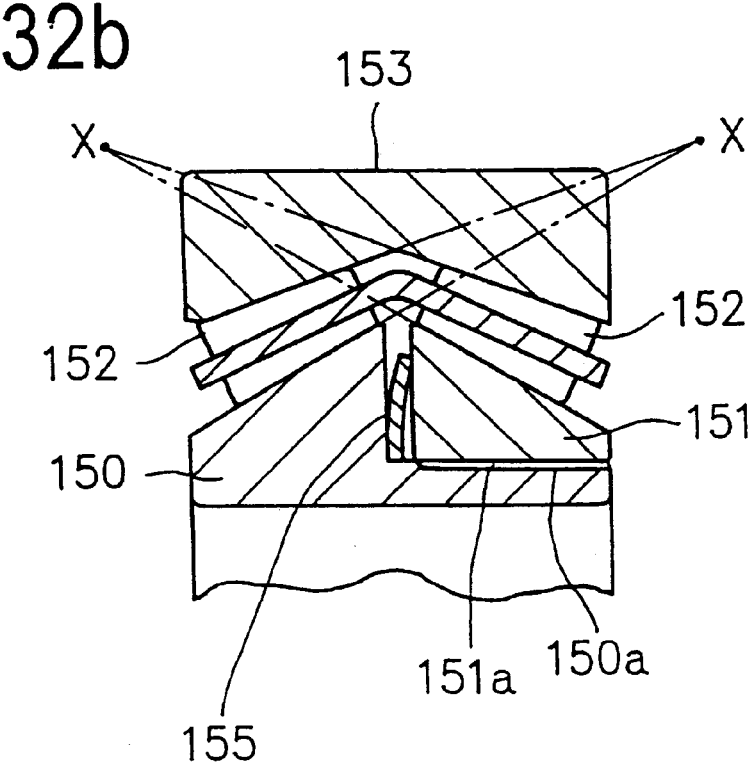

FIG. 32 shows a sixteenth preferred embodiment of this invention: FIG. 32(a) being a partial enlarged view of a portion of a friction resistance generator of the sixteenth preferred embodiment seen from the radial direction; and FIG. 32(b) being a partial enlarged view of a cross section along the radial direction of the friction resistance generator.

The friction resistance generator comprises a pair of rotary members 150 and 151 rotating on their axes of rotation, numerous rollers 152 disposed in axially two lines in the radial direction along tracks of rotation of the rotary members 150 and 151, a passive member 153 which covers the outer peripheries of the rotary members 150 and 151 in the radial direction, a cage 154 which maintains the numerous rollers 152 individually at prescribed intervals in freely rotatable state, a disc spring 155 which works to apply pre-load from the rotary members 150 and 151 and from the passive member 153 to the rollers 152.

The rotary members 150 and 151 are in the form of ring shapes and their outer peripheral surfaces facing the inner peripheral surface of the passive member 153 are formed to conical profiles, the outer diameter thereof becoming larger toward the center in the axial direction from the two smallest outer diameters at both ends, under the status where the two rotary members are coupled together.

The rotary members 150 and 151 are provided with numerous keys 150a and numerous key grooves 151a extending toward the axial direction in a portion of the outer peripheral surface of the rotary member 150 and in the inner peripheral surface of the rotary member 151, respectively. The rotary members 150 and 151 are coupled by engagement of the keys 150a and key grooves 151a for free movement in the axial direction.

The rollers 152 are in the form of a conical shape being laid out at equal intervals along the peripheral direction of the rotary members 150 and 151. The rollers 152 are so directed that their smaller diameter ends come to the larger diameter side of the conically shaped part of the rotary member 150 and their larger diameter ends come to the smaller diameter side of the conically shaped part of the rotary member 150. Also, as shown in FIG. 32(b), each roller 152 is so positioned that an intersecting point X of the lines extended along both sides of its conical body surfaces toward the axial direction does not coincide with the axis of rotation (indication being omitted from the drawing) of the rotary member 150.

The passive member 153 is in the form of a ring shape and its inner peripheral surface facing the outer peripheral surfaces of the rotary members 150 and 151 is formed to a combination of two conical profiles, the outer diameter thereof becoming larger toward the center in the axial direction from the two smallest diameters at both ends.

The cage 154 is in the form of a ring shape including two conical profiles, the outer diameter thereof becoming larger toward the center in the axial direction from the two smallest diameters at both ends.

The cage 154 is provided with numerous slots 154a in axially two lines in the radial direction to maintain the rollers 152 individually in freely rotatable state. Said two lines of slots 154a are positioned symmetrically each other.

The disc spring 155 is in the form of a ring shape being made of a disc shaped spring material having elasticity toward the axial direction. The disc spring 155 is inserted between the rotary members 150 and 151 in compressed state, pushing the rotary members 150 and 151 apart from each other in the axial direction.

With the friction resistance generator of the sixteenth embodiment, since the rollers 152 are so directed that their smaller diameter ends come to the larger diameter side of the conically shaped part of the rotary member 150 and their larger diameter ends come to the smaller diameter side of the conically shaped part of the rotary member 150, the intersecting point X of the lines extended along both sides of the conical body surfaces toward the axial direction comes farther away from the axis of rotation of the rotary member 150 as compared with the case of the preceding embodiment, thus providing larger sliding friction between the rollers 152 and the rotary members 150 and 151 and between the rollers 152 and the passive member 153. Meanwhile, the principle of occurrence of the frictional force is the same as the case of the preceding embodiment.

Figure 33:
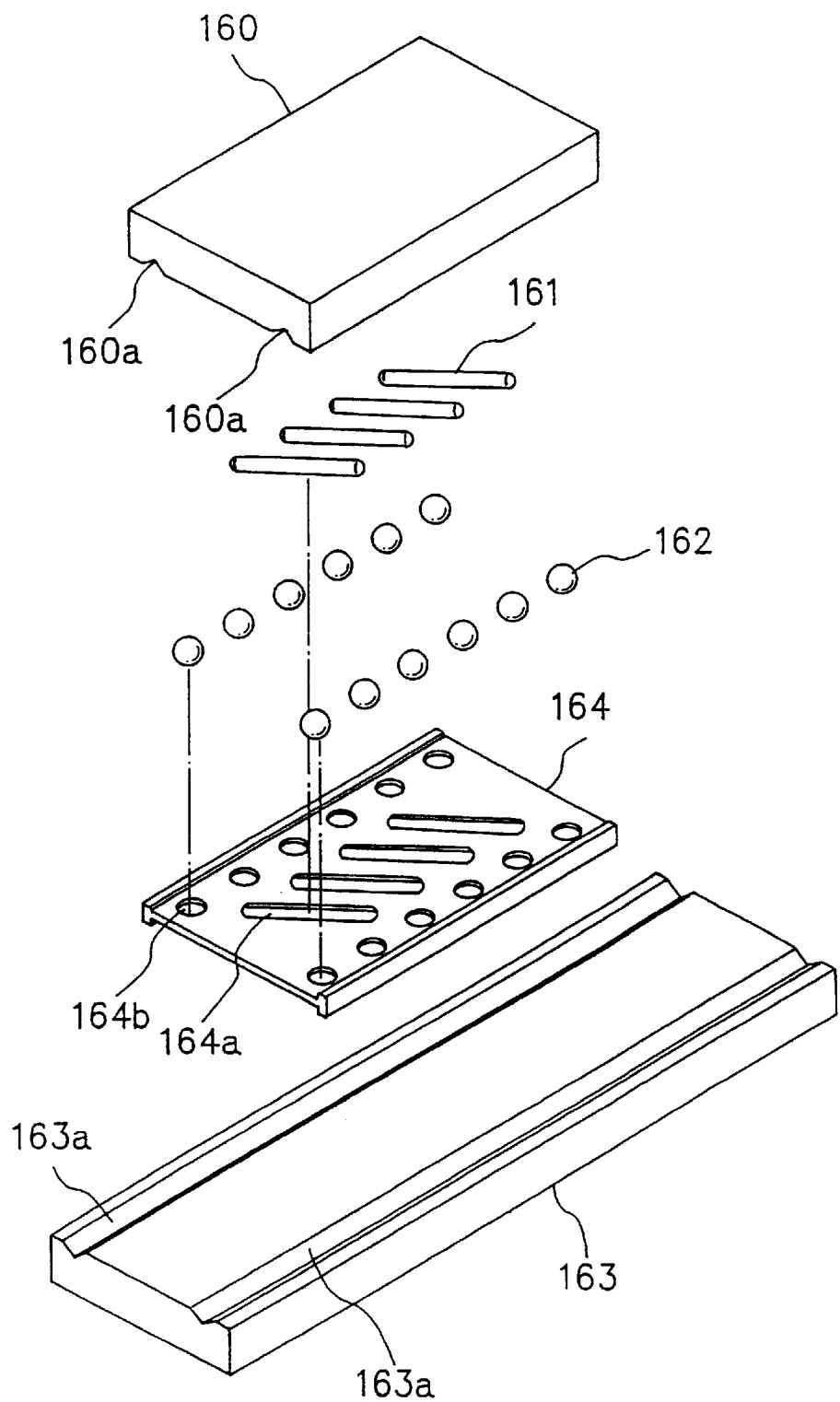
FIG. 33 is an exploded perspective view of a friction resistance generator of a seventeenth preferred embodiment of this invention

FIG. 33 to FIG. 36 show a seventeenth preferred embodiment of this invention: FIG. 33 being an exploded perspective view of a friction resistance generator of the seventeenth preferred embodiment; FIG. 34(a) being an enlarged view of a portion seen from the top of the drawing in FIG. 33; and FIG. 34(b) being an enlarged view of a cross section seen from the front side of the drawing in FIG. 33.

The friction resistance generator comprises a sliding member 160 which is designed to slide in rectilinear directions, numerous rollers 161 disposed along a track of movement of the sliding member 160, numerous balls 162 similarly disposed along the track of movement of the sliding member 160, a passive member 163 which faces the sliding member 160 across the rollers 161 and the balls 162, a cage 164 which maintains the rollers 161 and the balls 162 at prescribed intervals in freely rotatable state.

These parts are the minimum requirements to constitute the friction resistance generator of this embodiment. In actual applications, the sliding member 160 is to be connected to a driving mechanism or the like, indication thereof being omitted from the drawing, and the passive member 163 is to be fastened to a stationary state.

The sliding member 160 is in the form of a plate shape and the center section of its surface facing the passive member 163 (the bottom surface) is formed to a flat plane. Also, on both sides of the bottom surface, a groove 160a each of a V-shaped cross section is provided in continuation along the longitudinal direction. The balls 162 are in engagement with a pair of said grooves 160a in freely rotatable state. Meanwhile, since the explanations are made only on the structure of the friction resistance generator and on occurring movements therein, the sliding member 160 is represented by a simplified shape of a short length.

The rollers 161 are in the form of a cylindrical shape extending straight toward their axes of rolling and they are disposed at equal intervals along the longitudinal direction of the sliding member 160. Also, both ends of each roller 161 are rounded to a hemispherical shape to lessen friction occurring with the cage 164.

The balls 162 are disposed at equal intervals in two lines along the longitudinal direction of the sliding member 160 putting the rollers 161 in between the two lines.

The passive member 163 is in the form of a plate shape and the center section of its surface facing the sliding member 160 (the upper surface) is formed to a flat plane. Also, on both sides of the upper surface of the passive member 163, a pair of said groove 163a of a V-shaped cross section are provided in continuation along the longitudinal direction. The balls 162 are in engagement with the grooves 163a in freely rotatable state. Meanwhile, similar to the case of the aforesaid sliding member 160, the passive member 163 is represented by a simplified shape.

Figure 34A:
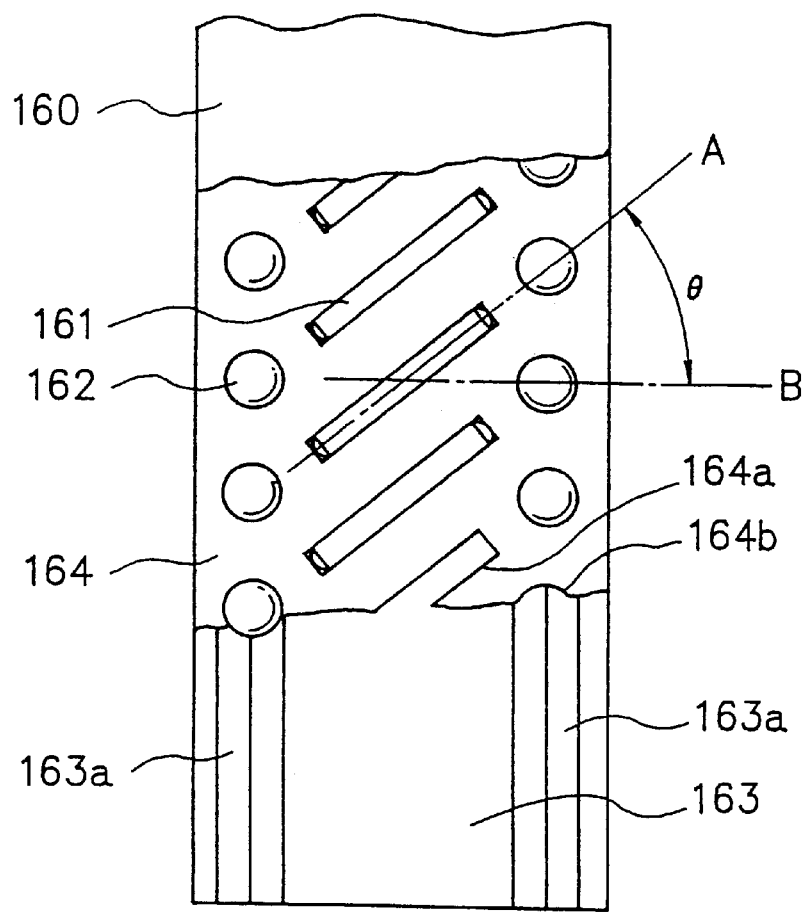
FIG. 34a and 34b show expanded sectional views of the drawing in FIG. 33.
Figure 34B:
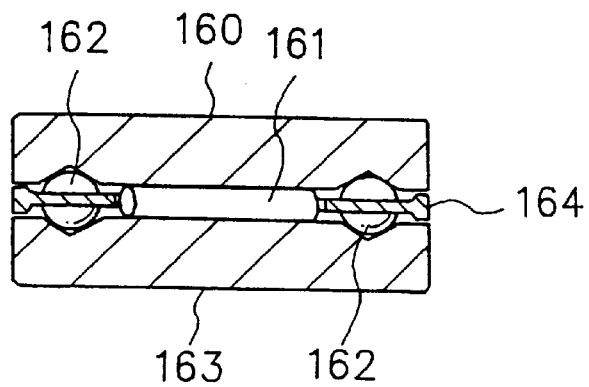

The cage 164 is in the form of a plate shape and its thickness is made thinner than the outer diameter of the rollers 161. The cage 164 is provided with numerous slots 164a to maintain the rollers 161 individually and with numerous holes 164b to maintain the balls 162 individually. Each slot 164a and each hole 164b maintain each roller 161 and each ball 162, respectively in freely rotatable state. Also, as shown in FIG. 34(a), each slot 164a is so directed that each axis of rolling of each roller 161 becomes inclined by an angle θ from the plane B perpendicular to the sliding direction of the sliding member 160.

Figure 35:
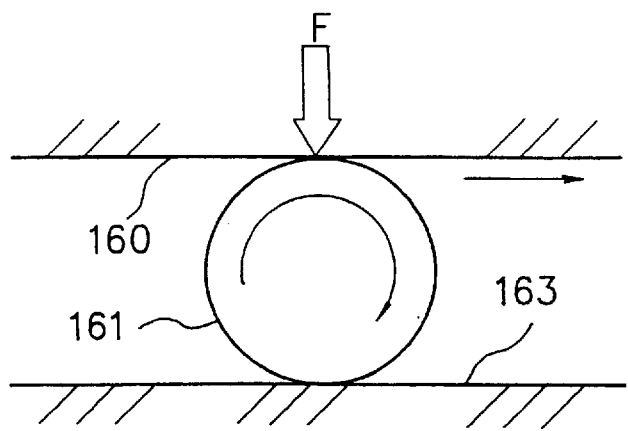
FIG. 35 and FIG. 36 are explanatory drawings indicating movement occurring in the seventeenth preferred embodiment of this invention.

With the friction resistance generator of the aforementioned structure, as shown in FIG. 35, when the sliding member 160 is slided in the rectilinear directions with a load F applied toward the passive member 163, the rollers 161 make rolling motions in contact with the surfaces of the sliding member 160 and the passive member 163, thus the cage 164 also trails to move forward.

Figure 36:
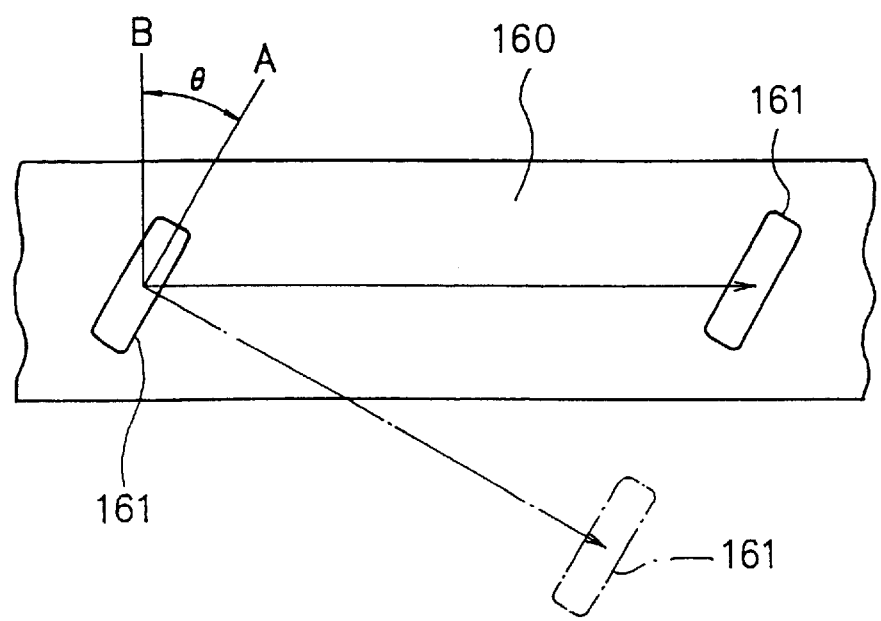

At that time, as shown in FIG. 36, since the rollers 161 are forced to move along the track of movement of the sliding member 160 (along the direction of the solid line) while their motivation to roll toward a direction inclined by the angle θ from the track of movement (in the direction of the alternate long and short dash line) of the sliding member 160 are restricted by the cage 164, frictional force commensurate with the load F to the axial direction occurs between the rollers 161 and the sliding member 160 and between the rollers 161 and the passive member 163. At this time, since the rollers 161 cause sliding friction while making rolling motions, static friction does not occur and stable resistance force exerted by dynamic friction can always be acquired. Even if the static friction may occur during initial stage, rolling motion of the rollers 161 immediately causes shifts to dynamic friction.

Also, situations without production of the frictional force can also be obtained optionally by releasing the load applied through the sliding member 160. Moreover, since the balls 162 are in engagement with the grooves 160a and 163a of the sliding member 160 and the passive member 163, respectively, dislocation toward the crosswise direction of the sliding member 160 or the passive member 163 is prevented. In this instance, the balls 162 leave slight clearance when engaging with the grooves 160a and 163a in order not to interfere the contact between the rollers 161 and the sliding member 160 and between the rollers 161 and the passive member 163.

Thus, with the friction resistance generator of the seventeenth embodiment, since sliding friction is produced while the rollers 161 are rolled along by inclining the axes of rolling of the rollers 161 by a prescribed angle to a plane perpendicular to the sliding direction of the sliding member 160, discretionary resistance force in proportion to the load applied toward the passive member 163 can be exerted to the rectilinear movement of the sliding member 160 and, furthermore, the resistance force exerted to the rectilinear movement of the sliding member can be very easily controlled by changing the magnitude of said load.

With the friction resistance generator, since the aforesaid sliding friction is produced pursuant to the rolling motions of the rollers 161, stable resistance force can be always acquired without fear of occurrences of static friction which causes so-called stick-slip phenomenon. Meanwhile, the balls 162 can be omitted when necessary.

Figure 37A:
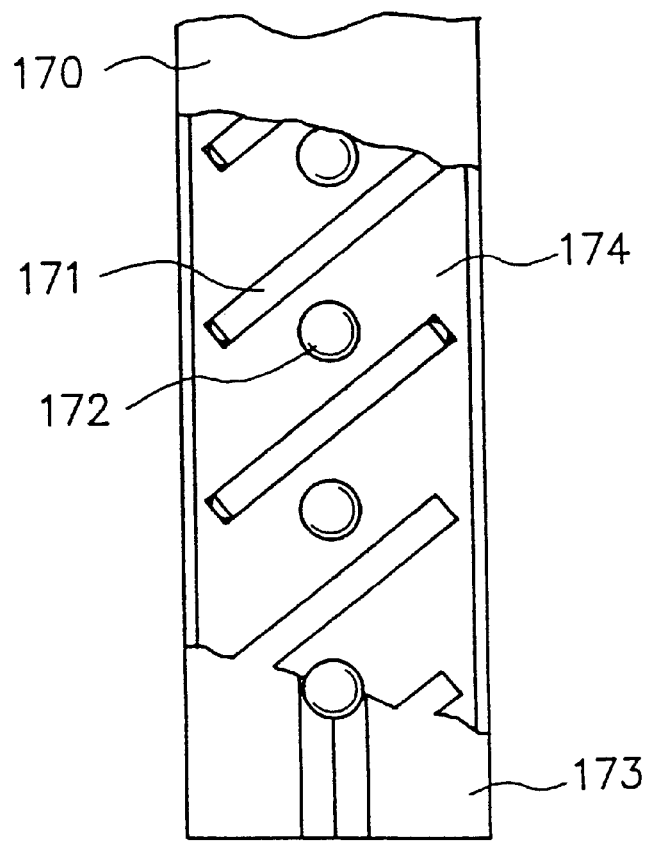
FIG. 37a and 37b show expanded sectional views of a friction resistance generator of a eighteenth preferred embodiment of this invention.
Figure 37B:
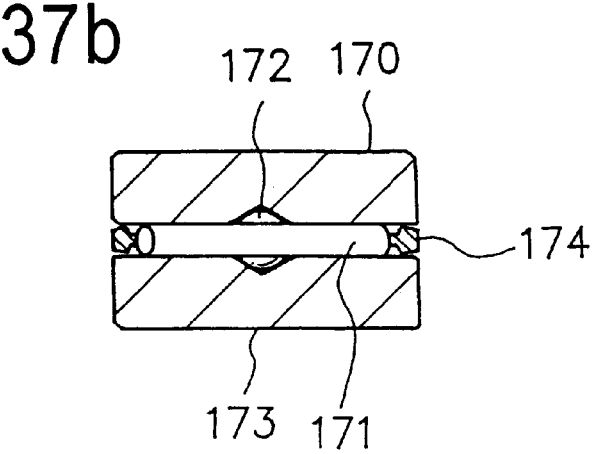

FIG. 37 shows an eighteenth preferred embodiment of this invention: FIG. 37(a) being an enlarged plan view of a portion of a friction resistance generator of the eighteenth preferred embodiment; and FIG. 37(b) being an enlarged view of a cross-section perpendicular to the longitude of the friction resistance generator. Similar to the preceding embodiment, the friction resistance generator comprises a sliding member 170, numerous rollers 171, numerous balls 172, a passive member 173 and a cage 174. The balls 172 and the rollers 171 are disposed alternately along a single line one after another. Meanwhile, the movements occurring in the friction resistance generator of this embodiment and the effects thereof are the same as those of the preceding embodiment.

Figure 38A:
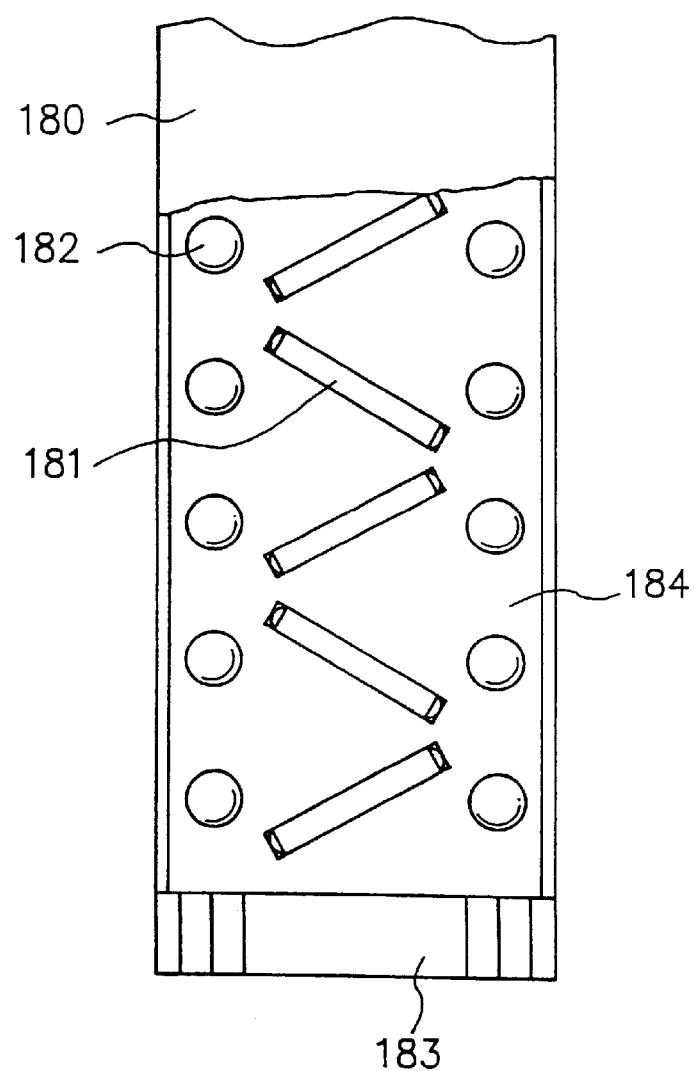
FIG. 38a and 38b show expanded sectional views of a friction resistance generator of a nineteenth preferred embodiment of this invention.
Figure 38B:
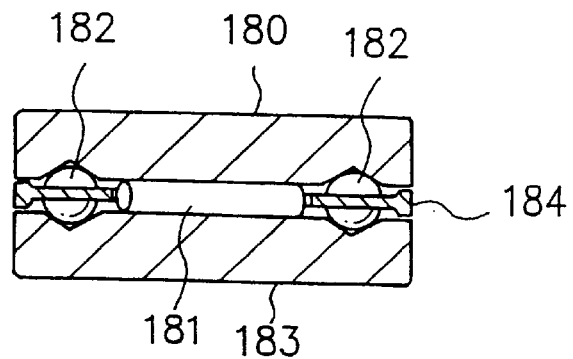

FIG. 38 shows a nineteenth preferred embodiment of this invention: FIG. 38(a) being an enlarged plan view of a portion of a friction resistance generator of the nineteenth preferred embodiment; and FIG. 38(b) being an enlarged view of a cross-section perpendicular to the longitude of the friction resistance generator.

Similar to the preceding embodiment, the friction resistance generator comprises a sliding member 180, numerous rollers 181, numerous balls 182, a passive member 183 and a cage 184. The rollers 181 are disposed alternately in opposite directions which are inclined by a prescribed angle to a plane perpendicular to the sliding direction of the sliding member 180. Consequently, the friction resistance generator of this embodiment exhibits always equal resistance characteristics in either sliding direction of the sliding member 180. The principle of producing the frictional force is the same as that of the preceding embodiment.

Figure 39A:
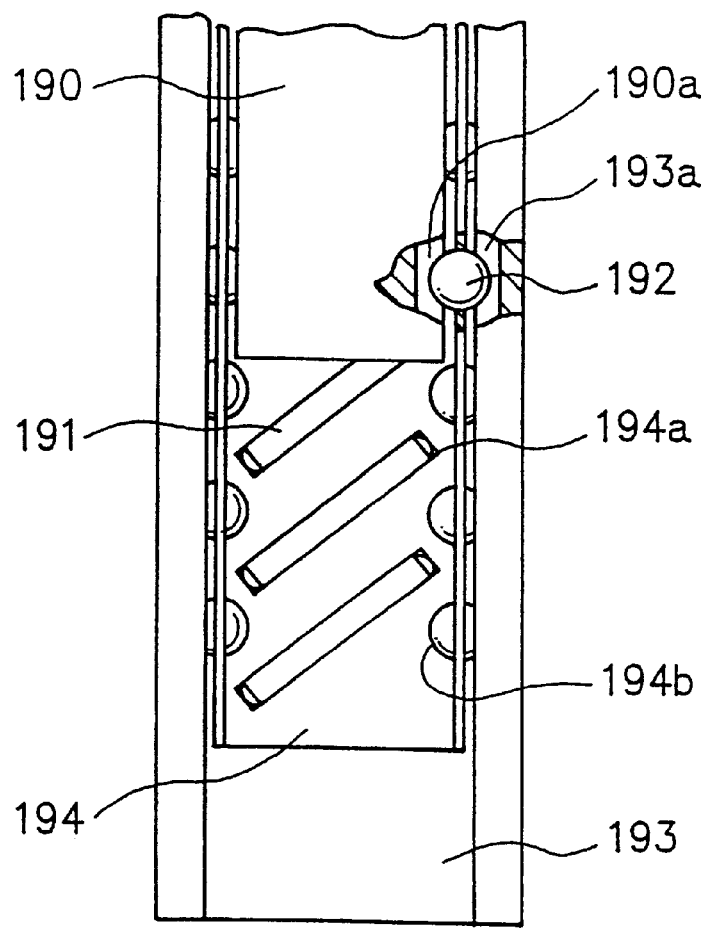
FIG. 39a and 39b show expanded sectional views of a friction resistance generator of a twentieth preferred embodiment of this invention.
Figure 39B:
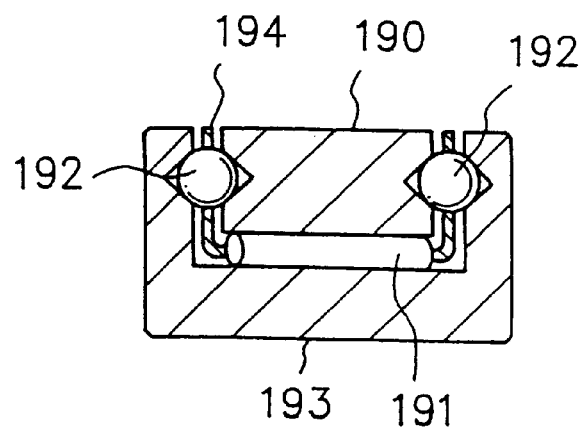

FIG. 39 shows a twentieth preferred embodiment of this invention: FIG. 39(a) being an enlarged plan view of a portion of a friction resistance generator of the twentieth preferred embodiment of this invention; FIG. 39(b) being an enlarged view of a cross-section perpendicular to the longitude of the friction resistance generator.

The friction resistance generator comprises a sliding member 190 which slides in the rectilinear directions, numerous rollers 191 disposed along a track of movement of the sliding member 190, numerous balls 192 disposed similarly along the track of movement of the sliding member 190, a passive member 193 which faces the sliding member 190 across the rollers 191, and a cage 194 which maintains the rollers 191 and the balls 192 at prescribed intervals in freely rotatable state.

The sliding member 190 is in the form of a plate shape and its surface facing the passive member 193 is formed to a flat plane. Also, in both side surfaces of the sliding member 190, a groove 190a each of a V-shaped cross section is formed in continuation along the longitudinal direction. The balls 192 are in engagement with a pair of said grooves 190a in freely rotatable state.

The rollers are of a cylindrical shape extending straight toward their axes of rolling and they are disposed at equal intervals along the longitudinal direction of the sliding member 190. Also, both ends of the rollers 191 are rounded to a hemi-spherical shape to lessen friction occurring between the rollers 191 and the cage 194.

The balls 192 are disposed at equal intervals along the longitudinal direction of the sliding member 190 in two lines along both side surfaces.

The passive member 193 is in the form of a tray shape with walls rising up from both sides and its surface facing the sliding member 190 (the bottom surface) is made to a flat plane. Also, in the inside surfaces of walls on both sides of the passive member 193, a groove 193a each of a V-shaped cross section is formed in continuation along the longitudinal direction. The balls 192 are engaging with the pair of grooves 193a in freely rotatable state.

The cage 194 is in the form of a U-shape with both sides being bent upward matching the inner profile of the passive member 193 and its thickness is made thinner than the outer diameter of the rollers 191. The cage 194 is provided with numerous slots 194a to maintain the rollers 191 at its bottom along the centerline thereof, in which the rollers 191 are maintained in freely rotatable state. The slots 194a are so disposed that the axes of rolling of the rollers 191 becomes inclined by a prescribed angle to a plane perpendicular to the sliding direction of the sliding member 190.

Also, in the upright walls on both sides of the cage 194, numerous holes 194b are opened in continuation along the longitudinal direction. The holes 194b on both sides maintain the balls 192 individually in freely rotatable state.

With the friction resistance generator of the twentieth embodiment, since the balls 192 are in engagement with the grooves 190a and 193a, dislocation not only toward the cross-wise direction but also toward the vertical direction of the sliding member 190 and the passive member 193 is fully prevented.

Figure 40:
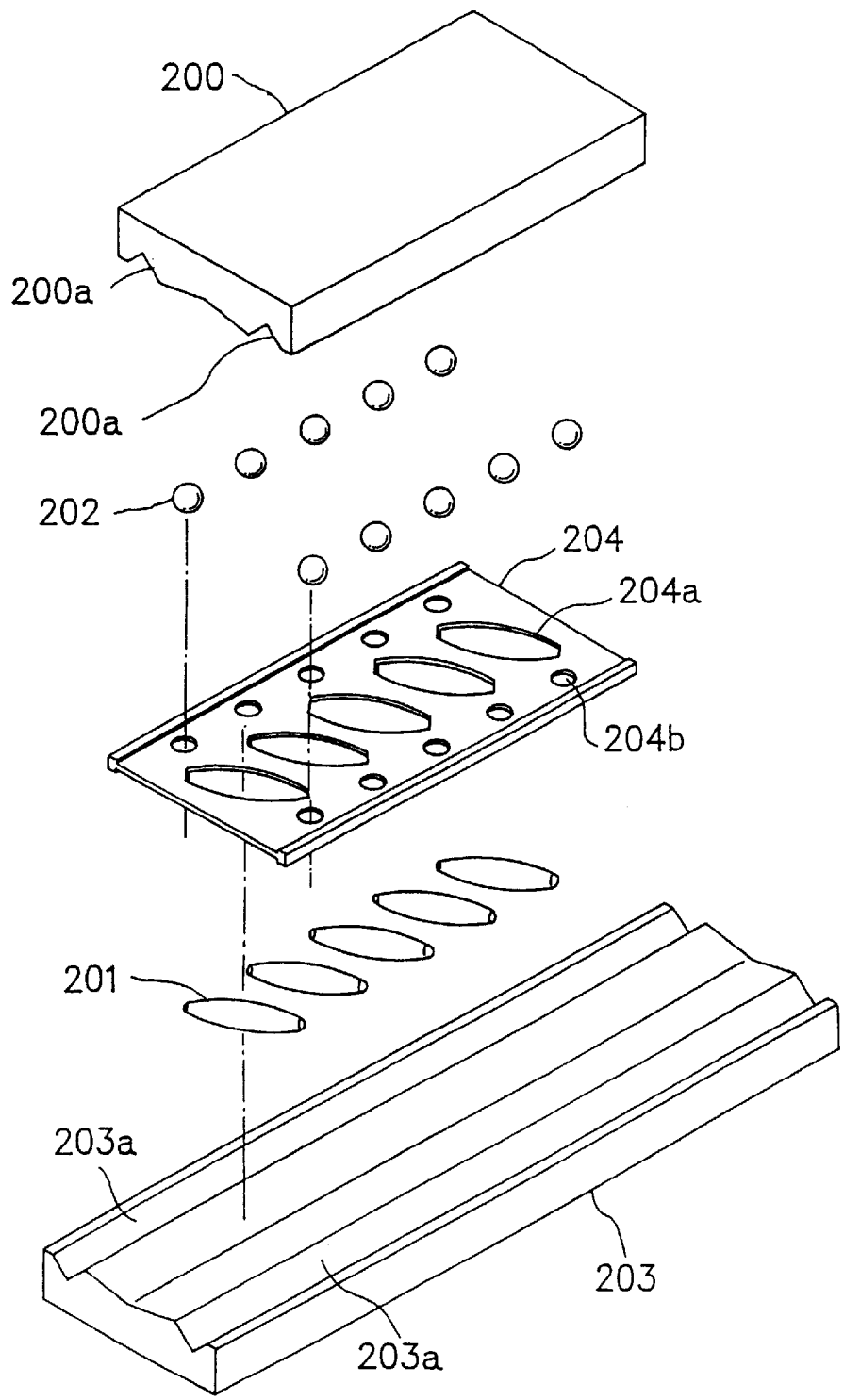
FIG. 40 is an exploded perspective view of a friction resistance generator of a twenty-first preferred embodiment of this invention.
Figure 41A:
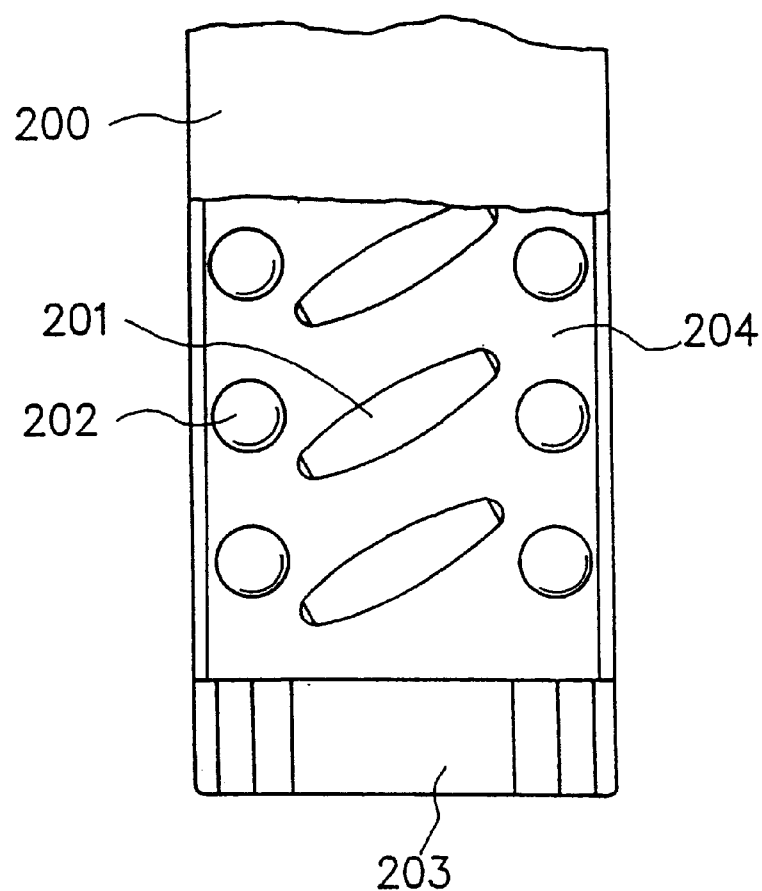
FIG. 41a and 41b show expanded sectional views of the drawing in FIG. 40.
Figure 41B:
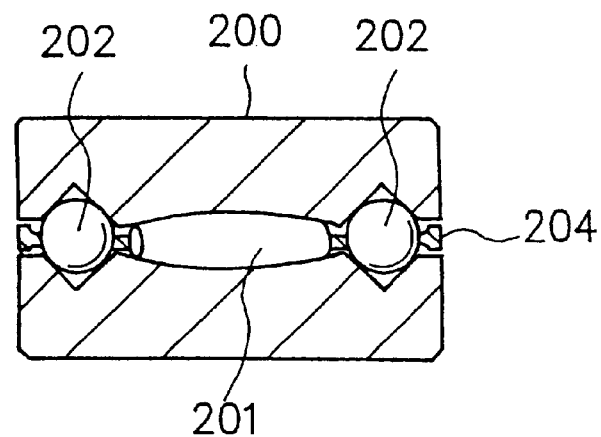

FIG. 40 and FIG. 41 show a twenty-first preferred embodiment of this invention: FIG. 40 being an exploded perspective view of a friction resistance generator of the twenty-first preferred embodiment of this invention; FIG. 41(a) being an enlarged plan view of a portion of the friction resistance generator of the twenty-first embodiment; and FIG. 41(b) being an enlarged view of the cross-section perpendicular to the longitude of the friction resistance generator.

The friction resistance generator comprises a sliding member 200, numerous rollers 201 disposed at prescribed intervals along a track of movement of the sliding member 200, numerous balls 202 similarly disposed in two lines along the track of movement of the sliding member 200, a passive member 203 facing the sliding member 200 across the rollers 201 and the balls 202, and a cage 204 which maintains the rollers 201 and the balls 202 at prescribed intervals in freely rotatable state.

The sliding member 200 is in the form of a plate shape and the center section of its surface facing the passive member 203 is formed to a concave cross-sectional plane. Also, on both sides of the surface of the sliding member 200 facing the passive member 203, a groove 200a each of a V-shaped cross-section is formed in continuation along the longitudinal direction. The balls 202 are engaging with a pair of said grooves 200a in freely rotatable state.

The rollers 201 are disposed at equal intervals along the longitudinal direction of the sliding member 200. The rollers 201 are in the form of a barrel shape, namely the largest outer diameter at the center thereof becoming gradually smaller toward both ends. Also, both ends of the rollers 201 are rounded to a hemi-spherical shape to lessen friction occurring between the rollers 201 and the cage 204.

The balls 202 are disposed at equal intervals along the longitudinal direction of the sliding member 200 in two lines holding the line of the rollers 201 in between.

The passive member 203 is in the form of a plate shape and the center section of its surface facing the sliding member 200 is formed to a concave cross-sectional plane. Also, on both sides of said surface of the passive member 203 facing the sliding member 200, a groove 203a each of a V-shaped cross section is formed in continuation along the longitudinal direction. The balls 202 are engaging with a pair of said grooves 203a in freely rotatable state.

The cage 204 is in the form of a plate shape and its thickness is made thinner than the outer diameter of the rollers 201. The cage 204 is provided with numerous slots 204a and numerous holes 204b to maintain the rollers 201 and the balls 202, respectively. Each roller 201 and each ball 202 are maintained in each slot 204a and each hole 204b, respectively, in freely rotatable state. Also, the slots 204a to maintain the rollers 201 are so disposed that the axes of rolling of the rollers 201 become inclined by a prescribed angle to a plane perpendicular to the moving direction of the sliding member 200.

With the friction resistance generator of the twenty-first embodiment, since the barrel shaped surface of each roller 201 is in contact with matchingly shaped surfaces of the sliding member 200 and the passive member 203, the motivation of respective rollers 201 to move toward their axes of rolling is restricted. Moreover, the outer diameter of the rollers 201 varies along their longitudes. These facts cause additional frictional force, thus making it possible to acquire even larger resistance force.

Figure 42A:
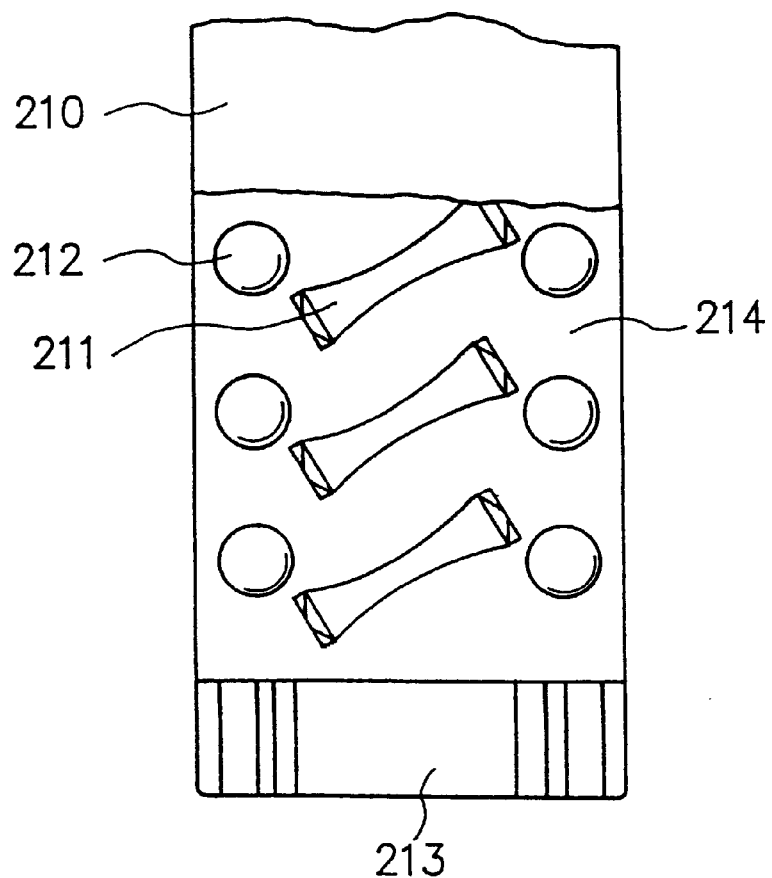
FIG. 42a and 42b show expanded sectional views of a friction resistance generator of a twenty-second preferred embodiment of this invention.
Figure 42B:
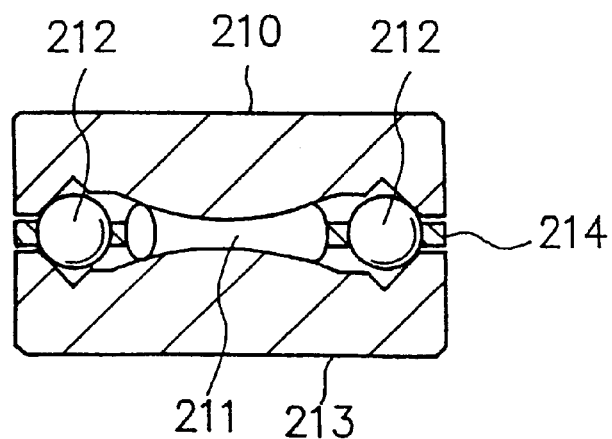

FIG. 42 shows a twenty-second preferred embodiment of this invention: FIG. 42(a) being an enlarged plan view of a portion of a friction resistance generator of the twenty-second preferred embodiment; and FIG. 42(b) being an enlarged view of a cross section perpendicular to the longitude of the friction resistance generator.

Similar to the preceding embodiment, the friction resistance generator comprises a sliding member 210, numerous rollers 211, numerous balls 212, a passive member 213, and a cage 214. The rollers 211 are in the form of a shape wherewith the smallest outer diameter at their center in the axial direction gradually becomes larger toward both ends. Meanwhile, the movements occurring in the friction resistance generator of the twenty-second embodiment and the effects thereof are the same as those of the preceding embodiment.

Figure 43:
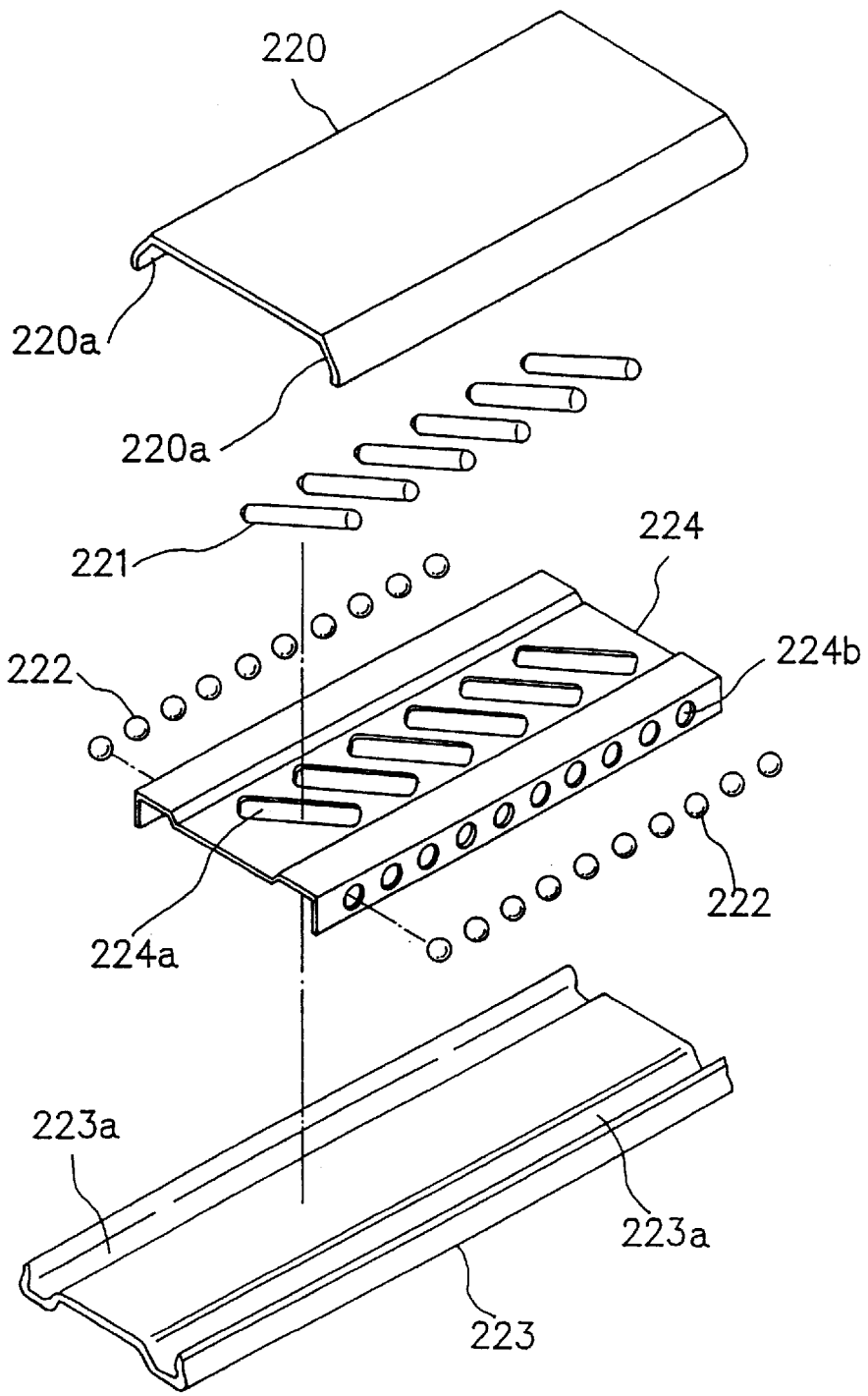
FIG. 43 show is an exploded perspective view of a friction resistance generator of a twenty-third preferred embodiment of this invention.
Figure 44A:
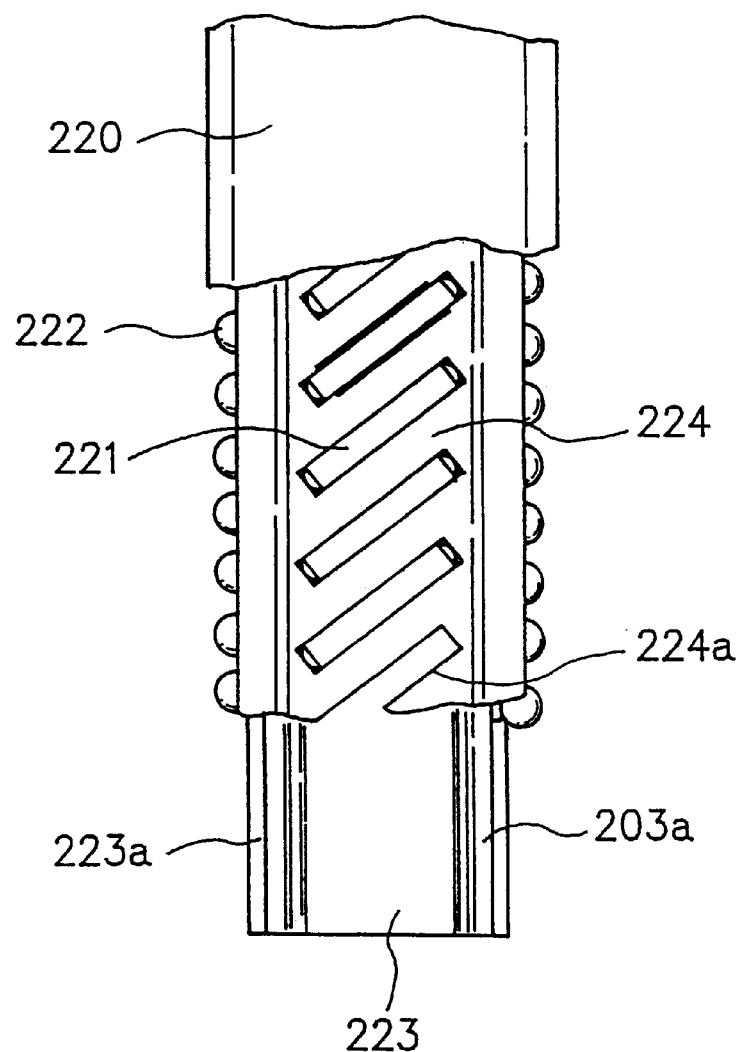
FIG. 44a and 44b show expanded sectional views of the drawing in FIG. 43.
Figure 44B:
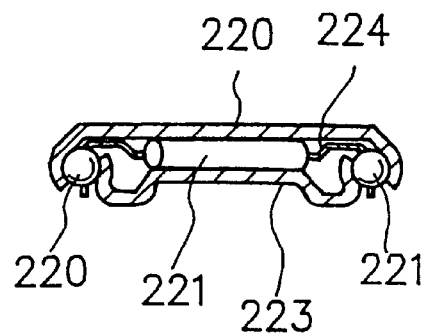

FIG. 43 and FIG. 44 show a twenty-third preferred embodiment of this invention: FIG. 43 being an exploded perspective view of a friction resistance generator of the twenty-third preferred embodiment; FIG. 44(a) being an enlarged plan view of a portion of the friction resistance generator; and FIG. 44(b) being an enlarged view of a cross section perpendicular to the longitude of the friction resistance generator.

The friction resistance generator comprises a sliding member 220 which is designed to slide in rectilinear directions, numerous rollers 221 disposed along a track of movement of the sliding member 220, numerous balls 222 similarly disposed along the tack of movement of the sliding member 220, a passive member 223 which faces the sliding member 220 across the rollers 221 and the balls 222, and a cage 224 which maintains the rollers 221 and the balls 222 at prescribed intervals in freely rotatable state.

Both sides of the sliding member 220 are bent downward and its surface facing the passive member 223 is formed to a flat plane. Also, both sides of the sliding member 220 are formed to ball-guides 220a in continuation along the longitudinal direction of the sliding member. The balls 222 are engaging with the ball-guides 220a in freely rotatable state.

The rollers 221 are in the form of cylindrical shapes extending straight toward their longitude and they are disposed at equal intervals along the longitudinal direction of the sliding member 220. Also, both ends of the rollers 221 are rounded to a hemi-spherical shape to lessen friction occurring between the rollers 221 and the gage 224.

The balls 222 are disposed at equal intervals along the longitudinal direction of the sliding member 220 in two lines along both sides.

Both sides of the passive member 223 are bent downward before bent up at both edges. Its surface facing the sliding member 220 is formed to a flat plane. Also, the outside surfaces on both sides of the passive member 223 are formed to ball-guides 223a. The balls 222 are engaging with the ball-guides 223a in freely rotatable state. Both sides of the cage 224 are bent downward and its thickness is made thinner than the outer diameter of the rollers 221. Also, the cage 224 is provided with numerous slots 224a to maintain the rollers 221 in its center plane. Each roller 221 is maintained in each slot 224a in freely rotatable state. The slots 224a are so disposed that the axes of rolling of the rollers 221 become inclined by a prescribed angle to a plane perpendicular to the moving direction of the sliding member 220. Also, through both side walls of the cage 224, numerous holes 224b are opened to maintain the balls 222. Each ball 222 is maintained in each hole 224b in freely rotatable state.

The sliding member 220 and the passive member 223 of the friction resistance generator of the twenty-third embodiment are press-formed plates. The movements occurring in the friction resistance generator and effects thereof are the same as those of the preceding embodiment.

Figure 45A:
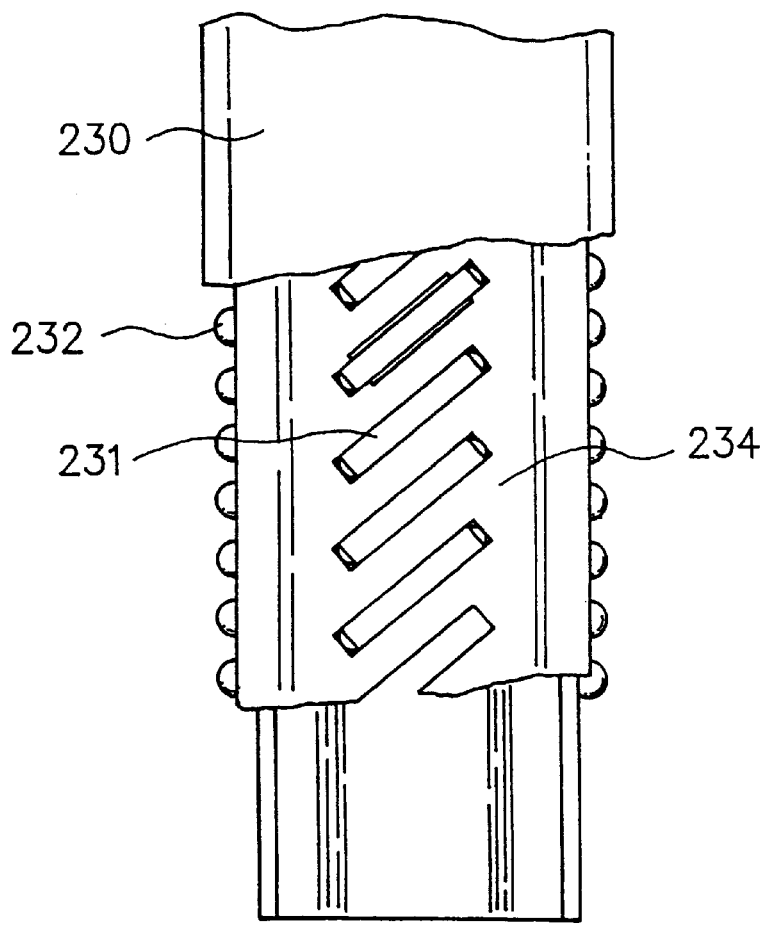
FIG. 45a and 45b show expanded sectional views of a friction resistance generator of a twenty-fourth preferred embodiment of this invention.
Figure 45B:
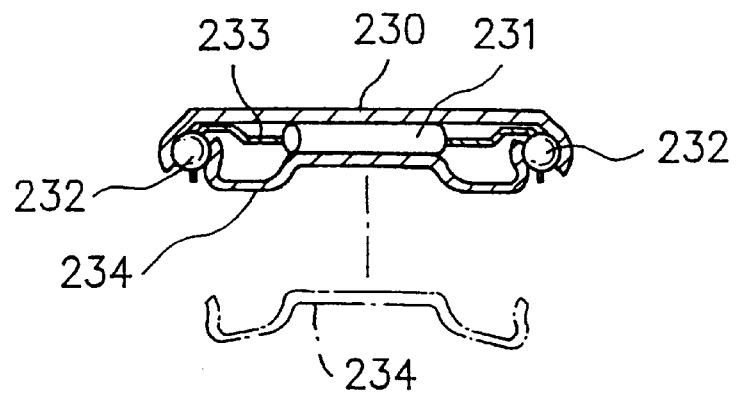

FIG. 45 shows a twenty-fourth preferred embodiment of this invention: FIG. 45(a) being an enlarged plan view of a portion of a friction resistance generator of the twenty-fourth preferred embodiment; and FIG. 45(b) being an enlarged view of a cross section perpendicular to the longitude of the friction resistance generator.

Similar to the preceding embodiment, the friction resistance generator comprises a sliding member 230, numerous rollers 231, numerous balls 232, a passive member 233, and a cage 234.

The passive member 233 of the friction resistance generator of this embodiment is so shaped that, in its independent state as indicated by the alternate long and short dash line, the center plane, namely the plane contacting the rollers 231, is slightly elevated than in the assembled state as indicated by solid line in the cross sectional view. Consequently, the rollers 231 are always depressed upward onto the sliding member 230 under a certain pressure by the elastic deformation of the passive member 233 when it has been assembled. Thus, a pre-load is applied to the rollers 231 and the friction force produced by respective rollers 231 can always be maintained constant.

Figure 46:
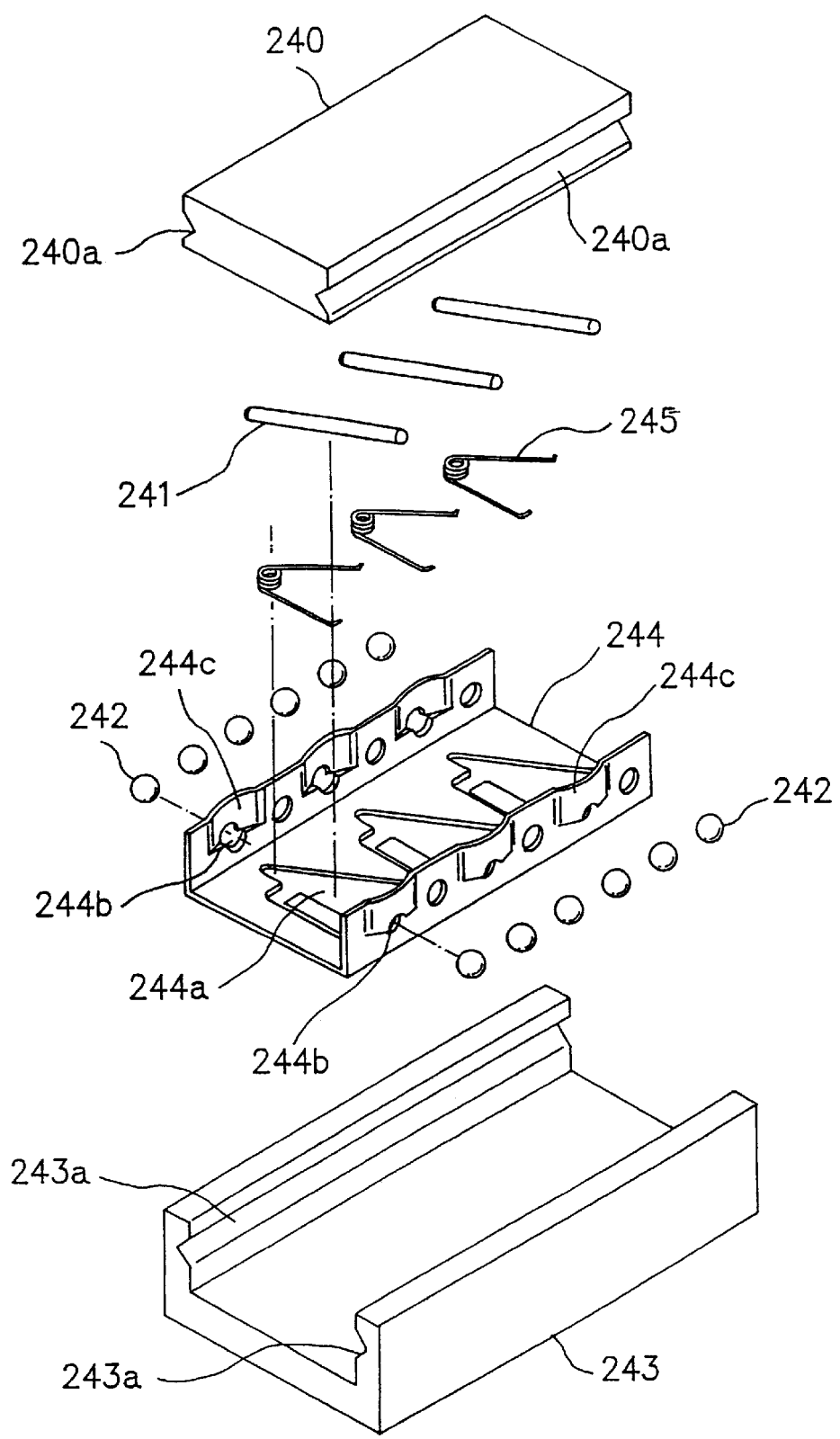
FIG. 46 is an exploded perspective view of a friction resistance generator of a twenty-fifth preferred embodiment of this invention.
Figure 47A:
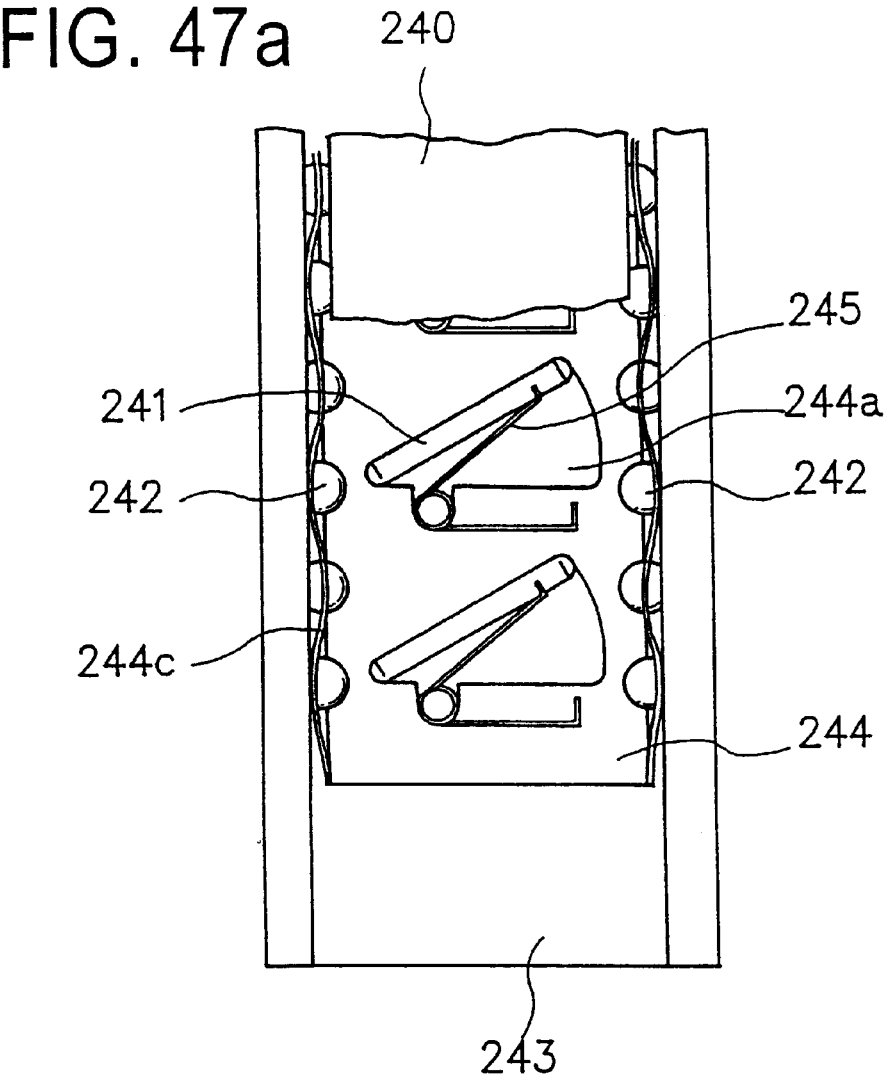
FIG. 47a and 47b show expanded sectional views of the drawing in FIG. 46.
Figure 47B:
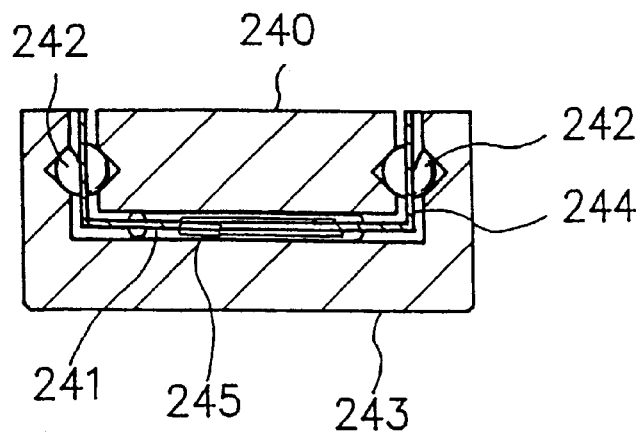

FIG. 46 to FIG. 48 show a twenty-fifth preferred embodiment of this invention: FIG. 46 being an exploded perspective view of a friction resistance generator of the twenty-fifth preferred embodiment of this invention; FIG. 47(a) being an enlarged plan view of a portion of the friction resistance generator; and FIG. 47(b) being an enlarged view of a cross section perpendicular to the longitude of the friction resistance generator.

The friction resistance generator comprises a sliding member 240, numerous rollers 241 disposed along a track of movement of the sliding member 240, numerous balls 240 similarly disposed along the track of movement of the sliding member 240, a passive member 243 facing the sliding member 240 upward from below across the rollers 241, a cage 244 which maintains the rollers 241 and the balls 242 individually at prescribed intervals in freely rotatable state, and numerous coil springs 245 pushing the rollers 241 toward a prescribed sliding direction of the sliding member 240.

The sliding member 240 is in the form of a plate shape and its surface facing the passive member 243 is formed to a flat plane. Also, in the surfaces on both sides of the sliding member 240, a groove 240a each of a V-shaped cross section is formed in continuation along the longitudinal direction of the sliding member 240. The balls 242 are engaging with a pair of said grooves 240a in freely rotatable state.

The rollers 241 are in the form of a cylindrical shape extending straight along their axes of rolling and they are disposed at equal intervals along the longitudinal direction of the sliding member 240. Also, both ends of the rollers 241 are rounded to a hemi-spherical shape to lessen friction occurring between the rollers 241 and the cage 244.

The balls 242 are disposed at equal intervals along the longitudinal direction of the sliding member 240 in two lines along both sides.

The passive member 243 is in the form of a tray shape with walls rising up from both sides and its surface facing the sliding member 240 is formed to a flat plane. Also, in the inner side surfaces of walls on both sides of the passive member 243, a groove 243a each of a V-shaped cross section is formed in continuation along the longitudinal direction of the passive member 243. The balls 242 are in engagement with a pair of said grooves 243a in freely rotatable state.

The cage 244 is in the form of a U-shape with both sides being bent upward matching the inner profile of the passive member 243 and its thickness is made thinner than the outer diameter of the rollers 241. The cage 244 is provided with numerous openings 244a to maintain the rollers 241. Each roller 241 is maintained in each opening 244a in freely rotatable state.

Each opening 244a is in the form of a fan-shape with its pivot matching to the position of one end of each roller 241. One side extending from said pivot is designed in parallel with a plane perpendicular to the moving direction of the sliding member 240 and the other side extending from said pivot is so designed to incline by a prescribed angle to the plane perpendicular to the moving direction of the sliding member 240.

Also, in the upright walls on both sides of the cage 244, numerous holes 244b are opened in continuation along the longitudinal direction of the cage 244. The holes 244b on both sides maintain the balls 242 individually in freely rotatable state.

Moreover, the upright walls on both sides of the cage 244 are formed to corrugated spring structures having numerous elastic convexities 244c at a prescribed intervals. The elastic convexities 244c are pressing the inside surface of the passive member 243 by their springing force in a state of contact.

The coil springs 245 are individually installed beside respective openings 244a of the cage 244, and one end of the coil springs 245 are fastened to the bottom surface of the cage 244. The other end of the coil springs 245 is hooked to each roller 241, pushing the roller 241 onto the side being inclined to the plane perpendicular to the trace of movement of the sliding member 240.

Figures 48A, 48B:
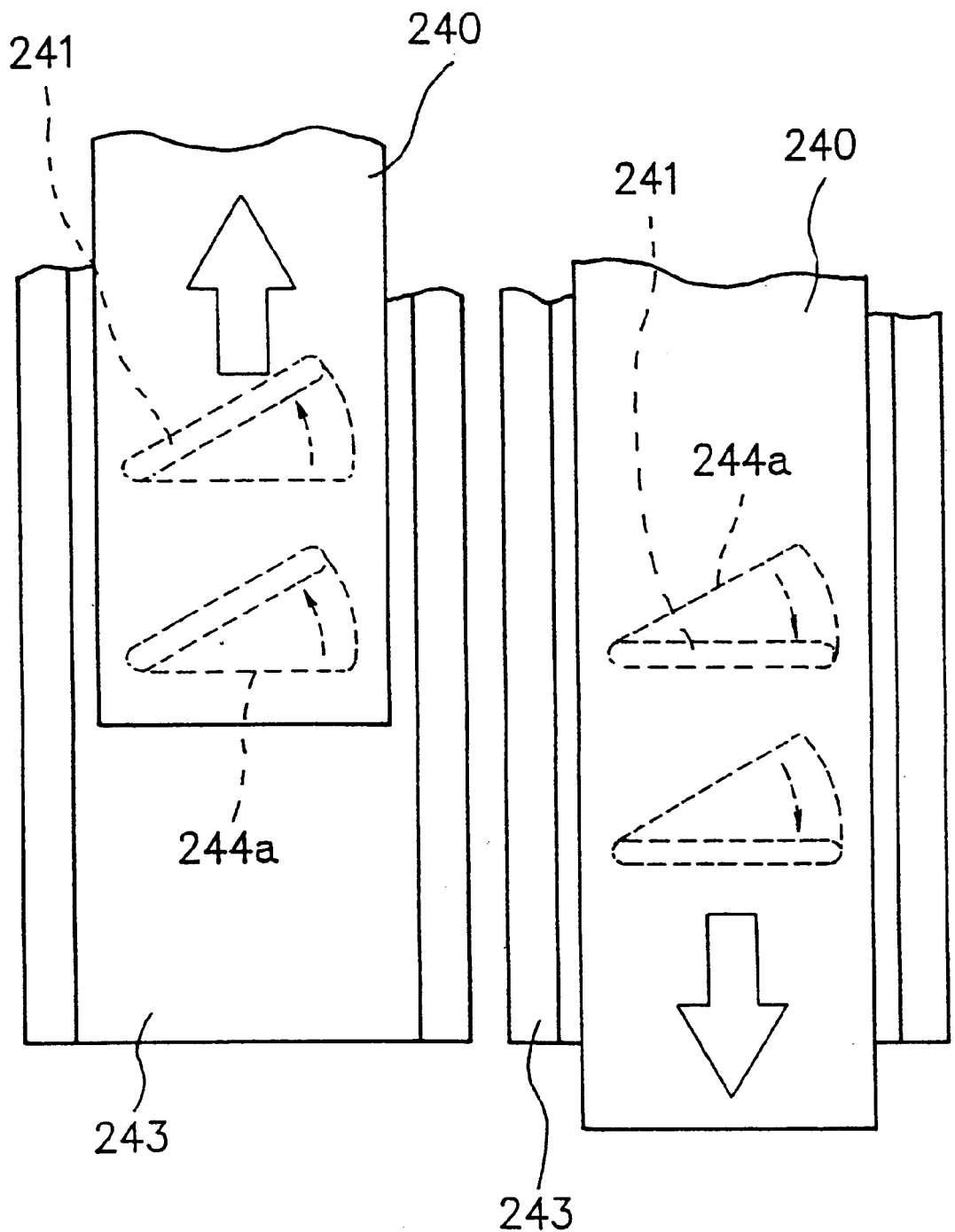
FIG. 48a and 48b are explanatory drawings indicating movement occurring in the twenty-fifth preferred embodiment of this invention.

With the friction resistance generator of the aforementioned structure, as shown in FIG. 48(a), when the sliding member 240 is moved toward a prescribed direction (the upward direction in the drawing), the rollers 241 make rolling motions in contact with the sliding member 240 and the passive member 243, then the cage 242 trails to move along. At this time, since the rollers 241 are motivated to move toward the direction being inclined to the track of movement of the sliding member 240, similar to the case of the preceding embodiment, friction force in proportion to a load applied in the axial direction occurs between the rollers 241 and the sliding member 240 and between the rollers 241 and the passive member 243.

On the other hand, as shown in FIG. 48(b), if the sliding member 240 is moved toward the opposite direction (the downward direction in the drawing), the rollers 241 tilt inside the openings 244a until their axes of rolling come in parallel with the plane perpendicular to the moving direction of the sliding member 240, while making rolling motions in contact with the sliding member 240 and the passive member 243. When this occurs, since the axes of rolling of the rollers 241 are not inclined to the plane perpendicular to the track of movement of the sliding member 240, sliding friction does not occur with respective rollers 241, thus allowing the sliding member 240 slide smoothly.

Also, since the elastic convexities 244c provided along the walls on both sides of the cage 244 are pushing the inside surfaces of the upright structures of the passive member 243, when the sliding direction of the sliding member 240 is shifted, the cage 244 is always late in shifting the direction of movement than the tiling motions of the rollers 241 because of the aforesaid contact resistance with the inside wall surfaces of the passive member 243, thus the rollers 241 can tilt their directions promptly inside the openings 244a.

Moreover, since respective rollers 241 are always motivated to stay at the direction not being inclined to the plane perpendicular to the trace of movement of the sliding member 240 whichever direction they may be rolling for, the rollers 241 are tilted forcefully by the coil springs 245 when heading for the direction, which is deemed necessary to exert a resistance.

Thus, with the friction resistance generator of this embodiment, since it is so structured that the axes of rolling of the rollers 241 can be tilted between the side becoming in parallel with the plane perpendicular to the sliding direction of the sliding member 240 and the side becoming inclined to the plane perpendicular to the sliding direction of the sliding member 240, in a prescribed sliding direction, a resistance occurring from the frictional force of the rollers 241 can be applied to the rectilinear movement of the sliding member 240, while in the other sliding direction, the rectilinear movement of the sliding member 240 can be made smoothly without application of said resistance.

Figure 49:
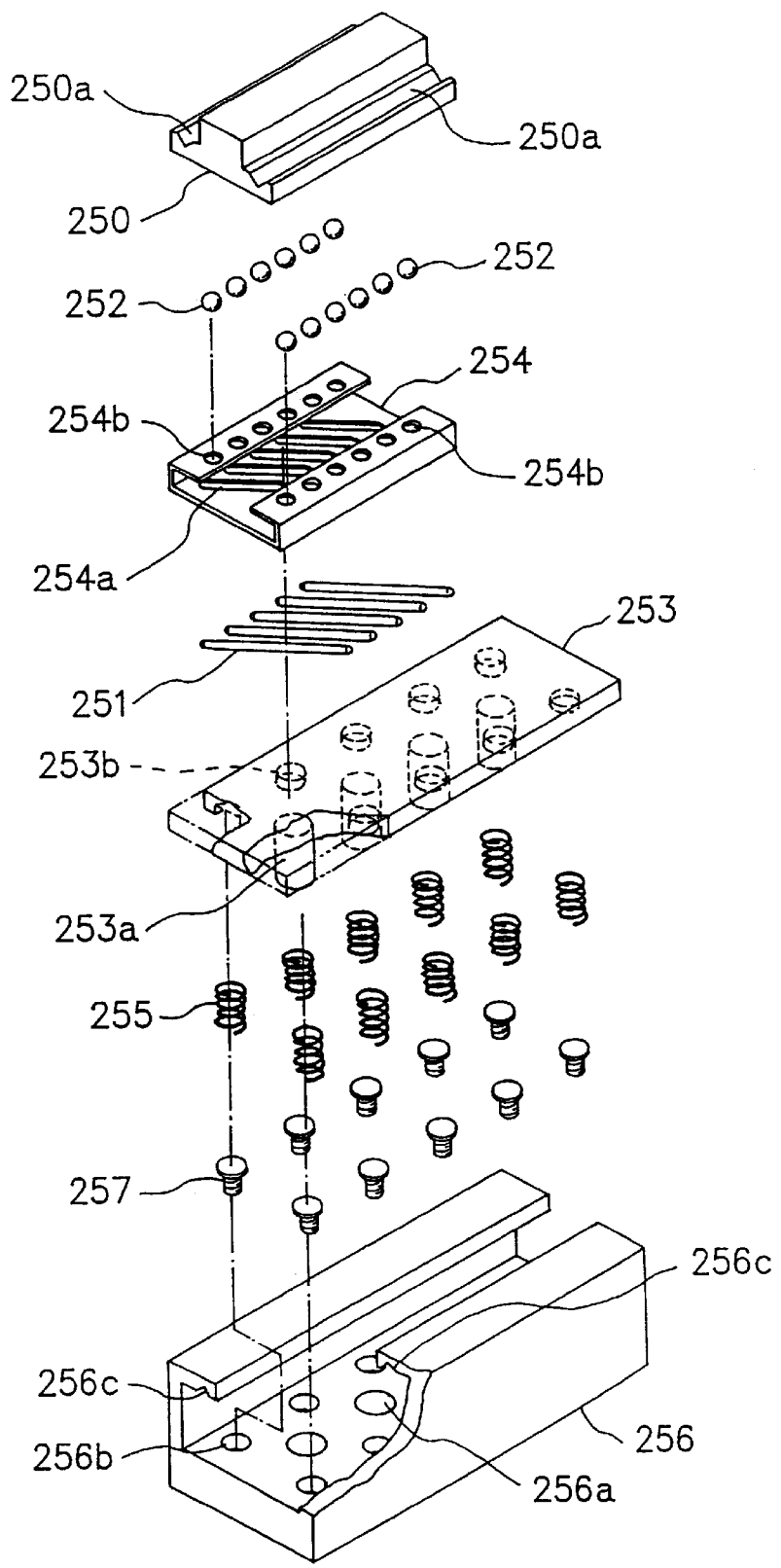
FIG. 49 is an exploded perspective view of a friction resistance generator of a twenty-sixth preferred embodiment of this invention.
Figure 50A:
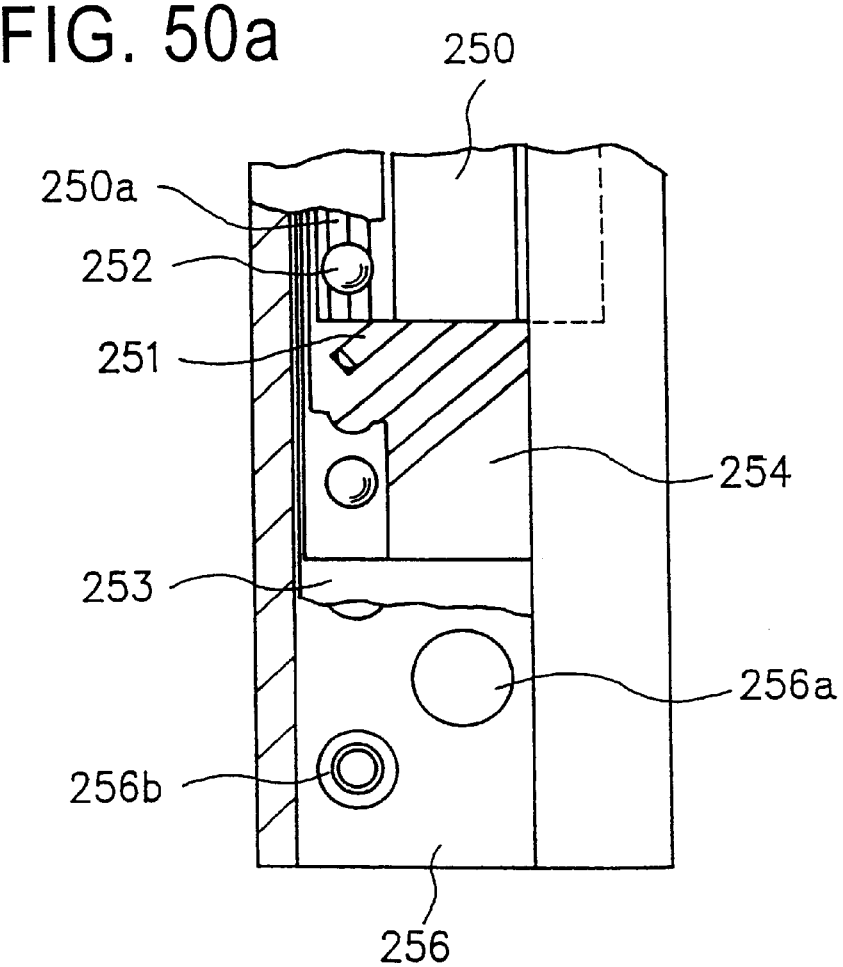
FIG. 50a and 50b show expanded sectional views of the drawing in FIG. 49.
Figure 50B:
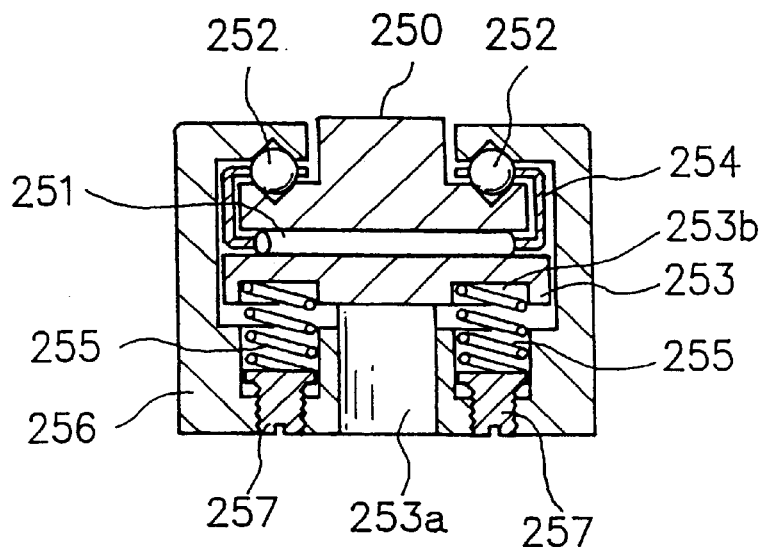

FIG. 49 and FIG. 50 show a twenty-sixth preferred embodiment of this invention: FIG. 49 being an exploded perspective view of a friction resistance generator of the twenty-sixth preferred embodiment; FIG. 50(a) being an enlarged plan view of a portion of the friction resistance generator; and FIG. 50(b) being an enlarged view of a cross section perpendicular to the longitude of the friction resistance generator.

The friction resistance generator comprises a sliding member 250 which moves along its axis of rectilinear movement, numerous rollers 251 disposed along s track of movement of the sliding member 250, numerous balls 252 being similarly disposed along the track of movement of the sliding member 250, a passive member 253 facing the sliding member 250 upward fro m below across the rollers 251, a cage 254 which maintains the rollers 251 and the balls 252 at prescribed intervals in freely rotatable state, numerous coil springs 255 which work as the means of application of a pre-load pushing the passive member 253 toward the sliding member 250, and a housing 256 to house all these components.

The sliding member 250 is in the form of a plate shape with its upper center section being raised to a higher elevation and with its surface facing the passive member 253 (the bottom surface) being formed to a flat plane. Also, in the both lower elevation side surfaces on the upper side of the sliding member 250, a groove 250a each of a V-shaped cross section is formed in continuation along the longitudinal direction of the sliding member 250. The balls 252 are in engagement with a pair of said grooves 250a in freely rotatable state.

The rollers 251 are in the form of a cylindrical shape extending straight toward their axes of rolling and they are disposed at equal intervals along the longitudinal direction of the sliding member 250. Also, both ends of the rollers are rounded to a hemi-spherical shape to lessen friction occurring between the rollers 251 and the cage 254.

The balls 252 are disposed at equal intervals along the longitudinal direction of the sliding member 250 in two lines along both sides.

The passive member 253 is in the form of a plate shape and its surface facing the sliding member 250 (the upper surface) is formed to a flat plane. Also, numerous guide rods 253a extending downward and numerous holes 253b to accept the upper ends of the coil springs 255 are provided on the bottom plane of the passive member 253, in continuation in the longitudinal direction.

Both sides of the cage 254 is bent upward before further bent inward and its thickness is made thinner than the outer diameter of the rollers 251. Numerous slots 254a to maintain the rollers 251 are opened through the bottom of the cage 254. Each roller 251 is maintained in each slot 254a in freely rotatable state.

The slots 254a are so disposed that the axes of rolling of the rollers 251 become inclined by a prescribed angle to the plane perpendicular to the sliding direction of the sliding member 250. Also, in the side structure at an upper elevation than the bottom surface of the cage 254, numerous holes 254b are opened to maintain the balls 252. Each ball 252 is maintained in each hole 254b in freely rotatable state.

The coil springs 255 are inserted between the passive member 253 and the housing 256 in compressed state, pushing up the passive member 253 toward the sliding member 250 at a constant springing force.

The housing 256 extends its walls on both sides upward before extending them toward inside to cover both sides of the upper open space. In the bottom surface of the housing 256, numerous holes 256a whereto the guide rods 253a of the passive member 253 are inserted for free sliding and numerous holes 256b whereto the lower ends of the coil springs 255 are inserted. Through the bottom of each hole 256b for inserting the lower end of each coil spring 255, an adjusting screw 257 each is screwed in, whose head contacts the bottom end of each coil spring 255, thus providing an adjusting means of the springing force of each coil spring 255 by screwing the adjusting screws 257 in or out. Also, in the ceiling surfaces of the structure covering both sides of the upper open space of the housing 256, a groove 256c each of a V-shaped cross section is formed in continuation along the longitudinal direction of the housing 256. The balls 252 are engaging with a pair of said grooves 256c in freely rotatable state.

Namely, as shown in FIG. 50(b), in the housing 256, the passive member 253 is housed in a state being pushed upward by the coil springs 255 toward the sliding member 250, and the balls 252 maintained by the cage 254 are engaging with the grooves 256c of the housing 256 and the grooves 250a of the sliding member 250.

By this structure, dislocation of the sliding member 250 toward outside of its axis of rectilinear movements is prevented, and the sliding member 250 and the passive member 253 are depressed each other by a constant force across the rollers 251.

With the friction resistance generator of this embodiment, since the springing force of the coil springs 255, in other words, the pre-load applied to the rollers 251, can be adjusted by the adjusting screws 257, the frictional force occurring from the pre-load can be optionally adjusted.

PROSPECTS FOR INDUSTRIAL APPLICATIONS

As aforementioned, the friction resistance producing mechanism of this invention can produce always stable and discretionary frictional resistance even when its speed of rotary movements or rectilinear movements of the subject structure changes. Moreover, the magnitude of the frictional force can be easily controlled by changing the magnitude of the load, or the discretionary frictional force can be produced only in a prescribed direction of rotary movement or rectilinear movement of the subject structure. Under such circumstances, optional friction force fitting to individual purposes can be obtained, by optionally setting of the inclination angle of the rolling axes of respective rollers.

Consequently, the friction resistance generator of this invention can be effectively applied to various machines and equipment requiring the aforesaid functions, and its simple structure can provide extremely effective advantage to reduction of the production costs and down sizing of machines and equipment.

What is claimed is:

1. A friction resistance generator comprising:

a rotary member rotatable on a prescribed axis of rotation;

a passive member facing the rotary member in the axial direction;

numerous rollers being located between the rotary member and the passive member, said rollers making rolling motions in contact with the rotary member and the passive member when the rotary member makes rotary movements; and a cage having a plurality of inclined slots for maintaining the rollers at prescribed intervals along a prescribed peripheral line around the axis of rotation of the rotary member while allowing free rolling of the rollers;

in which axes of rolling of the rollers are inclined to produce a prescribed angle between a plane including the axis of rotation of the rotary member;

the rollers being alternately inclined in opposite directions, numerous balls being disposed between the rollers and maintained by the cage in a freely rolling manner, one or more circumferential grooves with which the balls are engaged in a freely rolling manner being provided on a side of the rotary member and a side of the passive member.

2. The friction resistance generator as claimed in claim 1, wherein the profile of each roller is such that a narrowed central part gradually widens toward both ends in an axial direction and in which surfaces of a rotary member and a passive member contacting the rollers are formed to be in line with the profile of the roller.

3. The friction resistance generator as claimed in claim 2, further including pre-loading means for pre-loading said rollers so that said rollers contact said rotary member under prescribed pressure.

4. The friction resistance generator as claimed in claim 1, wherein the profile of each roller is such that a thickened central part gradually narrows toward both ends in an axial direction and in which surfaces of a rotary member and a passive member contacting the rollers are formed to be in line with the profile of the roller.

5. The friction resistance generator as claimed in claim 4, further including pre-loading means for pre-loading said rollers so that said rollers contact said rotary member under prescribed pressure.

6. The friction resistance generator as claimed in claim 1, wherein the slots have a predetermined shape for maintaining the rollers in a freely tilt manner so that an angle of inclination between the axis of rolling of the rollers and the plane including the axis of rotation of the rotary member, when the rotary member rotates in one direction of rotation and the angle of inclination between the axis of rolling of the rollers and the plane including the axis of rotation of the rotary member, when the rotary member rotates in the other direction of rotation becomes different from each other.

7. The friction resistance generator as claimed in claim 6, further including pre-loading means for pre-loading said rollers so that said rollers contact said rotary member under prescribed pressure.

8. The friction resistance generator as claimed in claim 1, further including pre-loading means for pre-loading said rollers so that said rollers contact said rotary member under prescribed pressure.

9. A friction resistance generator comprising:

a rotary member rotatable on a prescribed axis of rotation;

a passive member facing the rotary member in the radial direction;

numerous rollers being located between the rotary member and the passive member, said rollers making rolling motions in contact with the rotary member and the passive member when the rotary member makes rotary movements; and a cage having a plurality of inclined slots for maintaining the rollers at prescribed intervals along a prescribed peripheral line around the axis of rotation of the rotary member while allowing free rolling of the rollers, in which axes of rolling of the rollers are circumferentially inclined to produce a prescribed angle between the plane including the axis of rotation of the rotary member, numerous balls being disposed between the rollers and maintained by the cage in a freely rolling manner, one or more circumferential grooves with which the balls are engaged in a freely rolling manner being provided on a side of the rotary member and a side of the passive member.

10. The friction resistance generator as claimed in claim 9, wherein the axes of rolling of the rollers are inclined to produce a prescribed angle with respect to the axis of rotation of the rotary member; and said rollers have conical shapes and are so positioned that an intersecting point of the lines extended along both sides of its conical body surfaces along its axial direction does not coincide with the axis of rotation of said rotary member.

11. The friction resistance generator as claimed in claim 10, further including pre-loading means for pre-loading said rollers so that said rollers contact said rotary member under prescribed pressure.

12. The friction resistance generator as claimed in claim 9, further including pre-loading means for pre-loading said rollers so that said rollers contact said rotary member under prescribed pressure.

* * * * *